(12) United States Patent
Yamaguchi

(10) Patent No.: US 10,801,904 B2
(45) Date of Patent: Oct. 13, 2020

(54) SENSOR CHIP, FLEXURE ELEMENT, AND FORCE SENSOR DEVICE

(71) Applicant: Shinya Yamaguchi, Tokyo (JP)

(72) Inventor: Shinya Yamaguchi, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 29 days.

(21) Appl. No.: 16/327,084

(22) PCT Filed: Oct. 3, 2017

(86) PCT No.: PCT/JP2017/035973
§ 371 (c)(1),
(2) Date: Feb. 21, 2019

(87) PCT Pub. No.: WO2018/066557
PCT Pub. Date: Apr. 12, 2018

(65) Prior Publication Data
US 2019/0187009 A1    Jun. 20, 2019

(30) Foreign Application Priority Data

Oct. 7, 2016 (JP) .................. 2016-199486
Apr. 26, 2017 (JP) .................. 2017-086966

(51) Int. Cl.
*G01L 1/22* (2006.01)
*G01L 5/162* (2020.01)
*G01L 5/16* (2020.01)

(52) U.S. Cl.
CPC .......... *G01L 1/2218* (2013.01); *G01L 1/2293* (2013.01); *G01L 5/16* (2013.01); *G01L 5/162* (2013.01)

(58) Field of Classification Search
CPC ....... G01L 1/2218; G01L 1/2293; G01L 5/16; G01L 5/162

(Continued)

(56) References Cited

U.S. PATENT DOCUMENTS 4,849,730 A  7/1989 Izumi et al.
5,526,700 A  6/1996 Akeel
(Continued)

FOREIGN PATENT DOCUMENTS

EP  1327870  7/2003
EP  1852688  11/2007
(Continued)

OTHER PUBLICATIONS

International Search Report for PCT/JP2017/035973 dated Nov. 14, 2017.
(Continued)

*Primary Examiner* — William A Bolton
*Assistant Examiner* — Iman Malakooti
(74) *Attorney, Agent, or Firm* — IPUSA, PLLC

(57) ABSTRACT

A sensor chip includes first support parts arranged at four corners and a second support part arranged at a center of a substrate, first detecting beams connecting adjacent first support parts to each other, second detecting beams provided in parallel to the first detecting beams between the first and second support parts, third detecting beams connecting the first and second connecting beams, in sets of the first and second detecting beams provided in parallel, force application points, arranged at intersections of the first and third detecting beams, and applied with the forces, and a plurality of distortion detection devices arranged at predetermined positions on the first, the second and the third detecting beams.

33 Claims, 50 Drawing Sheets

(58) Field of Classification Search
USPC .............................................. 338/2
See application file for complete search history.

(56) References Cited

U.S. PATENT DOCUMENTS

| | | |
|---|---|---|
| 2003/0140713 A1 | 7/2003 | Ohsato et al. |
| 2007/0266797 A1 | 11/2007 | Hirabayashi et al. |
| 2008/0156112 A1* | 7/2008 | Sakurai ................. G01L 1/2281 |
| | | 73/862.474 |
| 2010/0199783 A1* | 8/2010 | Sakurai ................... G01P 15/18 |
| | | 73/862.044 |

FOREIGN PATENT DOCUMENTS

| | | |
|---|---|---|
| JP | 2001-331271 | 11/2001 |
| JP | 2003-207405 | 7/2003 |
| JP | 2007-298471 | 11/2007 |
| JP | 2013-002942 | 1/2013 |

OTHER PUBLICATIONS

Extended European search report for European Patent Application No. 17858395.1 dated Mar. 3, 2020.

\* cited by examiner

Beam Part Enlarged

Beam Part Enlarged

SENSOR CHIP, FLEXURE ELEMENT, AND FORCE SENSOR DEVICE

TECHNICAL FIELD

The present invention relates to a sensor chip, a flexure element, and a force sensor device.

BACKGROUND ART

A force sensor device that is conventionally known includes a plurality of strain gauges that are bonded to a flexure element made of a metal, and detects multiaxial forces by converting a distortion, that occurs when an external force is applied, into an electrical signal. However, this force sensor device requires the strain gauges to be bonded one by one by manual operation, to thereby introduce problems from viewpoints of accuracy and productivity, and it is difficult to reduce the size of this force sensor device due to its structure.

On the other hand, a force sensor device has been proposed that can eliminate the problem associated with the bonding accuracy and enable the size to be reduced, by replacing the strain gauge by a MEMS sensor chip for strain detection (for example, refer to Patent Document 1).

PRIOR ART DOCUMENTS

Patent Documents

Patent Document 1: Japanese Patent No. 4011345

DISCLOSURE OF THE INVENTION

Problem to be Solved by the Invention

However, according to the force sensor device described above, an operation (signal processing) needs to be performed on outputs from a plurality of strain gauge elements of the sensor chip to obtain a 6-axis output, and a multiaxial output cannot be obtained by a simple method.

The present invention is conceived in view of the above points, and one object of the present invention is to provide a sensor chip that can detect and output multiaxial displacements by a simple method.

Means of Solving the Problem

A disclosed sensor chip (10) is configured to detect a displacement in a predetermined axial direction in up to 6 axes at maximum, based on changes in outputs of a plurality of distortion detection devices arranged on predetermined beams, according to directions of forces or displacements applied to force application points, and includes a substrate; first support parts (11a through 11d) arranged at four corners of the substrate; a second support part (11e) arranged at a center of the substrate; first detecting beams (13a, 13d, 13g, 13j) respectively connecting adjacent first support parts (11a through 11d) to each other; second detecting beams (13b, 13e, 13h, 13k) respectively provided in parallel with respect to the first detecting beams (13a, 13d, 13g, 13j) between the respective first detecting beams (13a, 13d, 13g, 13j) and the second support part (11e); third detecting beams (13c, 13f, 13i, 13l) connecting the first detecting beams (13a, 13d, 13g, 13j) and the second connecting beams (13b, 13e, 13h, 13k), in sets of the first detecting beams (13a, 13d, 13g, 13j) and the second detecting beams (13b, 13e, 13h, 13k) provided in parallel; force application points (14a through 14d), arranged at intersections of the first detecting beams (13a, 13d, 13g, 13j) and the third detecting beams (13c, 13f, 13i, 13l), and applied with the forces; and a plurality of distortion detection devices (MxR1 through MxR4, MyR1 through MyR4, MzR1 through MzR4, FxR1 through FxR4, FyR1 through FyR4, FxR1 through FzR4) arranged at predetermined positions on the first detecting beams (13a, 13d, 13g, 13j), the second detecting beams (13b, 13e, 13h, 13k), and the third detecting beams (13f, 13l), wherein a displacement in a Z-axis direction along a thickness direction of the substrate is detected based on deformations of at least the third detecting beams (13f, 13l), and wherein displacements in an X-axis direction and a Y-axis direction respectively perpendicular to the Z-axis direction are detected based deformations of at least one of the first detecting beams (13a, 13d, 13g, 13j) and the second detecting beams (13b, 13e, 13h, 13k).

Reference numerals in brackets above are added to facilitate understanding, and merely show examples, and are not limited to embodiments illustrated in the drawings.

Effects of the Invention

According to the disclosed technology, it is possible to provide a sensor chip that can detect and output multiaxial displacements by a simple method.

MODE OF CARRYING OUT THE INVENTION

Figure 1:
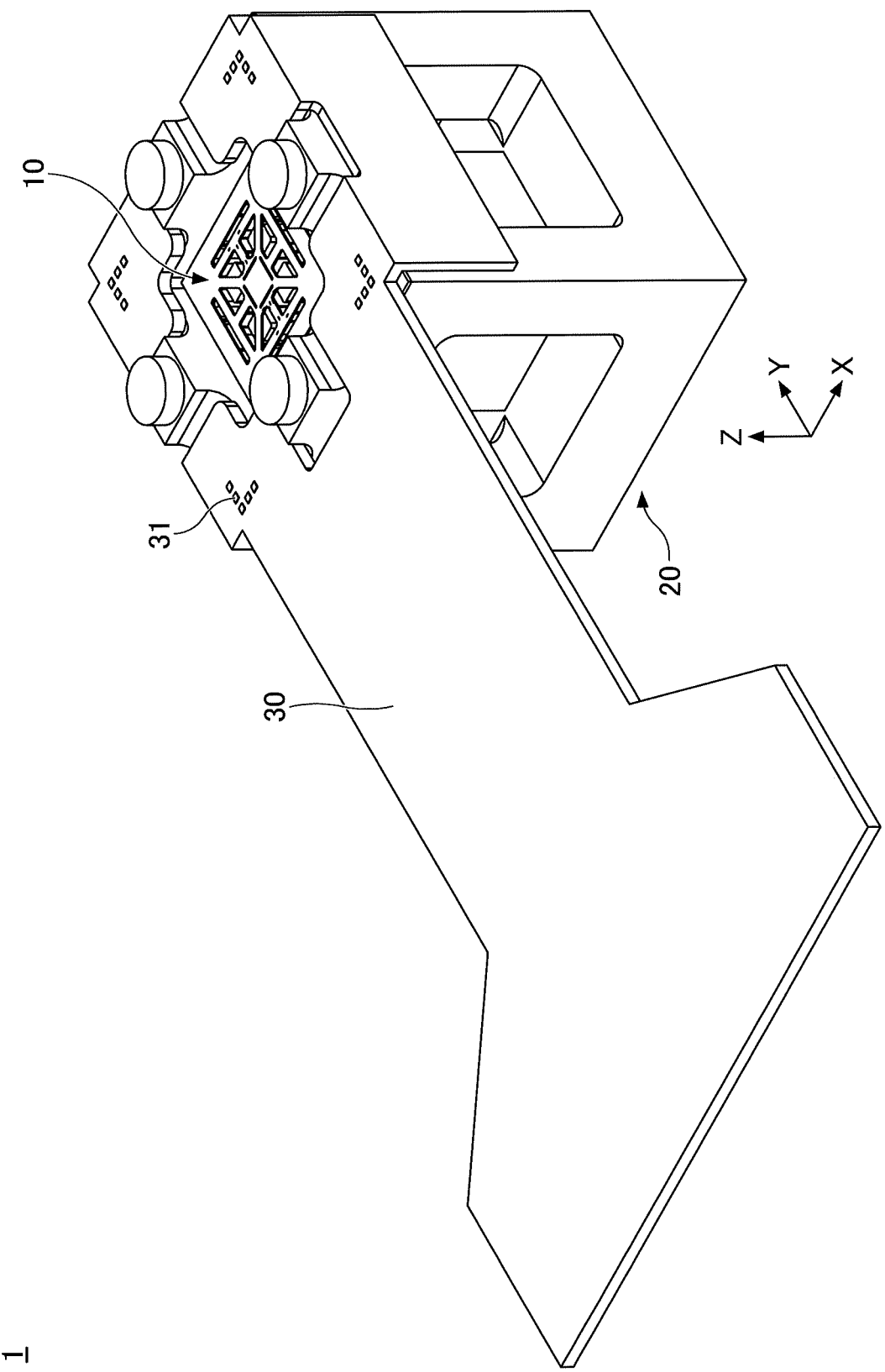
FIG. 1 is a perspective view illustrating an example of a force sensor device in a first embodiment.

Embodiments of the present invention will be described hereunder, by referring to the drawings. In each of the figures, identical constituent parts are designated by identical reference numerals, and repeated description of the same constituent parts may be omitted.

First Embodiment

General Structure of Force Sensor Device 1)

Figure 2:
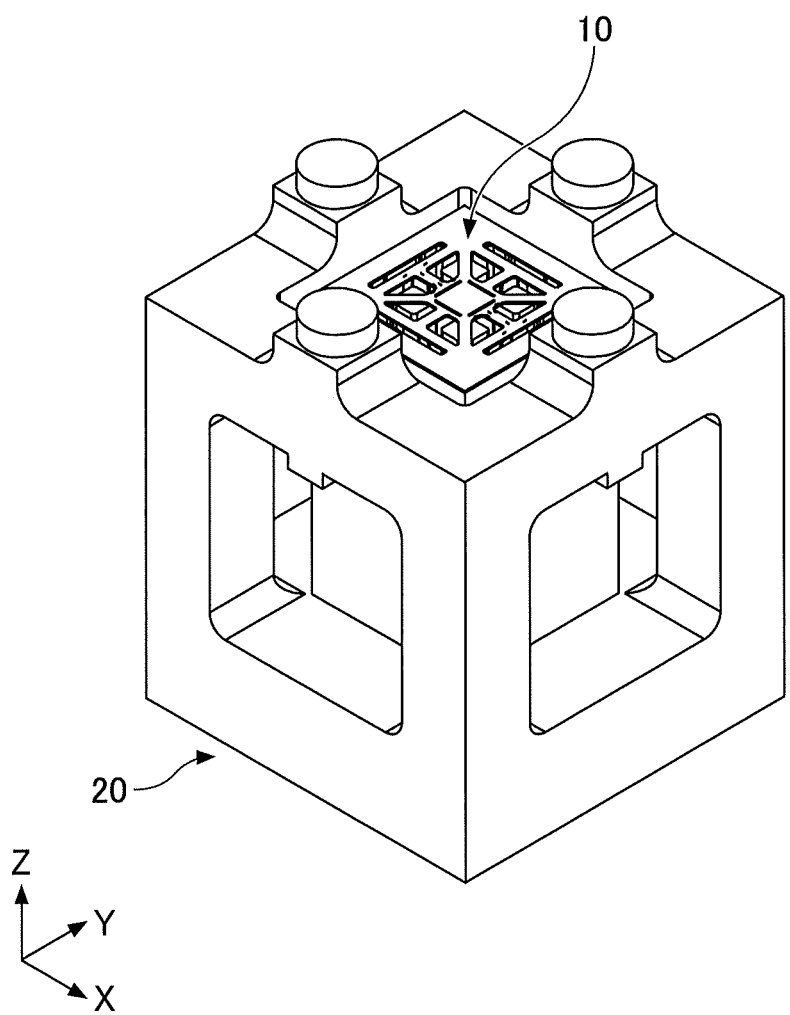
FIG. 2 is a perspective view illustrating an example of a sensor chip and a flexure element of the force sensor device in the first embodiment.

FIG. 1 is a perspective view illustrating an example of a force sensor device in a first embodiment. FIG. 2 is a perspective view illustrating an example of a sensor chip and a flexure element of the force sensor device in the first embodiment. As illustrated in FIG. 1 and FIG. 2, a force sensor device 1 includes a sensor chip 10, a flexure element 20, and an input and output substrate 30. The force sensor device 1 is a multiaxial force sensor device that is mounted on an arm, a finger, or the like of a robot that is used by machine tools or the like, for example.

The sensor chip 10 is bonded to an upper surface of the flexure element 20 so as not to project from the flexure element 20. In addition, one end of the input and output substrate 30 that inputs and outputs signals with respect to the sensor chip 10 is bonded to the upper surface and side surfaces of the flexure element 20. The sensor chip 10 and each electrode 31 of the input and output substrate 30 are electrically connected by a bonding wire or the like (not illustrated). Terminals (not illustrated), that can make electrical input and output with respect to a control device or the like connected to the force sensor device 1, are arranged on the other end of the input and output substrate 30.

For the sake of convenience in this embodiment, in the force sensor device 1, the side of the flexure element 2 provided with the input and output substrate 30 will be referred to as an upper side or one side, and an opposite side of the flexure element 2 will be referred to as a lower side or the other side. Further, in each part, a surface on the side of the flexure element 2 provided with the input and output substrate 30 will be referred to as one surface or an upper surface, and a surface on the opposite side of the flexure element 2 will be referred to as the other surface of a lower surface. However, the force sensor device 1 may be used in an up-side-down state, or may be arranged at an arbitrary inclination angle. In addition, a plan view of a target part indicates a view in a normal direction (Z-axis direction) to the upper surface of the sensor chip 10, and a planar shape of the target part indicates a shape when viewed in the normal direction (Z-axis direction) to the upper surface of the sensor chip 10.

(Sensor Chip 10)

Figure 3A:
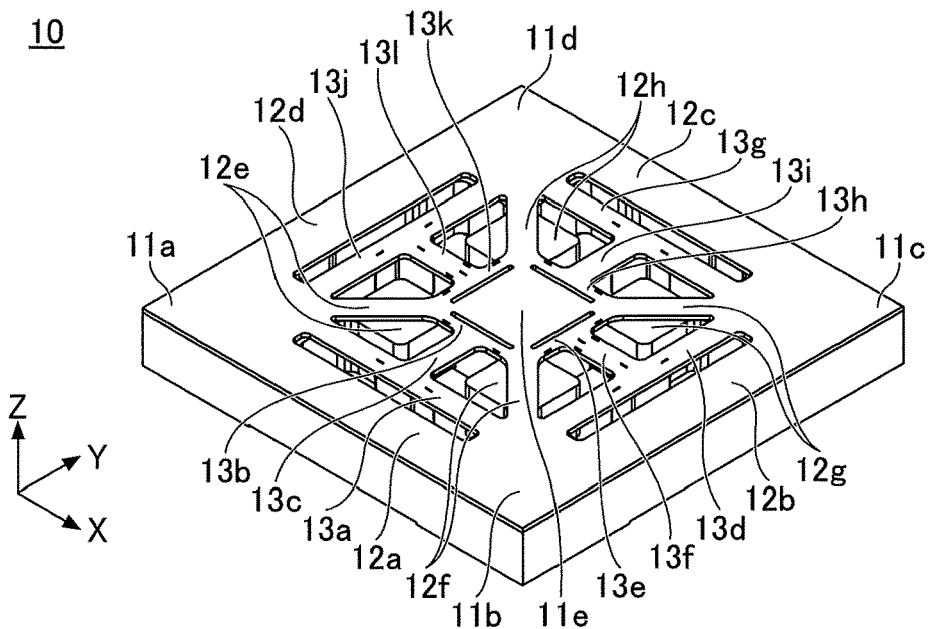
FIG. 3A is a diagram (part 1) of a sensor chip 10 viewed from above in a Z-axis direction.
Figure 3B:
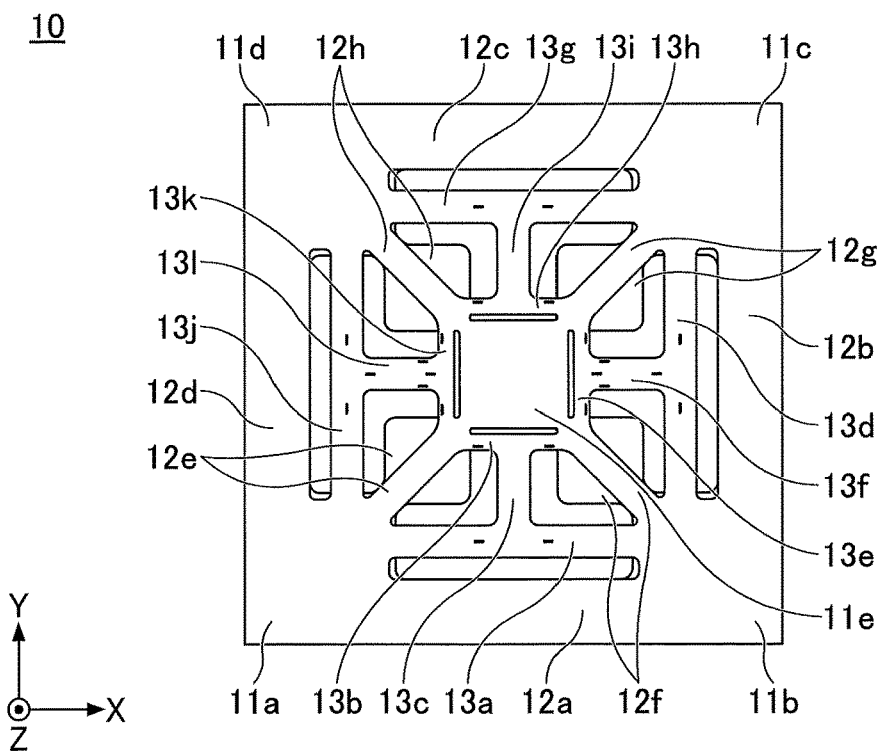
FIG. 3B is a diagram (part 2) of the sensor chip 10 viewed from above in the Z-axis direction.
Figure 4A:
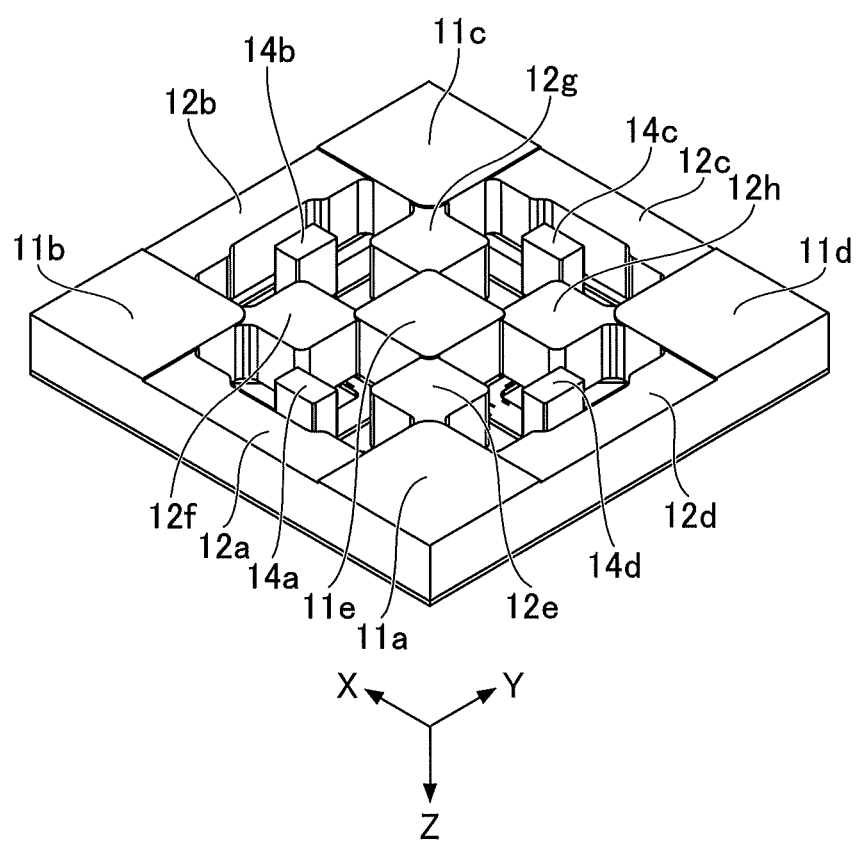
FIG. 4A is a diagram (part 1) of the sensor chip 10 viewed from below in the Z-axis direction.
Figure 4B:
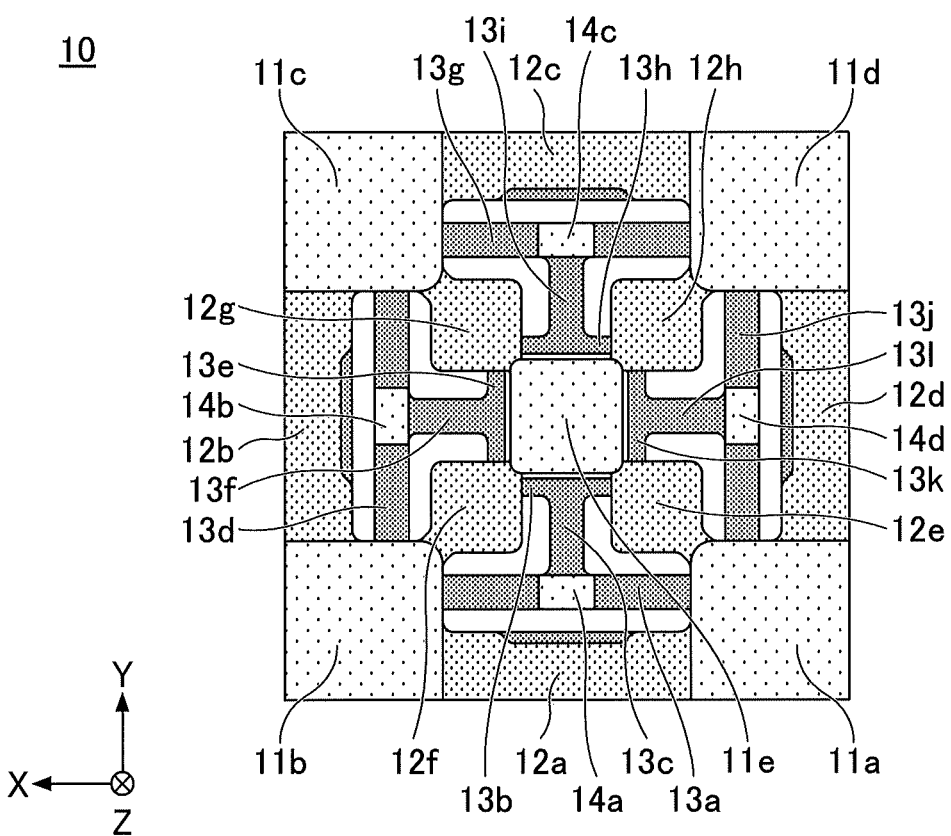
FIG. 4B is a diagram (part 2) of the sensor chip 10 viewed from below in the Z-axis direction.

FIG. 3A is a perspective view of the sensor chip 10 viewed from above in the Z-axis direction, and FIG. 3B is a plan view of the sensor chip 10 viewed from above in the Z-axis direction. FIG. 4A is a perspective view of the sensor chip 10 viewed from below in the Z-axis direction, and FIG. 4B is a bottom view of the sensor chip 10 viewed from below in the Z-axis direction. For the sake of convenience, surfaces having the same height in FIG. 4B are indicated by the same dot pattern. A direction parallel to one side of the upper surface of the sensor chip 10 is an X-axis direction, a direction perpendicular to the one side of the upper surface of the sensor chip 10 is a Y-axis direction, and a thickness direction of the sensor chip 10 (normal direction to the upper surface of the sensor chip 10) is the Z-axis direction. The X-axis direction, the Y-axis direction, and the Z-axis direction are perpendicular to each other.

The sensor chip 10 illustrated in FIG. 3A, FIG. 3B, FIG. 4A, and FIG. 4B is a MEMS (Micro Electro Mechanical Systems) sensor chip capable of detection in up to 6 axes at maximum by a single chip, and is formed on a semiconductor substrate such as a SOT (Silicon On Insulator) substrate or the like. The planar shape of the sensor chip 10 may be a square shape having a side of approximately 3000 μm, for example.

The sensor chip 10 includes 5 columnar support parts 11a through 11e. The planar shape of the support parts 11a through 11d may be a square shape having a side of approximately 500 μm, for example. The support parts 11a through 11d forming first support parts are arranged at four corners of the sensor chip 10. The support part 11e forming a second support part is arranged at a center of the support parts 11a through 11d.

The support parts 11a through 11e may be formed by an active layer, a BOX layer, and a support layer of the SOI substrate, for example, and thicknesses of the support parts 11a through 11e may be approximately 500 μm, for example.

A reinforcing beam 12a for structural reinforcement, having both ends thereof respectively fixed to the support part 11a and the support part 11b (connecting the adjacent support parts), is provided between the support part 11a and the support part 11b. A reinforcing beam 12b for structural reinforcement, having both ends thereof respectively fixed to the support part 11b and the support part 11c (connecting the adjacent support parts), is provided between the support part 11b and the support part 11c.

A reinforcing beam 12c for structural reinforcement, having both ends thereof respectively fixed to the support part 11c and the support part 11d (connecting the adjacent support parts), is provided between the support part 11c and the support part 11d. A reinforcing beam 12d for structural reinforcement, having both ends thereof respectively fixed to the support part lid and the support part 11a (connecting the adjacent support parts), is provided between the support part 11d and the support part 11a.

In other words, the 4 reinforcing beams 12a, 12b, 12c, and 12d forming first reinforcing beams are formed in a frame shape, and corner parts of the frame shape where each of the reinforcing beams intersect each other form the support parts 11b, 11c, 11d, and 11a.

The corner part on an inner side of the support part 11a and an opposing corner part of the support part 11e are connected by a reinforcing beam 12e for structural reinforcement. The corner part on an inner side of the support part 11b and an opposing corner part of the support part 11e are connected by a reinforcing beam 12f for structural reinforcement.

The corner part on an inner side of the support part 11c and an opposing corner part of the support part 11e are connected by a reinforcing beam 12g for structural reinforcement. The corner part on an inner side of the support part 11d and an opposing corner part of the support part 11e are connected by a reinforcing beam 12h for structural reinforcement. The reinforcing beams 12e through 12h forming second reinforcing beams are arranged obliquely with respect to the X-axis direction (Y-axis direction). In other words, the reinforcing beams 12e through 12h are arranged non-parallel with respect to the reinforcing beams 12a, 12b, 12c, and 12d.

The reinforcing beams 12a through 12h may be formed by the active layer, the BOX layer, and the support layer of the SOI substrate, for example. Sizes (widths along a lateral direction) of the reinforcing beams 12a through 12h may be approximately 140 μm, for example. Upper surfaces of the reinforcing beams 12a through 12h and upper surfaces of the support parts 11a through 11e respectively 11e on approximately the same plane.

On the other hand, lower surfaces of the reinforcing beams 12a through 12h respectively cave in from lower surfaces of the support parts 11a through 11e and lower surfaces of force application points 14a through 14d by approximately several tens of μm toward the upper surfaces of the reinforcing beams 12a through 12h. Such caved-in structures prevent the lower surfaces of the reinforcing beams 12a through 12h from contacting an opposing surface of the flexure element 20, when bonding the sensor chip 10 on the flexure element 20.

By arranging, separately from detecting beams for detecting the distortion, the reinforcing beams that are thicker and more rigid than the detecting beams, it is possible to increase the rigidity of the entire sensor chip 10. Accordingly, parts other than the detecting beams are uneasily deformed in response to the input, to make it possible to obtain satisfactory sensor properties.

A detecting beam 13a for detecting the distortion, having both ends thereof respectively fixed to the support part 11a and the support part 11b (connecting the adjacent support parts), is provided on an inner side of the reinforcing beam 12a between the support part 11a and the support part 11b, in parallel with respect to the reinforcing beam 12a and with a predetermined gap from the reinforcing beam 12a.

A detecting beam 13b is provided between the detecting beam 13a and the support part 11e, in parallel with respect to the detecting beam 13a and with a predetermined gap from each of the detecting beam 13a and the support beam 11e. The detecting beam 13b connects an end part of the reinforcing beam 12e on the side of the support part 11e, and an end part of the reinforcing beam 12f on the side of the support part 11e.

An approximate center part of the detecting beam 13a along a longitudinal direction, and an approximate center part of the opposing detecting beam 13b in the longitudinal direction, are connected by a detecting beam 13c for detecting the distortion, arranged perpendicularly to the detecting beam 13a and the detecting beam 13b.

A detecting beam 13d for detecting the distortion, having both ends thereof respectively fixed to the support part 11b and the support part 11c (connecting the adjacent support parts), is provided on an inner side of the reinforcing beam 12b between the support part 11b and the support part 11c, in parallel with respect to the reinforcing beam 12b and with a predetermined gap from the reinforcing beam 12b.

A detecting beam 13e is provided between the detecting beam 13d and the support part 11e, in parallel with respect to the detecting beam 13d and with a predetermined gap from each of the detecting beam 13d and the support beam 11e. The detecting beam 13e connects the end part of the reinforcing beam 12f on the side of the support part 11e, and an end part of the reinforcing beam 12g on the side of the support part 11e.

An approximate center part of the detecting beam 13d along the longitudinal direction, and an approximate center part of the opposing detecting beam 13e in the longitudinal direction, are connected by a detecting beam 13f for detecting the distortion, arranged perpendicularly to the detecting beam 13d and the detecting beam 13e.

A detecting beam 13g for detecting the distortion, having both ends thereof respectively fixed to the support part 11c and the support part 11d (connecting the adjacent support parts), is provided on an inner side of the reinforcing beam 12c between the support part 11c and the support part 11d, in parallel with respect to the reinforcing beam 12c and with a predetermined gap from the reinforcing beam 12c.

A detecting beam 13h is provided between the detecting beam 13g and the support part 11e, in parallel with respect to the detecting beam 13g and with a predetermined gap from each of the detecting beam 13g and the support beam 11e. The detecting beam 13h connects the end part of the reinforcing beam 12g on the side of the support part 11e, and an end part of the reinforcing beam 12h on the side of the support part 11e.

An approximate center part of the detecting beam 13g along the longitudinal direction, and an approximate center part of the opposing detecting beam 13h in the longitudinal direction, are connected by a detecting beam 13i for detecting the distortion, arranged perpendicularly to the detecting beam 13g and the detecting beam 13h.

A detecting beam 13i for detecting the distortion, having both ends thereof respectively fixed to the support part 11d and the support part 11a (connecting the adjacent support parts), is provided on an inner side of the reinforcing beam 12d between the support part 11d and the support part 11a, in parallel with respect to the reinforcing beam 12d and with a predetermined gap from the reinforcing beam 12d.

A detecting beam 13k is provided between a detecting beam 13j and the support part 11e, in parallel with respect to the detecting beam 13j and with a predetermined gap from each of the detecting beam 13j and the support beam 11e.

The detecting beam 13k connects the end part of the reinforcing beam 12h on the side of the support part 11e, and the end part of the reinforcing beam 12e on the side of the support part 11e.

An approximate center part of the detecting beam 13j along the longitudinal direction, and an approximate center part of the opposing detecting beam 13k in the longitudinal direction, are connected by a detecting beam 13l for detecting the distortion, arranged perpendicularly to the detecting beam 13j and the detecting beam 13k.

The detecting beams 13a through 13l are provided on upper ends of the support parts 11a through 11e along the thickness direction, and may be formed by the active layer of the SOI substrate, for example. Sizes (widths along the lateral direction) of the detecting beams 13a through 13l may be approximately 75 μm, for example. Upper surfaces of the detecting beams 13a through 13l and the upper surfaces of the support parts 11a through 11e respectively 11e on approximately the same plane. Thicknesses of the detecting beams 13a through 13l may be approximately 50 μm, for example.

The force application point 14a is provided on the lower surface at the center part along the longitudinal direction of the detecting beam 13a (intersection of the detecting beam 13a and the detecting beam 13c). A set of detection block is formed by the detecting beams 13a, 13b, and 13c and the force application point 14a.

The force application point 14b is provided on the lower surface at the center part along the longitudinal direction of the detecting beam 13d (intersection of the detecting beam 13d and the detecting beam 13f). A set of detection block is formed by the detecting beams 13d, 13e, and 13f and the force application point 14b.

The force application point 14c is provided on the lower surface at the center part along the longitudinal direction of the detecting beam 13g (intersection of the detecting beam 13g and the detecting beam 13i). A set of detection block is formed by the detecting beams 13g, 13h, and 13i and the force application point 14c.

The force application point 14d is provided on the lower surface at the center part along the longitudinal direction of the detecting beam 13j (intersection of the detecting beam 13j and the detecting beam 13l). A set of detection block is formed by the detecting beams 13j, 13k, and 13l and the force application point 14d.

The force application points 14a through 14d are points where the external force is applied, and may be formed by the BOX layer and the support layer of the SOI substrate, for example. Lower surfaces of the force application points 14a through 14d and lower surfaces of the support parts 11a through 11e respectively 11e on approximately the same plane.

Accordingly, a different beam deformation is obtained for each kind of force, by inputting the force or the displacement from the 4 force application points 14a through 14d, and thus, it is possible to provide a sensor having satisfactory properties for isolating the 6 axes.

From a viewpoint of reducing stress concentration in the sensor chip 10, parts forming inside corners are preferably rounded.

Figure 5:
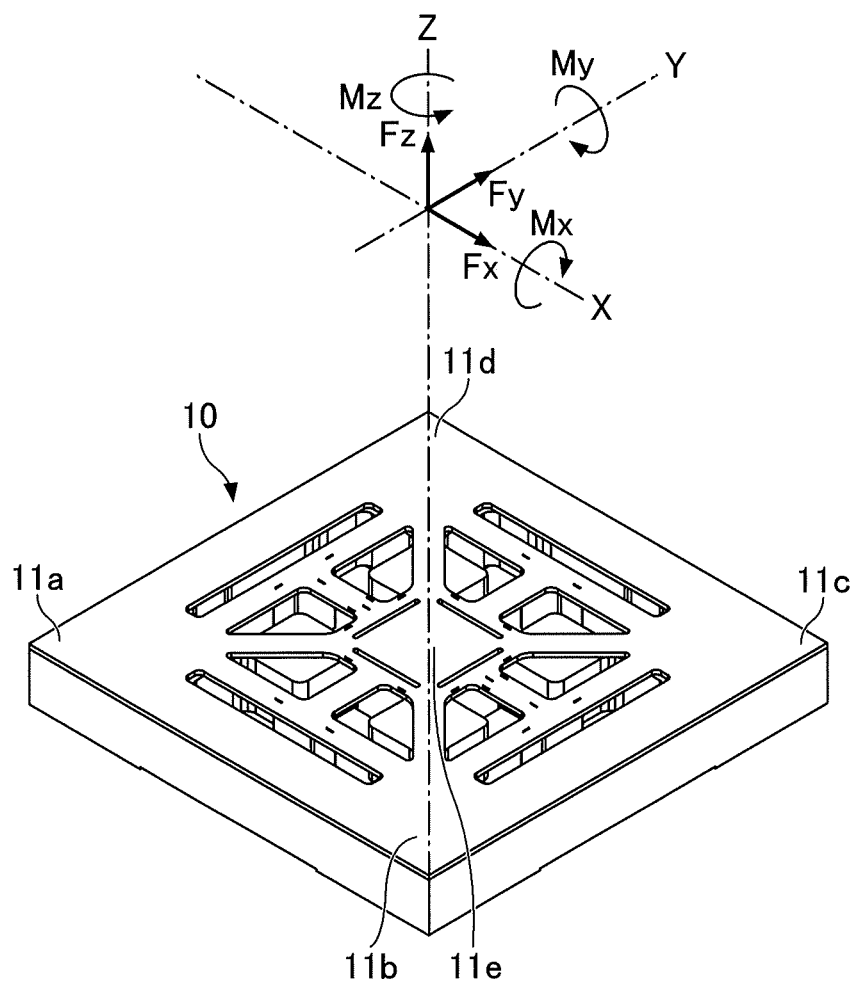
FIG. 5 is a diagram for explaining signs of forces applied on each of axes and moments.

FIG. 5 is a diagram for explaining signs of forces applied on each of axes and moments. As illustrated in FIG. 5, a force in the X-axis direction is denoted by Fx, a force in the Y-axis direction is denoted by Fy, and a force in the Z-axis direction is denoted by Fz. In addition, a moment causing a rotation around the X-axis as a rotation axis is denoted by Mx, a moment causing a rotation around the Y-axis as the rotation axis is denoted by My, and a moment causing a rotation around the Z-axis is denoted by Mz.

Figure 6:
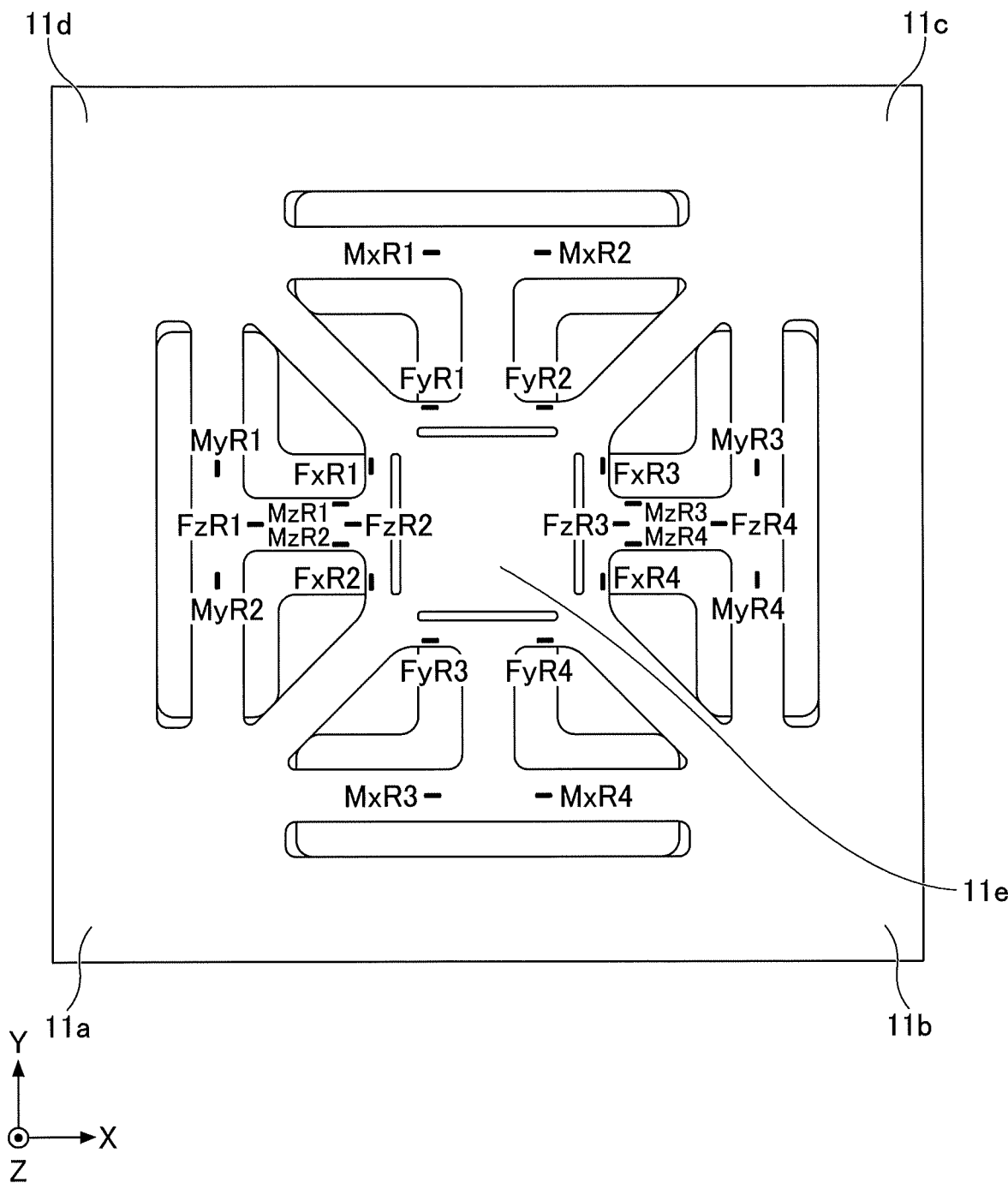
FIG. 6 is a diagram illustrating an example of an arrangement of piezoresistive devices of the sensor chip 10.

FIG. 6 is a diagram illustrating an example of an arrangement of piezoresistive devices of the sensor chip 10. The piezoresistive devices are arranged at predetermined positions of the detection blocks respectively corresponding to the 4 force application points 14a through 14d.

More particularly, as illustrated in FIG. 3A, FIG. 3B, and FIG. 6, in the detection block corresponding to the force application point 14a, piezoresistive devices MxR3 and MxR4 are arranged on a bisector that bisects the detecting beam 13a along the longitudinal direction, at symmetrical positions with respect to a bisector that bisects the detecting beam 13c along the longitudinal direction. In addition, piezoresistive devices FyR3 and FyR4 are arranged closer to the detecting beam 13a than a bisector that bisects the detecting beam 13b along the longitudinal direction, at symmetrical positions with respect to the bisector that bisects the detecting beam 13c along the longitudinal direction.

Further, in the detection block corresponding to the force application point 14b, piezoresistive devices MyR3 and MyR4 are arranged on a bisector that bisects the detecting beam 13d along the longitudinal direction, at symmetrical positions with respect to a bisector that bisects the detecting beam 13f along the longitudinal direction. In addition, piezoresistive devices FxR3 and FxR4 are arranged closer to the detecting beam 13d than a bisector that bisects the detecting beam 13e along the longitudinal direction, at symmetrical positions with respect to the bisector that bisects the detecting beam 13f along the longitudinal direction.

Moreover, piezoresistive devices MzR3 and MzR4 are arranged closer to the detecting beam 13e than a bisector that bisects the detecting beam 13f along the lateral direction, at symmetrical positions with respect to the bisector that bisects the detecting beam 13f along the longitudinal direction. In addition, piezoresistive devices FzR3 and FzR4 are arranged on the bisector that bisects the detecting beam 13f along the longitudinal direction, at symmetrical positions with respect to the bisector that bisects the detecting beam 13f along the lateral direction.

Further, in the detection block corresponding to the force application point 14c, piezoresistive devices MxR1 and MxR2 are arranged on a bisector that bisects the detecting beam 13g along the longitudinal direction, at symmetrical positions with respect to a bisector that bisects the detecting beam 13i along the longitudinal direction. In addition, piezoresistive devices FyR1 and FyR2 are arranged closer to the detecting beam 13g than a bisector that bisects the detecting beam 13h along the longitudinal direction, at symmetrical positions with respect to the bisector that bisects the detecting beam 13i along the longitudinal direction.

Moreover, in the detection block corresponding to the force application point 14d, piezoresistive devices MyR1 and MyR2 are arranged on a bisector that bisects the detecting beam 13j along the longitudinal direction, at symmetrical positions with respect to a bisector that bisects the detecting beam 13l along the longitudinal direction. In addition, piezoresistive devices FxR1 and FxR2 are arranged closer to the detecting beam 13j than a bisector that bisects the detecting beam 13k along the longitudinal direction, at symmetrical positions with respect to the bisector that bisects the detecting beam 13l along the longitudinal direction.

Further, piezoresistive devices MzR1 and MzR2 are arranged closer to the detecting beam 13k than a bisector that bisects the detecting beam 13l along the lateral direction, at symmetrical positions with respect to the bisector that bisects the detecting beam 13l along the longitudinal direction. In addition, piezoresistive devices FzR1 and FzR2 are arranged on the bisector that bisects the detecting beam 13l along the longitudinal direction, at symmetrical positions with respect to the bisector that bisects the detecting beam 13l along the lateral direction.

The piezoresistive devices FxR1 through FxR4 detect the force Fx, the piezoresistive devices FyR1 through FyR4 detect the force Fy, and the piezoresistive devices FzR1 through FzR4 detect the force Fz. In addition, the piezoresistive devices MxR1 through MxR4 detect the moment Mx, the piezoresistive devices MyR1 through MyR4 detect the moment My, and the piezoresistive devices MzR1 through MzR4 detect the moment Mz.

Accordingly, in the sensor chip 10, a plurality of piezoresistive devices are separately arranged in each of the detection blocks. Hence, the displacement in a predetermined axial direction can be detected in up to 6 axes at maximum, based on changes in outputs of the plurality of piezoresistive devices arranged on predetermined beams, according to the direction (axial direction) of the force or displacement applied (transmitted) to the force application points 14a through 14d.

More particularly, in the sensor chip 10, displacements (Mx, My, Fz) in the Z-axis direction can be detected based on the deformation of predetermined detecting beams. In other words, the moments (Mx, My) in the X-axis direction and the Y-axis direction can be detected based on the defamation of the detecting beams 13a, 13d, 13g, and 13j forming the first detecting beams. In addition, the force (Fz) in the Z-axis direction can be detected based on the deformation of the detecting beams 13f and 13l forming the third detecting beams.

Further, in the sensor chip 10, displacements (Fx, Fy, Mz) in the X-axis direction and the Y-axis direction can be detected based on the deformation of predetermined detecting beams. In other words, the forces (Fx, Fy) in the X-axis direction and the Y-axis direction can be detected based on the deformation of the detecting beams 13b, 13e, 13h, and 13k forming the second detecting beams. In addition, the moment (Mz) in the Z-axis direction can be detected based on the deformation of the detecting beams 13f and 13l forming the third detecting beams.

By varying the thickness and the width of each of the detecting beams, it is possible to make adjustments such as making detection sensitivities uniform, improving detection accuracy, or the like.

Of course, it is possible to reduce the number of piezoresistive devices, so that the sensor chip can detect the displacement in the predetermined axial direction in 5 axes or less.

Figure 7:
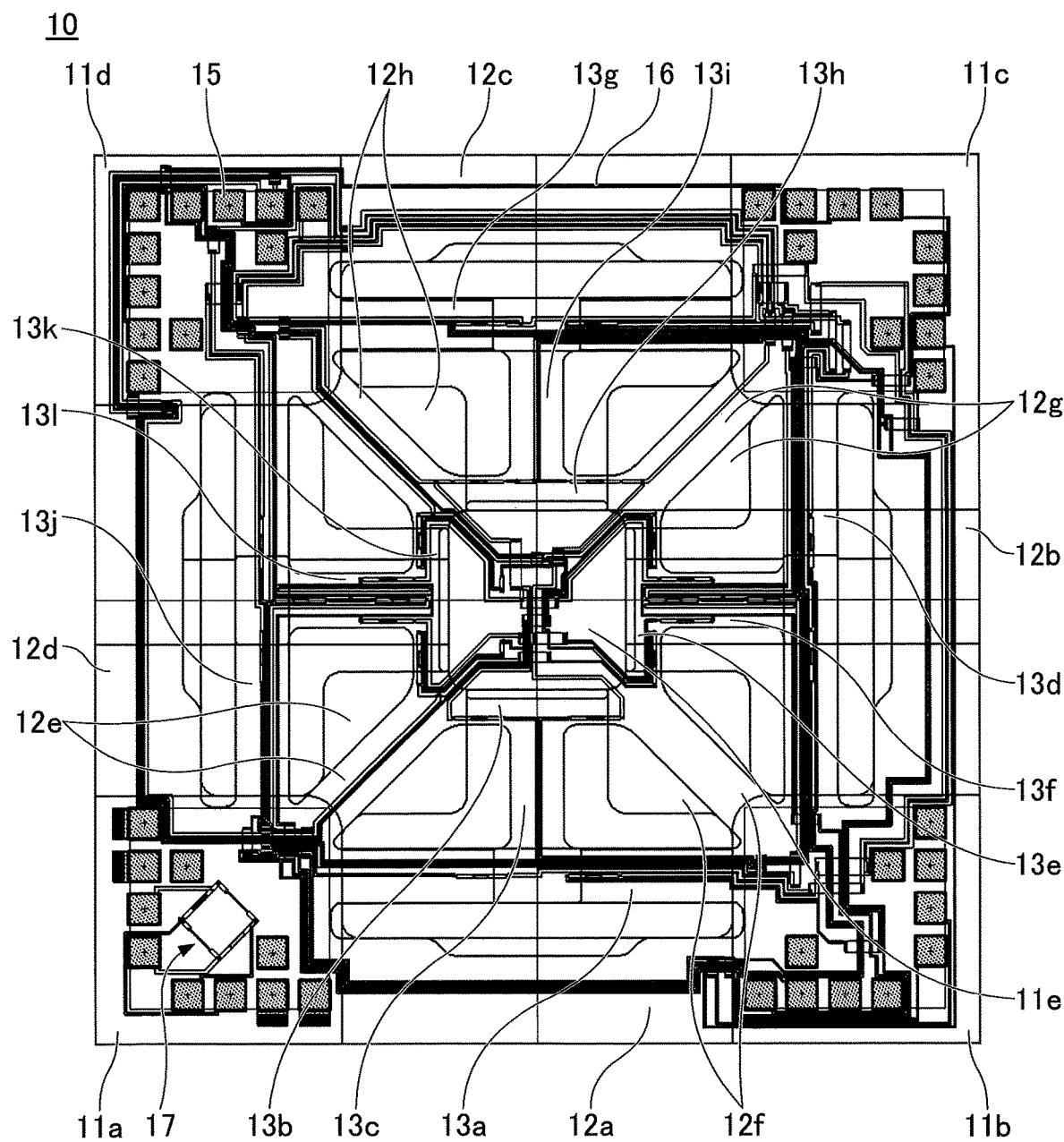
FIG. 7 is a diagram illustrating an example of an electrode arrangement and wiring of the sensor chip 10.

FIG. 7 is a diagram illustrating an example of an electrode arrangement and wiring of the sensor chip 10, and is a plan view of the sensor chip 10 viewed from above in the Z-axis direction. As illustrated in FIG. 7, the sensor chip 10 includes a plurality of electrodes 15 from which electrical signals are obtained. Each electrode 15 is arranged on the upper surface of the support parts 11a through 11d of the sensor chip 10 where the distortion is smallest when the force is applied to the force application points 14a through 14d. A wiring 16 from each piezoresistive device to the electrode 15 can be appropriately routed on each of the reinforcing beams and on each of the detecting beams.

Accordingly, because each of the reinforcing beams can also be used as a bypass if necessary when routing the wiring, it is possible to improve a degree of freedom of design of the wiring by arranging the reinforcing beams separately from the detecting beams. Hence, it is possible to arrange each of the piezoresistive devices at a more ideal position.

Figure 8:
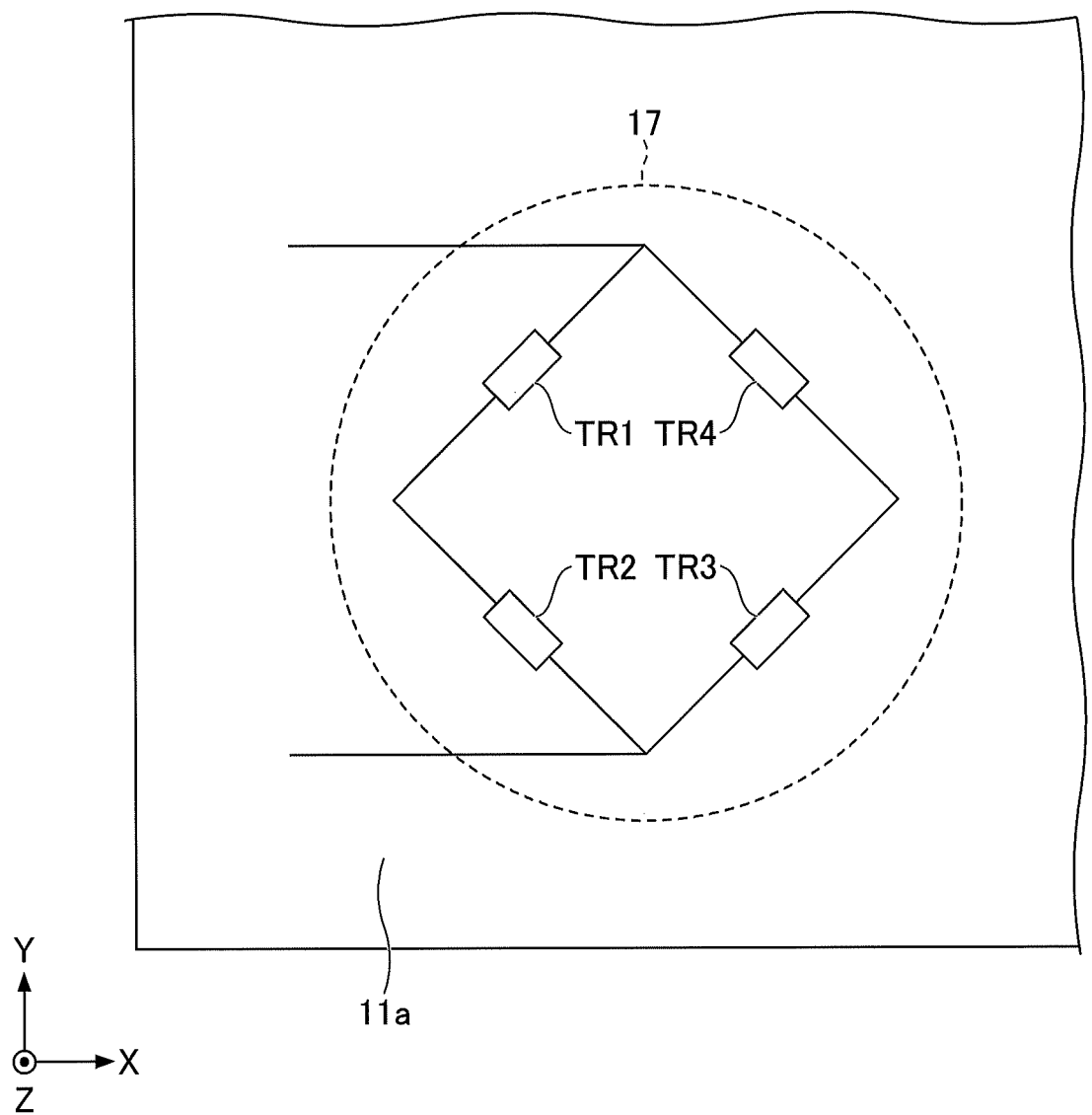
FIG. 8 is an enlarged plan view illustrating an example of a temperature sensor of the sensor chip 10.

FIG. 8 is an enlarged plan view illustrating an example of a temperature sensor of the sensor chip 10. As illustrated in FIG. 7 and FIG. 8, the sensor chip 10 is provided with a temperature sensor 17 for performing a temperature correction on the piezoresistive devices that are used for the distortion detection. The temperature sensor 17 has a structure in which 4 piezoresistive devices TR1, TR2, TR3, and TR4 are connected in a bridge connection.

Among the piezoresistive devices TR1, TR2, TR3, and TR4, 2 opposing piezoresistive devices have the same properties as the piezoresistive device MxR1 or the like used for the distortion detection. In addition, among the piezoresistive devices TR1, TR2, TR3, and TR4, the other 2 opposing piezoresistive devices have properties different from the properties of the piezoresistive device MxR1 or the like by varying an impurity concentration using an impurity semiconductor. Hence, the temperature detection becomes possible because the bridge becomes imbalanced due to a temperature change.

All of the piezoresistive devices (MxR1 or the like) used for the distortion detection are arranged horizontally or perpendicularly to a crystal orientation of the semiconductor substrate (silicon or the like) forming the sensor chip 10. For this reason, with respect to the same distortion, it is possible to obtain a larger resistance change, to improve a measurement accuracy of the applied force and the moment.

On the other hand, the piezoresistive devices TR1, TR2, TR3, and TR4 forming the temperature sensor 17 are arranged at a 45 degree inclination with respect to the crystal orientation of the semiconductor substrate (silicon or the like) forming the sensor chip 10. For this reason, it is possible to reduce the resistance change with respect to stress, to enable accurate detection of only the temperature change.

Further, the temperature sensor 17 is arranged on the upper surface of the support part 11a of the sensor chip 10, where the distortion is the smallest when the force is applied to the force application points 14a through 14d. Hence, it is possible to further reduce the resistance change with respect to the stress.

The piezoresistive device is a typical example of a distortion detection device used in the present invention.

(Flexure Element 20)

Figure 9:
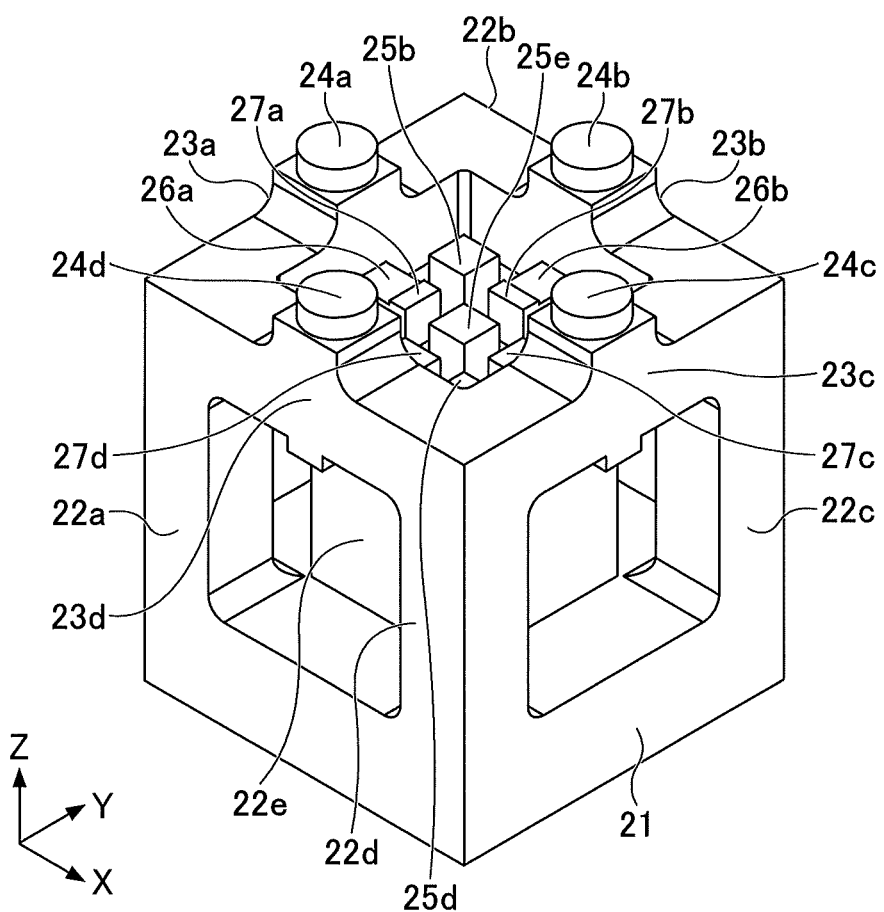
FIG. 9 is a perspective view illustrating an example of a flexure element 20.
Figure 10A:
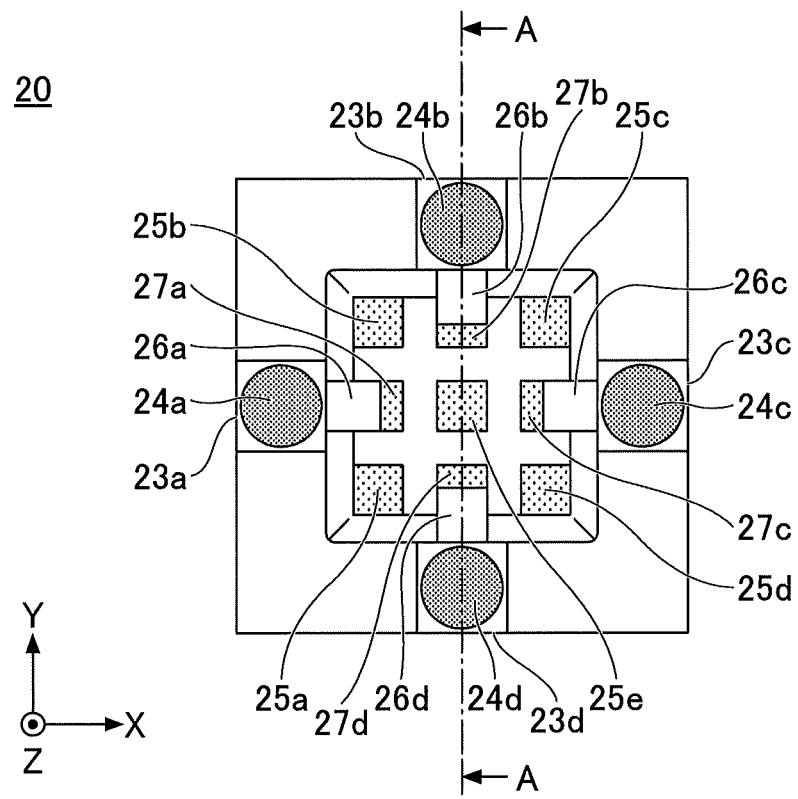
FIG. 10A is a diagram (part 1) illustrating the example of the flexure element 20.
Figure 10B:
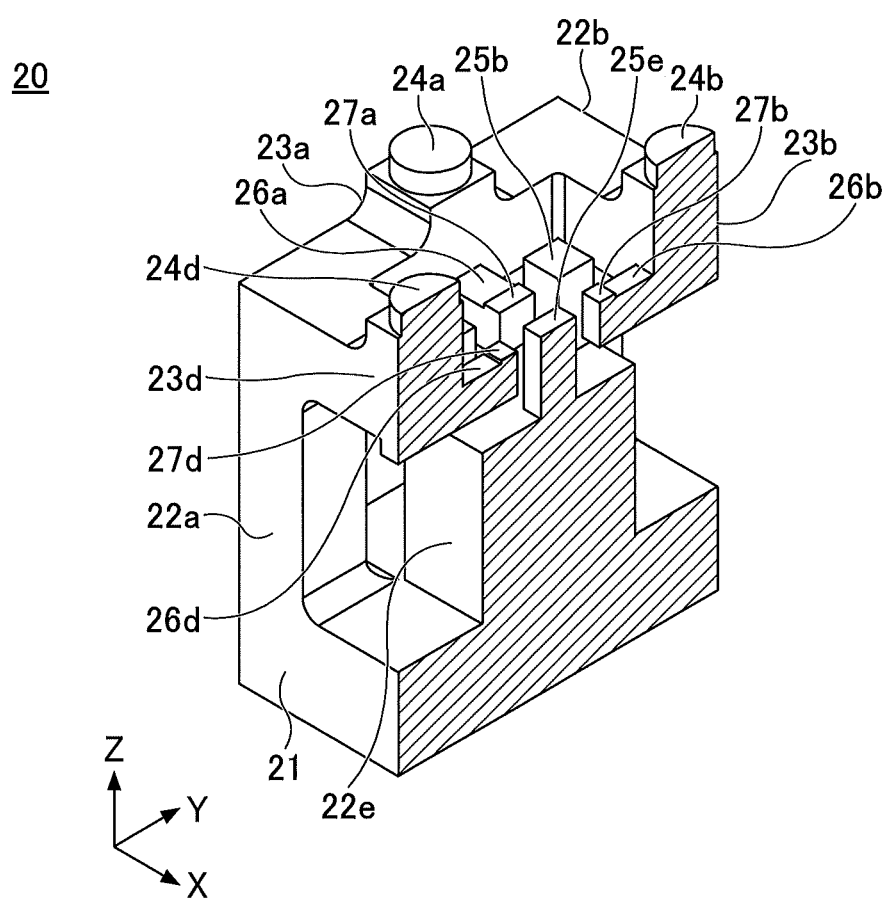
FIG. 10B is a diagram (part 2) illustrating the example of the flexure element 20.

FIG. 9 is a perspective view illustrating an example of the flexure element 20. FIG. 10A is a plan view illustrating the flexure element 20, and FIG. 10B is a perspective view of a cross section along a line A-A in FIG. 10A. For the sake of convenience, surfaces having the same height in FIG. 10A are indicated by the same dot pattern.

As illustrated in FIG. 9, FIG. 10A, and FIG. 10B, in the flexure element 20, 4 columns 22a through 22d forming first columns are arranged at four corners on a base 21, and 4 beams 23a through 23d foaming first beams and respectively connecting mutually adjacent columns are provided in a frame shape. In addition, a column 22e forming a second column is arranged at a center on the base 21. The column 22e is used to fix the sensor chip 10, and is formed to a size and length respectively larger and shorter than those of the columns 22a through 22d. The sensor chip 10 is fixed on the column 22e so as not to project from upper surfaces of the columns 22a through 22d.

The flexure element 20 has a general shape that is a parallelepiped with a vertical length of approximately 5000 μm, a horizontal length of approximately 5000 μm, and a height of approximately 7000 μm, for example. A transverse cross section of each of the columns 22a through 22d may have a square shape with a side of approximately 1000 μm, for example. A transverse cross section of the column 22e may have a square shape with a side of approximately 2000 μm, for example.

A projecting part, that projects upward from a center part along the longitudinal direction of each of the beams 23a through 23d, is provided on the upper surface of each of the beams 23a through 23d at the center part along the longitudinal direction, and for example, cylinder shaped input parts 24a trough 24d are provided on the respective projecting parts. The input parts 24a through 24d are parts where the external force is applied, and when the force is applied to the input parts 24a through 24d, the beams 23a through 23d and the columns 22a through 22d are deformed according to the applied force.

The column 22e is isolated from the beams 23a through 23d that are deformed by the applied force and the columns 22a through 22d that are deformed by the applied force. For this reason, the column 22e does not move (is not deformed by the applied force) even when the force is applied to the input parts 24a through 24d.

By providing the 4 input parts 24a through 24d, it is possible to improve the load capacity of the beams 23a through 23d when compared to a structure including a single input part, for example.

4 columns 25a through 25d forming third columns are arranged at four corners on the upper surface of the column 22e, and a column 25e forming a fourth column is arranged at a center part on the upper surface of the column 22e. The columns 25a through 25e are formed to the same height.

In other words, the upper surfaces of each of the columns 25a through 25e are located on the same plane. The upper surface of each of the columns 22a through 25e forms a bonding part that is bonded to a lower surface of the sensor chip 10. The columns 25a through 25e are isolated from the beams 23a through 23d that are deformed by the applied force, and from the columns 22a through 22d that are deformed by the applied force, and thus, the columns 25a through 25e will not move even when the force is applied to the input parts 24a through 24d (are not deformed by the applied force).

Beams 26a through 26d, that respectively project toward an inner side along the horizontal direction from a medial surface of each of the beams 23a through 23d, are provided at center parts along the longitudinal direction of the medial surfaces of the beams 23a through 23d, respectively. The beams 26a through 26d form second beams that transmit the deformations of the beams 23a through 23d and the columns 22a through 22d to the sensor chip 10. In addition, projecting parts 27a through 27d, that respectively project upward from a tip end side of an upper surface of each of the beams 26a through 26d, are provided at the tip end side of the upper surfaces of the beams 26a through 26d, respectively.

The projecting parts 27a through 27d are formed to the same height. In other words, upper surfaces of the projecting parts 27a through 27d are located on the same plane. The upper surface of each of the projecting parts 27a through 27d forms a bonding part that is bonded to the lower surface of the sensor chip 10. Because the beams 26a through 26d and the projecting parts 27a through 27d are connected to the beams 23a through 23d that form movable parts, the beams 26a through 26d and the projecting parts 27a through 27d are deformed according to the force applied to the input parts 24a through 24d.

In a state in which no force is applied to the input parts 24a through 24d, the upper surface of each of the columns 25a through 25e and the upper surface of each of the projecting parts 27a through 27d are located on the same plane.

In the flexure element 20, from a viewpoint of securing rigidity and manufacturing with a high accuracy, it is preferable that the base 21, the columns 22a through 22e, the beams 23a through 23d, the input parts 24a through 24d, the columns 25a through 25e, the beams 26a through 26d, and the projecting parts 27a through 27d are respectively formed integrally. A material used for the flexure element 20 may be a hard metal material such as SUS (stainless steel) or the like, for example. It is particularly preferable to use SUS630, that is hard and has a high mechanical strength, for the flexure element 20.

As described above, the flexure element 20 has a structure including the columns and the beams, similar to the structure of the sensor chip 10. For this reason, the flexure element 20 exhibits a different deformation in each of the 6 axes according to the applied force, and can thus transmit the deformations in the 6 axes with satisfactory isolation to the sensor chip 10.

In other words, the force applied to the input parts 24a through 24d of the flexure element 20 is transmitted to the sensor chip 10 via the columns 22a through 22d, the beams 23a through 23d, and the beams 26a through 26d, to detect the displacement by the sensor chip 10. Further, in the sensor chip 10, it is possible to obtain the output of each axis from the bridge circuit, where one bridge circuit is provided for one axis.

From a viewpoint of reducing stress concentration in the flexure element 20, parts forming inside corners are preferably rounded.

(Manufacturing Process of Force Sensor Device 1)

Figure 11A:
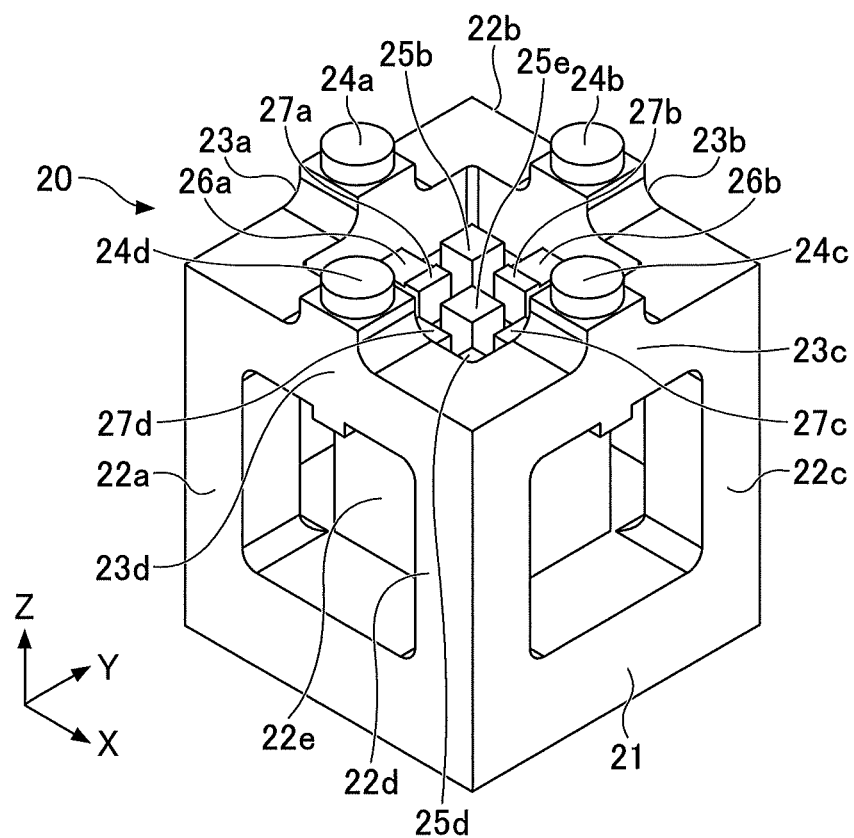
FIG. 11A is a diagram (part 1) illustrating an example of a manufacturing process of a force sensor device 1.

FIG. 11A through FIG. 13B are diagrams illustrating an example of a manufacturing process of the force sensor device 1. First, as illustrated in FIG. 11A, the flexure element 20 is manufactured. The flexure element 20 may be integrally formed by molding, cutting, wire electric discharging, or the like, for example. The material used for the flexure element 20 may be the hard metal material such as the SUS (stainless steel) or the like, for example. It is particularly preferable to use the SUS630, that is hard and has the high mechanical strength, for the flexure element 20. In a case in which the flexure element 20 is manufactured by molding, metal grains and a resin forming a binder are poured into a metal mold and molded, for example, and a sintering is thereafter performed to evaporate the resin, to manufacture the flexure element 20 made of the metal.

Figure 11B:
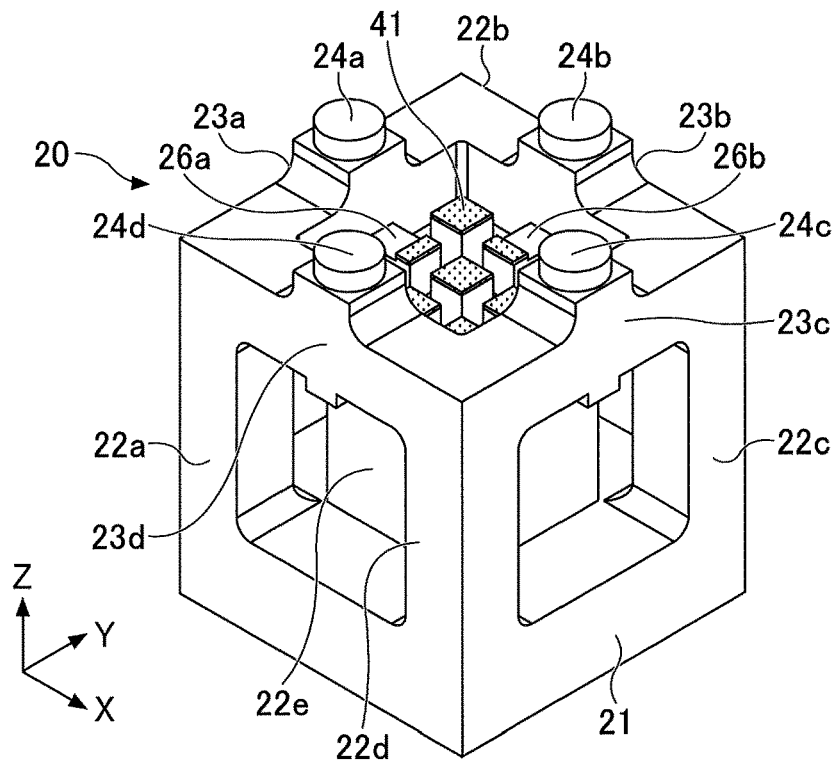
FIG. 11B is a diagram (part 2) illustrating the example of the manufacturing process of the force sensor device 1.

Next, in the process illustrated in FIG. 11B, ad adhesive agent 41 is coated on the upper surfaces of the columns 25a through 25e, and on the upper surfaces of the projecting parts 27a through 27d. For example, an epoxy adhesive agent or the like may be used for the adhesive agent 41. From a viewpoint of enduring pressure with respect to the external force that is applied, the adhesive agent 41 preferably has a Young's modulus of 1 GPa or higher, and is formed to a thickness of 20 μm or less.

Figure 12A:
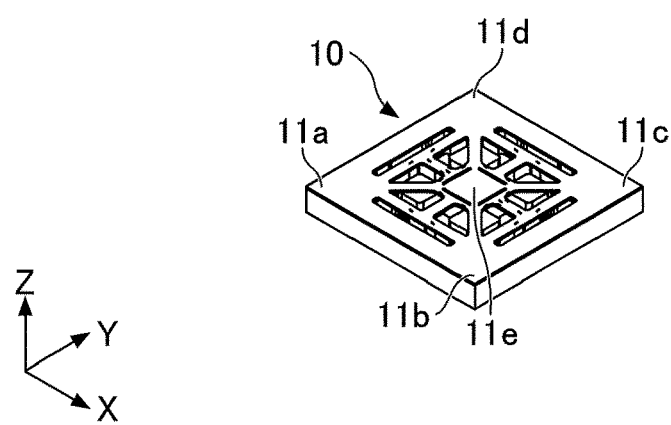
FIG. 12A is a diagram (part 3) illustrating the example of the manufacturing process of the force sensor device 1.

Next, in the process illustrated in FIG. 12A, the sensor chip 10 is manufactured. The sensor chip 10 may be manufactured by a known method that prepares a SOT substrate, for example, and performs an etching process (for example, reactive ion etching or the like) or the like on the prepared substrate. In addition, electrodes and wirings may be formed by depositing a metal layer made of copper or the like on the substrate surface by a sputtering process or the like, for example, and patterning the metal layer using photolithography.

Figure 12B:
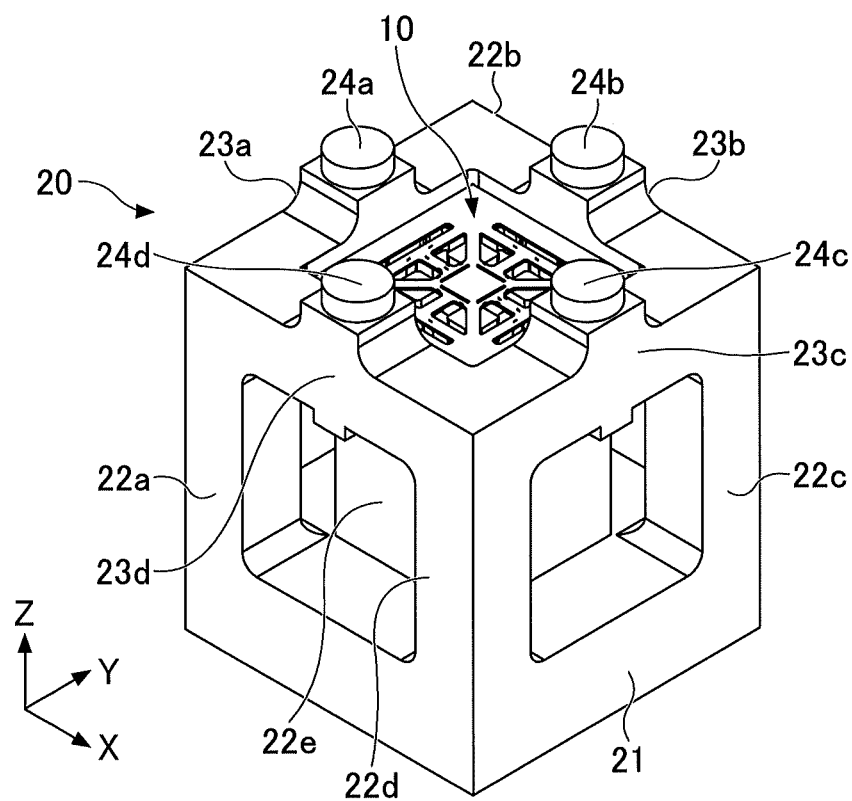
FIG. 12B is a diagram (part 4) illustrating the example of the manufacturing process of the force sensor device 1.

Next, in the process illustrated in FIG. 12B, the sensor chip 10 is arranged while pressing the sensor chip 10 within the flexure element 20, so that the lower surface of the sensor chip 10 contacts the adhesive agent 41 that is coated on the upper surfaces of the columns 25a through 25e and the upper surfaces of the projecting parts 27a through 27d. Then, the adhesive agent 41 is heated to a predetermined temperature and cured. As a result, the sensor chip 10 is fixed within the flexure element 20. More particularly, the support parts 11a through 11d of the sensor chip 10 are fixed on the columns 25a through 25e, respectively, the support part 11e is fixed on the column 25e, and the force application points 14a through 14d are fixed on the projecting parts 27a through 27d, respectively.

Figure 13A:
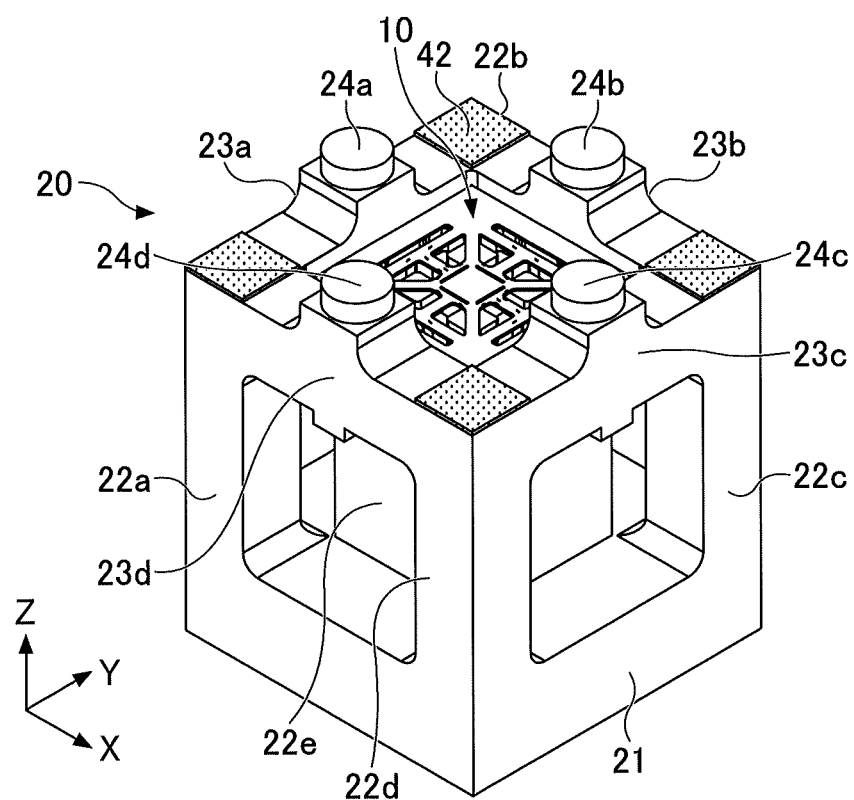
FIG. 13A is a diagram (part 5) illustrating the example of the manufacturing process of the force sensor device 1.

Next, in the process illustrated in FIG. 13A, an adhesive agent 42 is coated on the upper surfaces of the columns 22a through 22d. For example, an epoxy adhesive agent or the like may be used for the adhesive agent 42. The adhesive agent 42 is used to fix the input and output substrate 30 on the flexure element 20, and no external force is applied thereto, and thus, a general-purposes adhesive may be used for the adhesive agent 42.

Figure 13B:
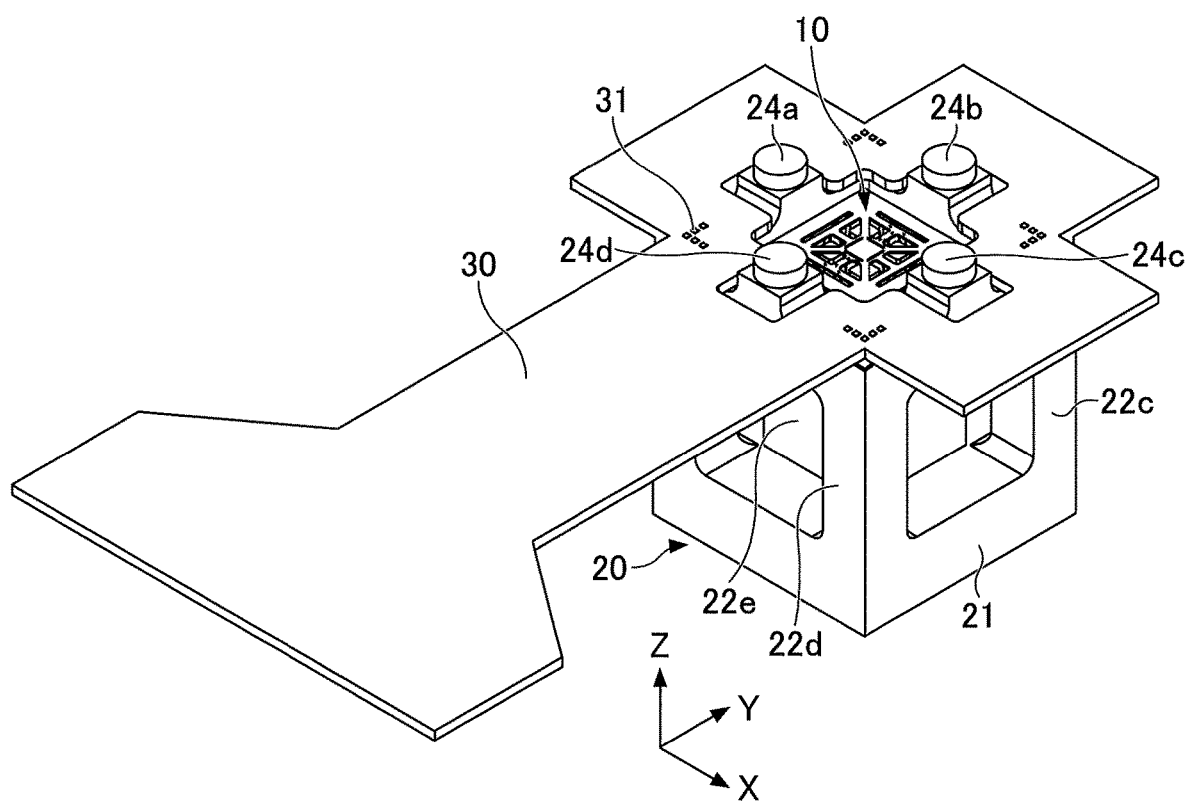
FIG. 13B is a diagram (part 6) illustrating the example of the manufacturing process of the force sensor device 1.

Next, in the process illustrated in FIG. 13B, the input and output substrate 30 is prepared, and the input and output substrate 30 is arranged on the flexure element 20, so that a lower surface of the input and output substrate 30 contacts the adhesive agent 42 that is coated on the upper surfaces of the columns 22a through 22d. In addition, the adhesive agent 42 is heated to a predetermined temperature and cured while pressing the input and output substrate 30 towards the flexure element 20. As a result, the input and output substrate 30 is fixed on the flexure element 20.

The input and output substrate 30 is fixed to the flexure element 20 so as to expose the sensor chip 10 and the input parts 24a through 24d. Each electrode 31 of the input and output substrate 30 is preferably arranged on the columns 22a through 22d of the flexure element 20 where the distortion is smallest when the force is applied to the input parts 24a through 24d.

Thereafter, parts (excluding input terminal side) of the input and output substrate 30, protruding in the horizontal direction from the flexure element 20, are bend toward side surfaces of the flexure element 20. In addition, corresponding parts of the input and output substrate 30 and the sensor chip 10 are electrically connected by bonding wires or the like (not illustrated). As a result, the force sensor device 1 illustrated in FIG. 1 is completed.

As described above, the force sensor device 1 can be manufactured using only 3 components, namely, the sensor chip 10, the flexure element 20, and the input and output substrate 30, and for this reason, the force sensor device 1 can be assembled with ease. Further, because locations requiring alignment can be reduced to a minimum, it is possible to reduce deterioration in the accuracy caused by mounting.

In addition, in the flexure element 20, parts (the upper surfaces of the columns 25a through 25e, and the upper surfaces of the projecting parts 27a through 27d) connecting to the sensor chip 10 are all located on the same plane. Accordingly, the alignment of the sensor chip 10 with respect to the flexure element 20 is only required once, and the sensor chip 10 can be mounted on the flexure element 20 with ease.

(Stress Simulation)

Figure 14:
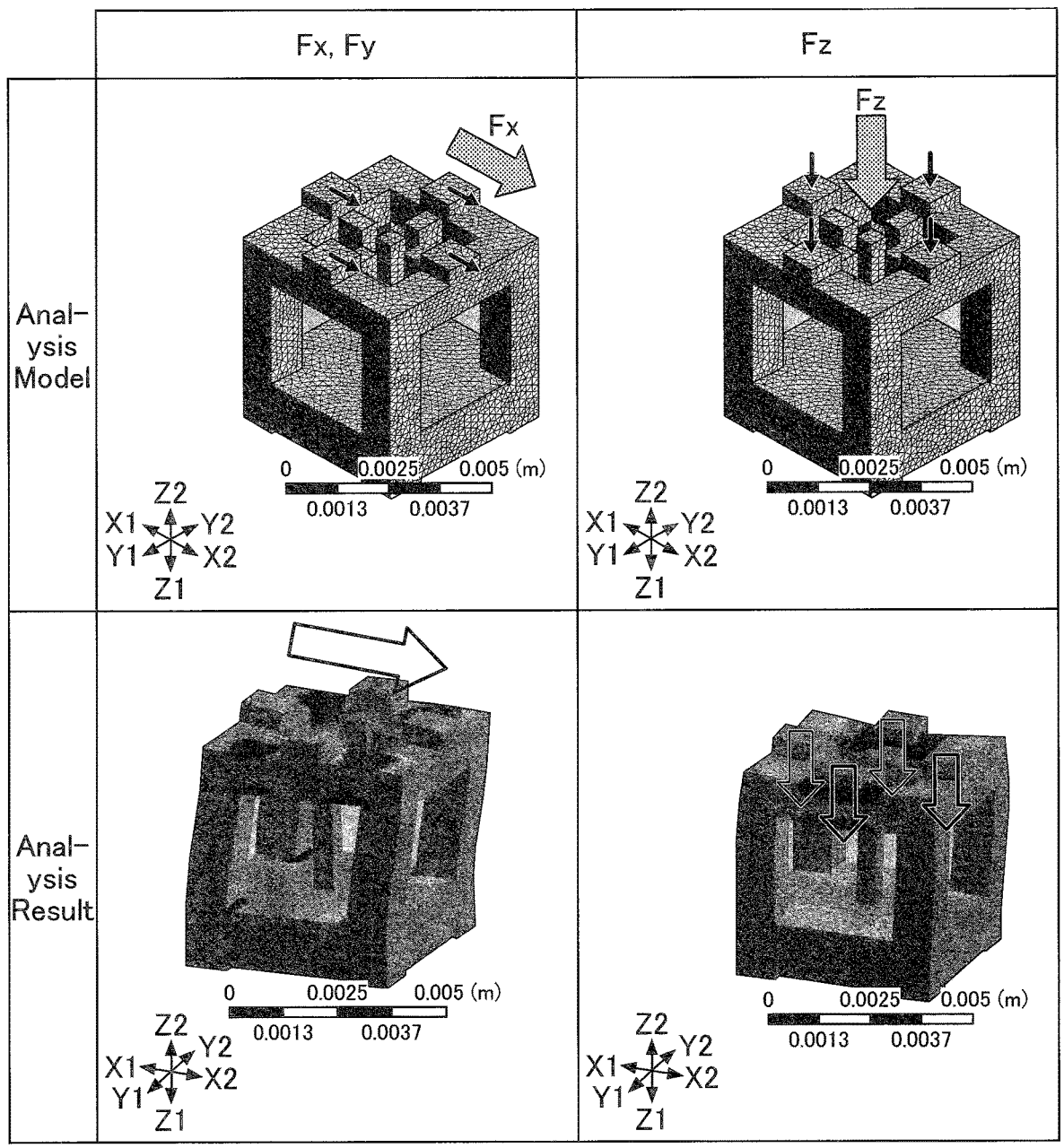
FIG. 14 is a simulation result (part 1) of deformation (distortion) when force and moment are applied to the flexure element.
Figure 15:
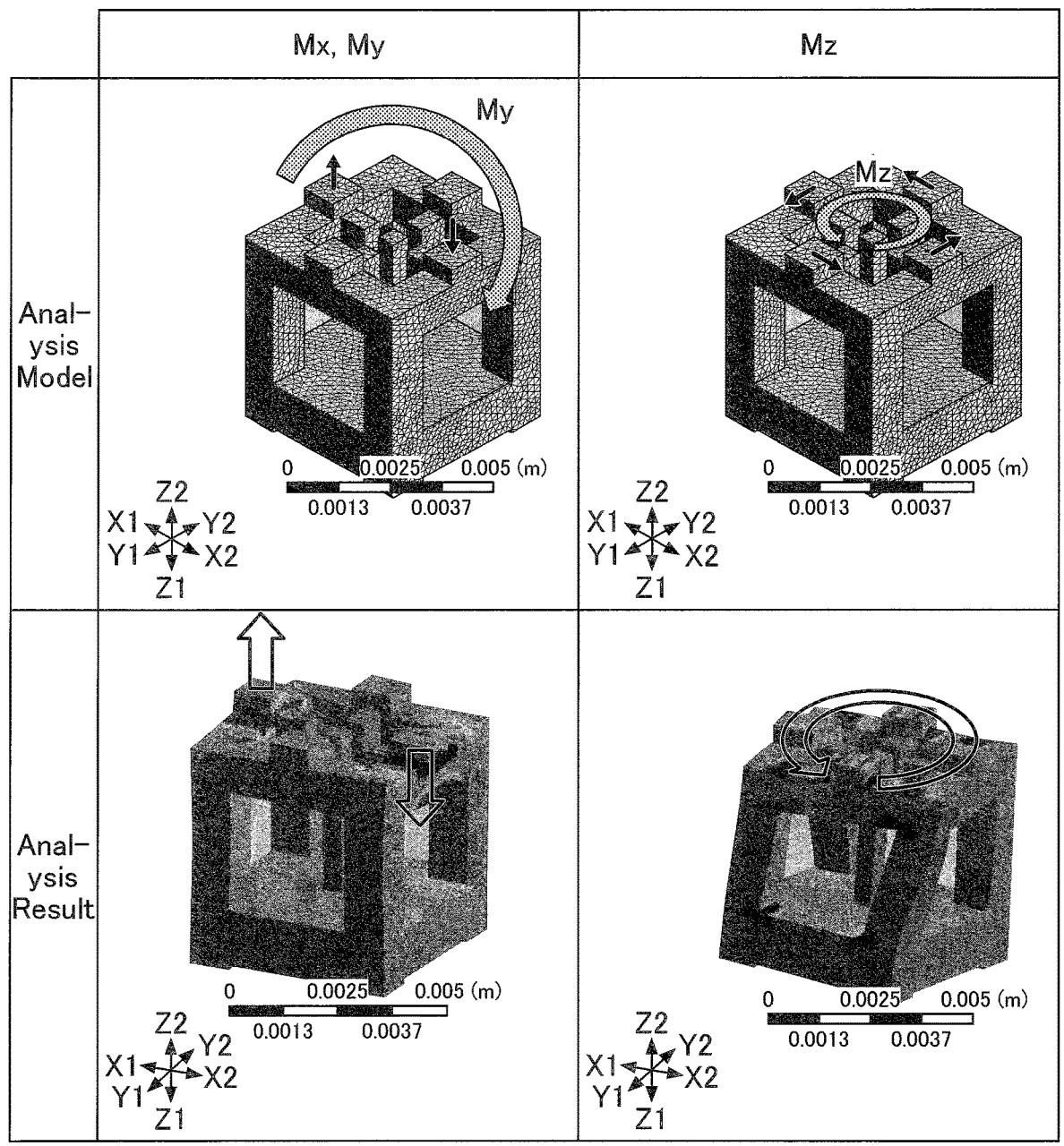
FIG. 15 is a simulation result (part 2) of the deformation (distortion) when the force and moment are applied to the flexure element.

FIG. 14 and FIG. 15 are simulation results of deformation (distortion) when the force and moment are applied to the flexure element 20. The force and moment are applied from the input part 24*a* through 24*d* (refer to FIG. 9 etc.) of the flexure element 20. In addition, FIG. 16A through FIG. 18B are simulation results of the stress generated in the sensor chip 10 when the force and moment of FIG. 14 and FIG. 15 are applied. In FIG. 16A through FIG. 18B, a vertical tensile stress is indicated by "+", and a vertical compressive stress is indicated by "−".

Figure 16A:
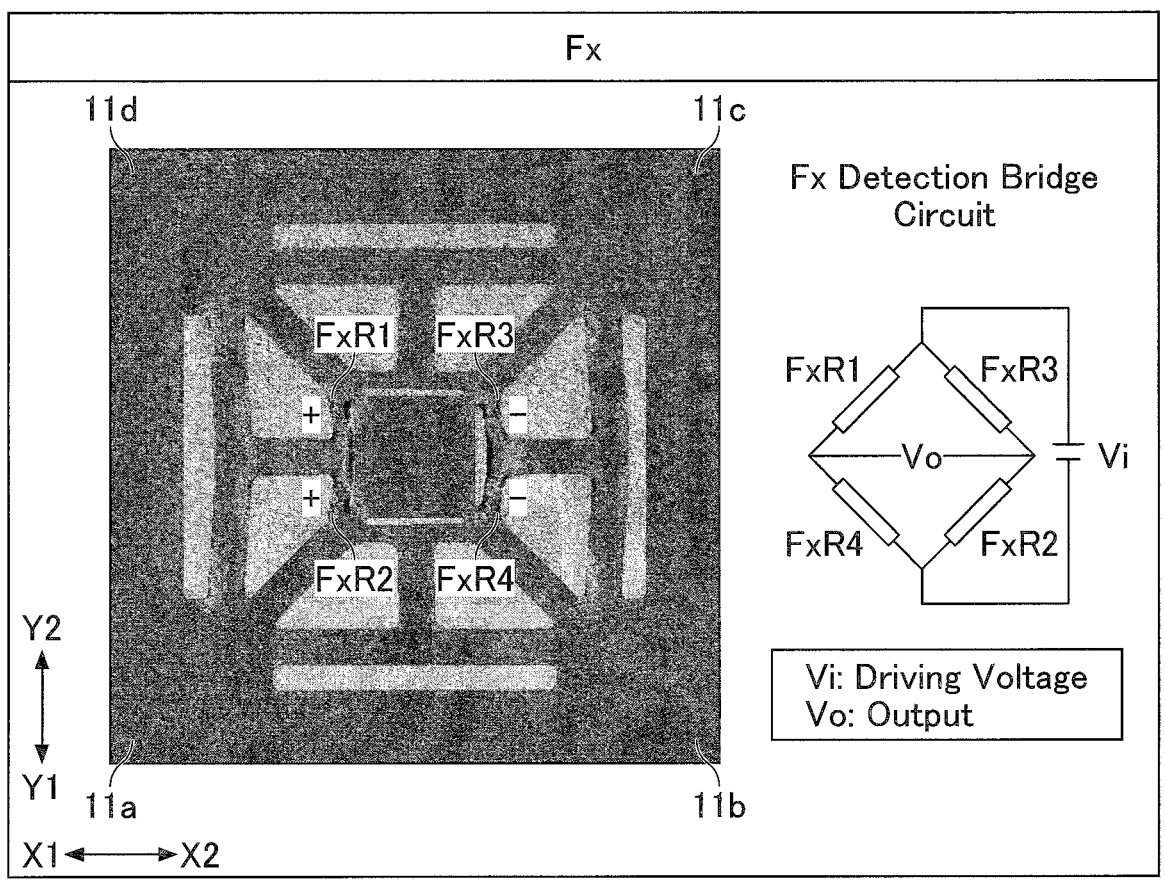
FIG. 16A is a simulation result (part 1) of stress generated in the sensor chip 10 when the force and moment of FIG. 14 and FIG. 15 are applied.

In a case in which the force Fx is applied in a direction from X1 to X2 along the X-axis, the flexure element 20 is deformed as illustrated in FIG. 14, and the stress illustrated in FIG. 16A is generated in the sensor chip 10. More particularly, by applying the force Fx, the detecting beams 13*k* and 13*e* are distorted in the direction of the force Fx.

Because the piezoresistive devices FxR1 and FxR2 are positioned on the X1 side than the center along the longitudinal direction of the detecting beam 13*k*, the vertical tensile stress is generated to increase the resistance. On the other hand, because the piezoresistive devices FxR3 and FxR4 are positioned on the X2 side than the center along the longitudinal direction of the detecting beam 13*e*, the vertical compressive stress is generated to decrease the resistance. Accordingly, a voltage is output from the bridge circuit illustrated in FIG. 16A because the piezoresistive devices FxR1 through FxR4 become imbalanced, to thereby enable detection of the force Fx.

The detecting beams 13*d* and 13*j* are also distorted in the direction of the force Fx, however, virtually no stress is generated, or stress in the same direction is generated, at the positions of the piezoresistive devices MyR1 and MyR2 and the piezoresistive devices MyR3 and MyR4. For this reason, the balance of the bridge is maintained, and no voltage is output from the bridge circuit of the moment My illustrated in FIG. 18A.

Figure 16B:
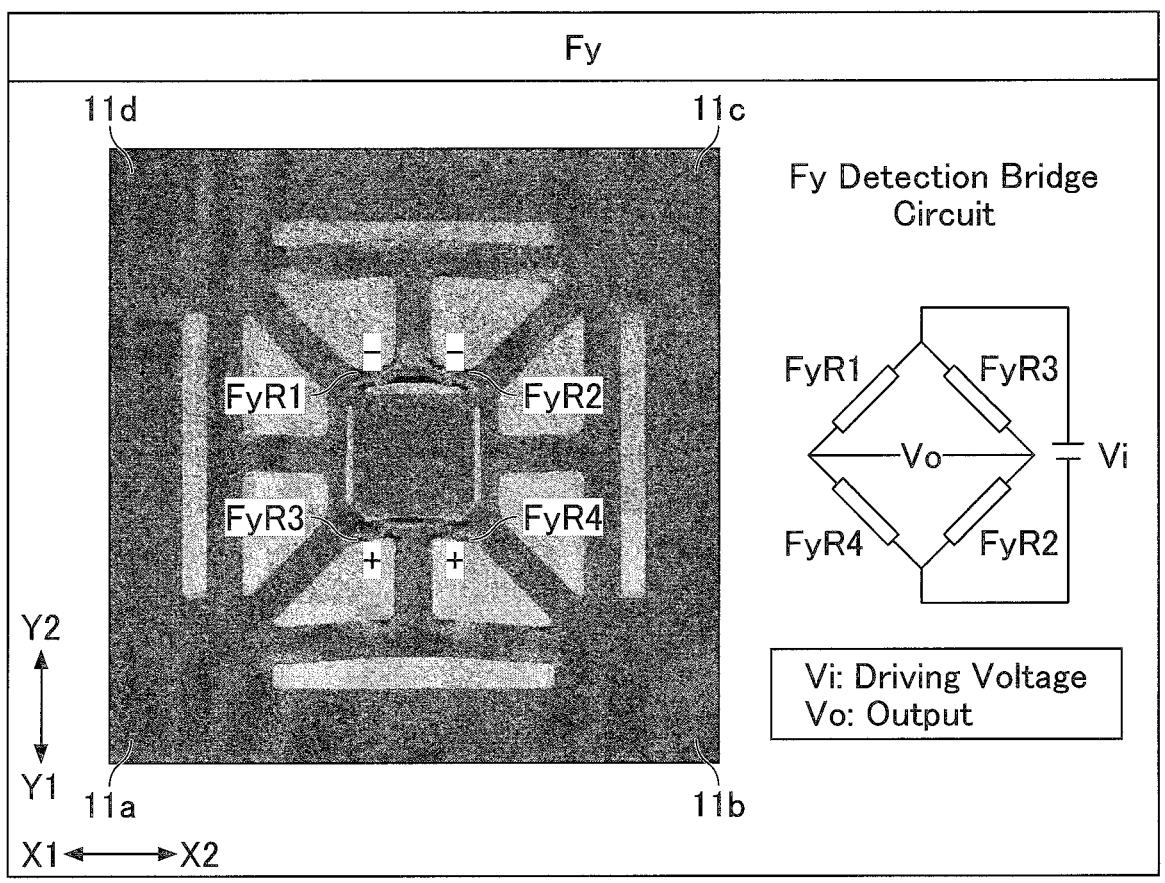
FIG. 16B is a simulation result (part 2) of the stress generated in the sensor chip 10 when the force and moment of FIG. 14 and FIG. 15 are applied.

In a case in which the force Fy is applied in a direction from Y1 to Y2 along the Y-axis, the stress illustrated in FIG. 16B is generated in the sensor chip 10. More particularly, by applying the force Fy, the detecting beams 13*b* and 13*h* are distorted in the direction of the force Fy.

Because the piezoresistive devices FyR3 and FyR4 are positioned on the Y1 side than the center along the longitudinal direction of the detecting beam 13*b*, the vertical tensile stress is generated to increase the resistance. On the other hand, because the piezoresistive devices FyR1 and FyR2 are positioned on the Y2 side than the center along the longitudinal direction of the detecting beam 13*h*, the vertical compressive stress is generated to decrease the resistance. Accordingly, a voltage is output from the bridge circuit illustrated in FIG. 16B because the piezoresistive devices FyR1 through FyR4 become imbalanced, to thereby enable detection of the force Fy.

Figure 17A:
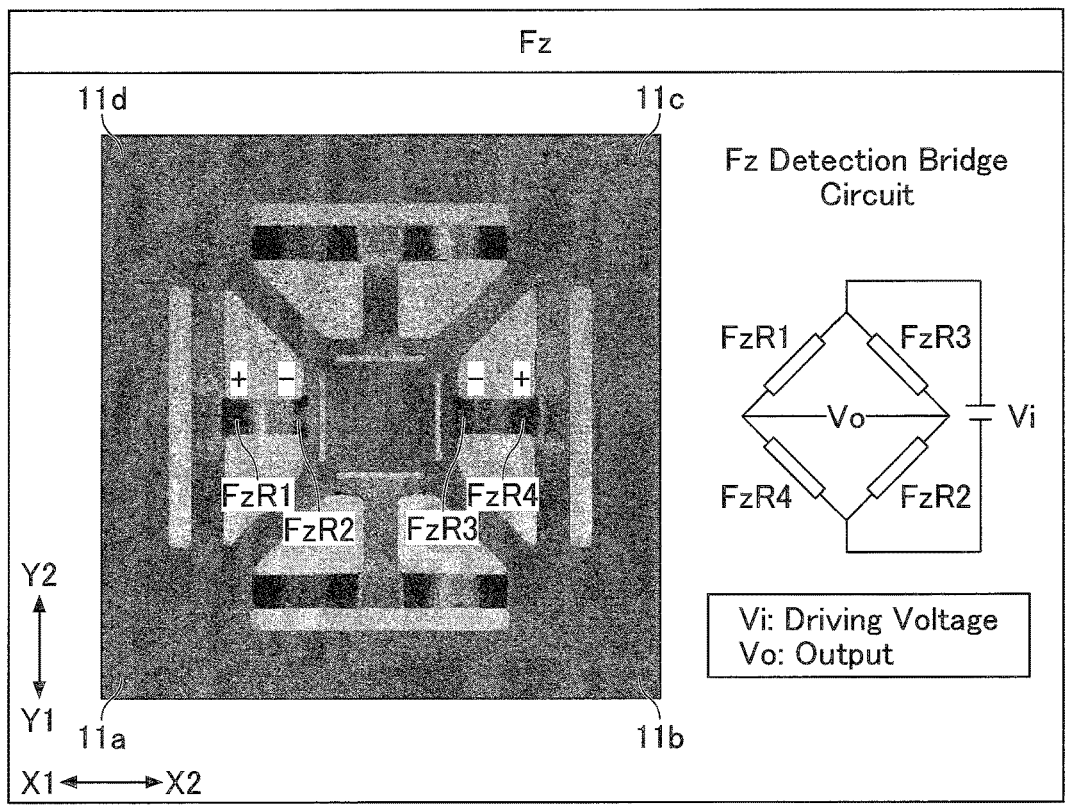
FIG. 17A is a simulation result (part 3) of the stress generated in the sensor chip 10 when the force and moment of FIG. 14 and FIG. 15 are applied.
Figure 17B:
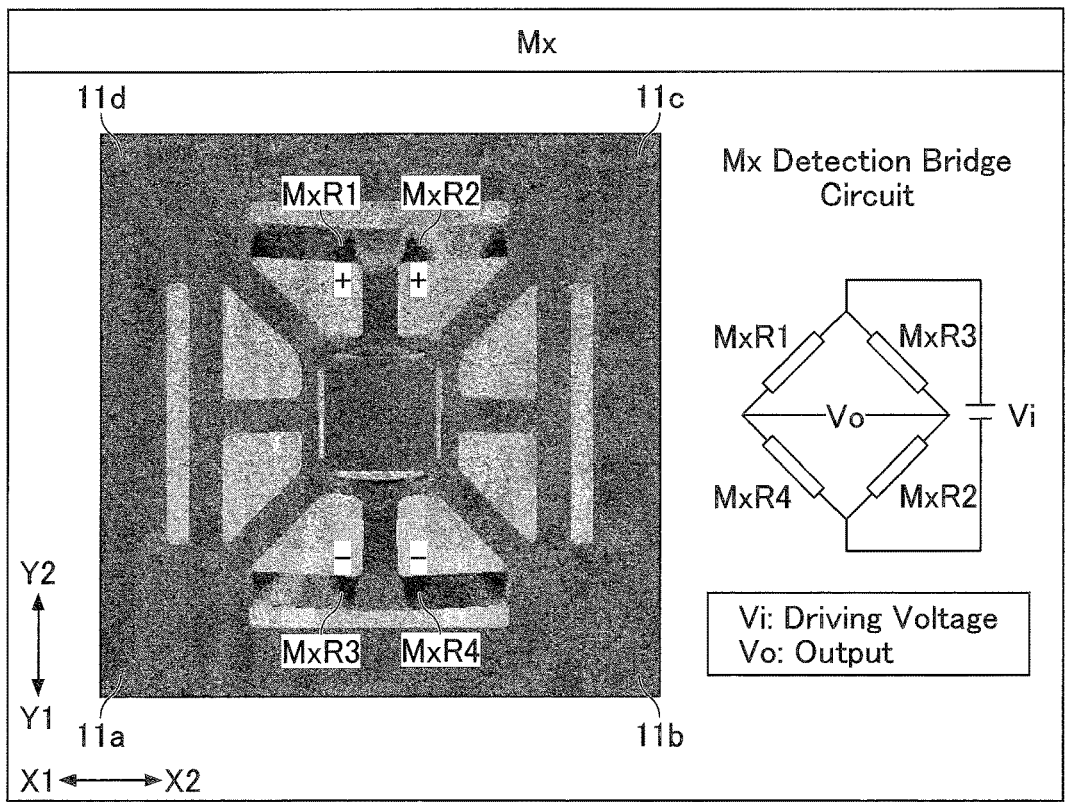
FIG. 17B is a simulation result (part 4) of the stress generated in the sensor chip 10 when the force and moment of FIG. 14 and FIG. 15 are applied.

For reasons similar to the bridge circuit of the moment My, no voltage is output from the bridge circuit of the moment Mx illustrated in FIG. 17B.

In a case in which the force Fz is applied in a direction from Z1 to Z2 along the Z-axis, the flexure element 20 is deformed as illustrated in FIG. 14, and the stress illustrated in FIG. 17A is generated in the sensor chip 10. More particularly, by applying the force Fz, the detecting beams 13*a*, 13*b*, 13*g*, 13*h*, 13*d*, 13*e*, 13*j*, 13*k*, 13*c*, 13*f*, 13*l*, and 13*i* are distorted in the direction of the force Fy.

In this case, the vertical tensile stress is generated in the piezoresistive devices FzR1 and FzR4 to increase the resistance. In addition, the vertical compressive stress is generated in the piezoresistive devices FzR2 and FzR3 to decrease the resistance. Accordingly, the piezoresistive devices FzR1 through FzR4 become imbalanced, to thereby enable detection of the force Fz by the bridge circuit illustrated in FIG. 17A.

Figure 18A:
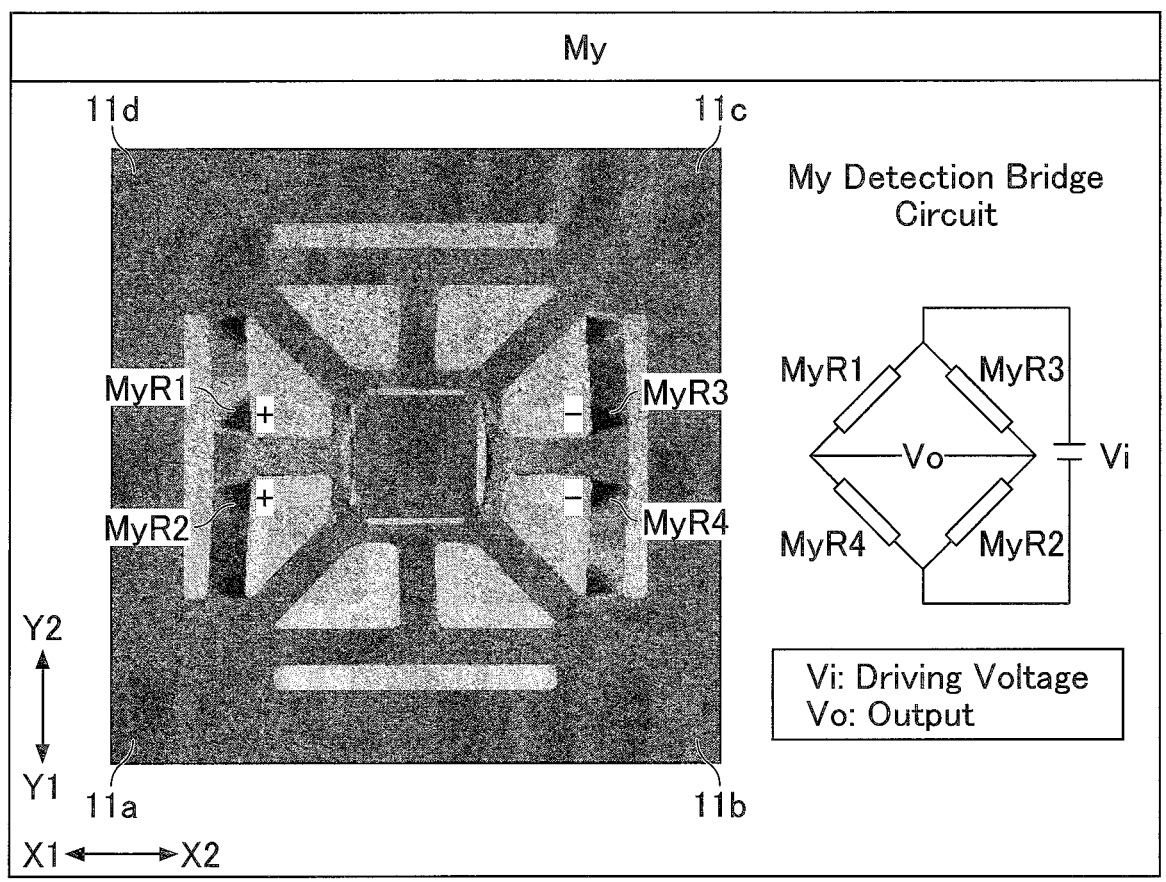
FIG. 18A is a simulation result (part 5) of the stress generated in the sensor chip 10 when the force and moment of FIG. 14 and FIG. 15 are applied.
Figure 18B:
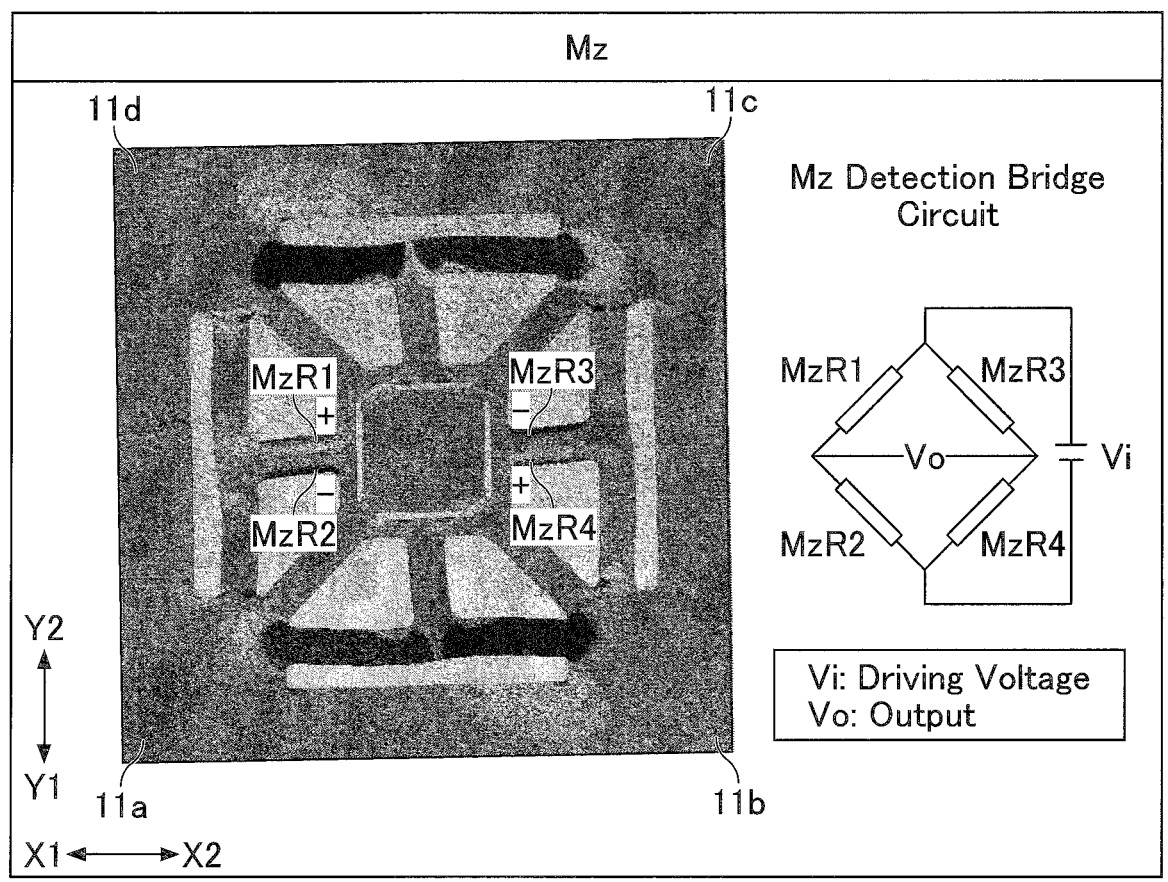
FIG. 18B is a simulation result (part 6) of the stress generated in the sensor chip 10 when the force and moment of FIG. 14 and FIG. 15 are applied.

For reasons similar to the above described, no voltage is output from the bridge circuit of the force Fx illustrated in FIG. 16A, the bridge circuit of the force Fy illustrated in FIG. 16B, the bridge circuit of the moment Mx illustrated in FIG. 17B, the bridge circuit of the moment My illustrated in FIG. 18A, and the bridge circuit of the moment Mz illustrated in FIG. 18B.

In a case in which the moment Mx is applied in the direction of Y2-Z2-Y1 using the X-axis as the rotation axis, the stress illustrated in FIG. 17B is generated in the sensor chip 10. More particularly, by applying the moment Mx, the detecting beams 13*g* and 13*a* are distorted in the direction of the moment Mx. For this reason, the vertical tensile stress is generated in the piezoresistive devices MxR1 and MxR2 to increase the resistance. In addition, the vertical compressive stress is generated in the piezoresistive devices MxR3 and MxR4 to decrease the resistance. Accordingly, the piezoresistive devices MxR1 through MxR4 become imbalanced, to enable detection of the moment Mx by the bridge circuit illustrated in FIG. 17B.

For reasons similar to the above described, no voltage is output from the bridge circuit of the force Fy illustrated in FIG. 16B.

In a case in which the moment My is applied in the direction of X1-Z2-X2 using the Y-axis as the rotation axis, the flexure element 20 is deformed as illustrated in FIG. 15, and the stress illustrated in FIG. 18A is generated in the sensor chip 10. More particularly, by applying the moment My, the detecting beams 13*j* and 13*d* are distorted in the direction of the moment My.

In this case, the vertical tensile stress is generated in the piezoresistive devices MyR1 and MyR2 to increase the resistance. In addition, the vertical compressive stress is generated in the piezoresistive devices MyR3 and MyR4 to decrease the resistance. Accordingly, the piezoresistive devices MyR1 through MyR4 become imbalanced, to thereby enable detection of the moment My by the bridge circuit illustrated in FIG. 18A.

For reasons similar to the above described, no voltage is output from the bridge circuit of the force Fx illustrated in FIG. 16A.

In a case in which the moment Mz is applied in the direction of X2-Y2-X1 using the Z-axis as the rotation axis, the flexure element 20 is deformed as illustrated in FIG. 15, and the stress illustrated in FIG. 18B is generated in the sensor chip 10. More particularly, by applying the moment Mz, the detecting beams 13*a*, 13*b*, 13*g*, 13*h*, 13*d*, 13*e*, 13*j*, 13*k*, 13*c*, 13*f*, 13*l*, and 13*i* are distorted in the direction of the moment Mz.

In this case, the vertical tensile stress is generated in the piezoresistive devices MzR1 and MzR4 to increase the resistance. In addition, the vertical compressive stress is generated in the piezoresistive devices MzR2 and MzR3 to decrease the resistance. Accordingly, the piezoresistive devices MzR1 through MzR4 become imbalanced, to thereby enable detection of the moment Mz by the bridge circuit illustrated in FIG. 18B.

For reasons similar to the above described, no voltage is output from the bridge circuit of the force Fx illustrated in FIG. 16A, the bridge circuit of the force Fy illustrated in FIG. 16B, the bridge circuit of the moment Mx illustrated in FIG. 17B, and the bridge circuit of the moment My illustrated in FIG. 18A.

Accordingly, when the displacement (force or moment) is input to the force application point of the sensor chip 10, the stress of the bend and torsion according to the input is generated in a predetermined detecting beam. The resistance of the piezoresistive device, arranged at a predetermined position of the detecting beam, changes according to the generated stress, to thereby enable the output voltage of each bridge circuit formed in the sensor chip 10 to be obtained from the electrode 15. Further, the output voltage from the electrode 15 may be output to the outside via the input and output substrate 30.

In addition, in the sensor chip 10, one bridge circuit is formed for one axis, to thereby enable the output of each axis to be obtained without requiring outputs to be combined. As a result, multiaxial displacements can be detected and output by a simple method that does not require complex computations or signal processing.

Further, the piezoresistive devices are arranged on different detecting beams according to the kind of input to the piezoresistive devices. Thus, the sensitivity of an arbitrary axis can be adjusted independently by modifying the rigidity (thickness or width) of the corresponding detecting beam.

In this specification, terms such as "parallel", "vertical", "perpendicular", "same plane", or the like not only include "parallel", "vertical", "perpendicular", "same plane", or the like in the strict sense of these terms, but also include terms that mean substantially "parallel", "vertical", "perpendicular", "same plane", or the like. In other words, deviations are tolerable within a range such that functions and effects of this embodiment are obtainable.

Modification 1 of First Embodiment

In a modification 1 of the first embodiment, the example of the force sensor device includes a force-receiving plate. In the modification 1 of the first embodiment, repeated description of the same constituent parts as the first embodiment may be omitted.

Figure 19:
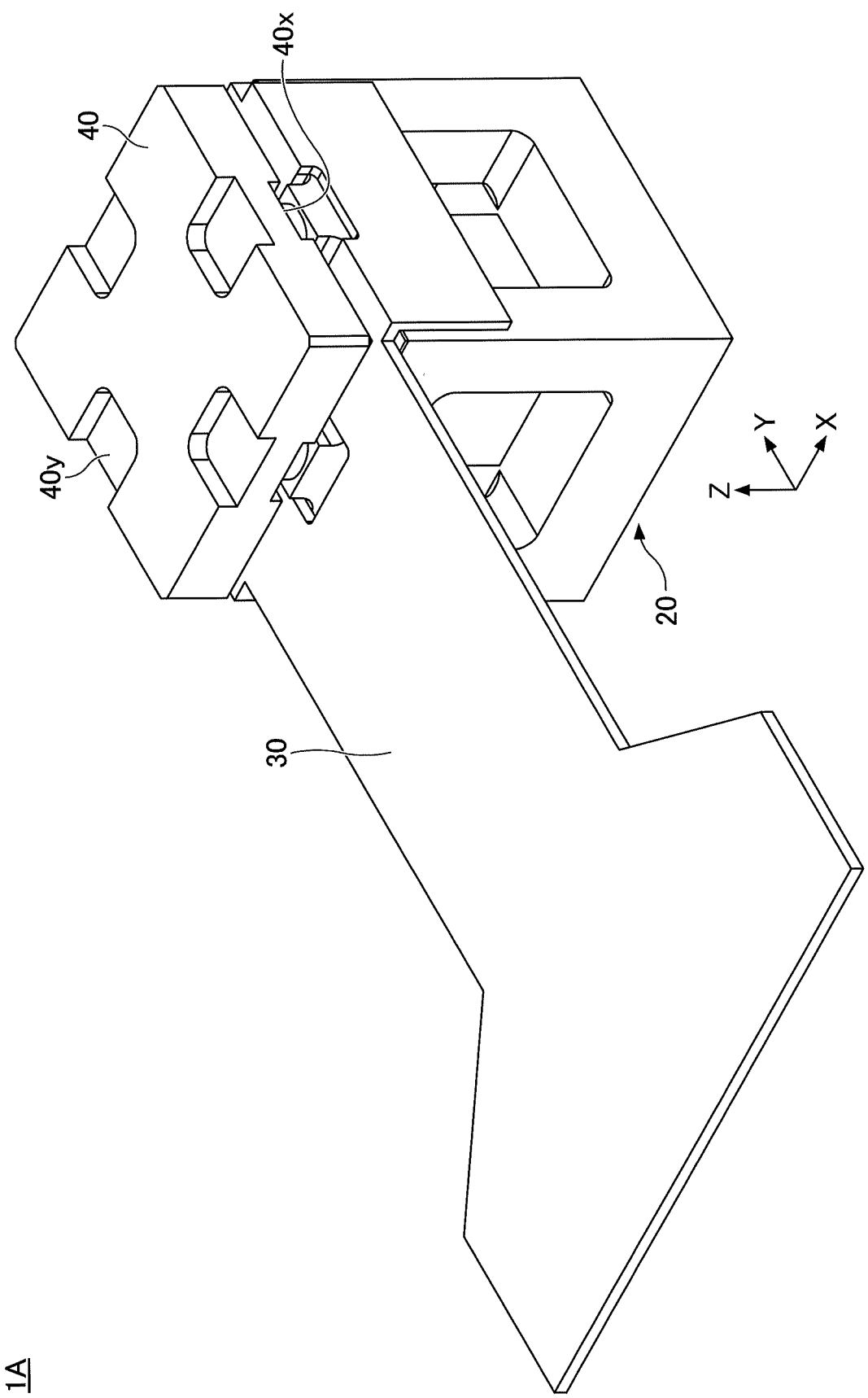
FIG. 19 is a perspective view illustrating an example of the force sensor device in a modification 1 of the first embodiment.
Figure 20A:
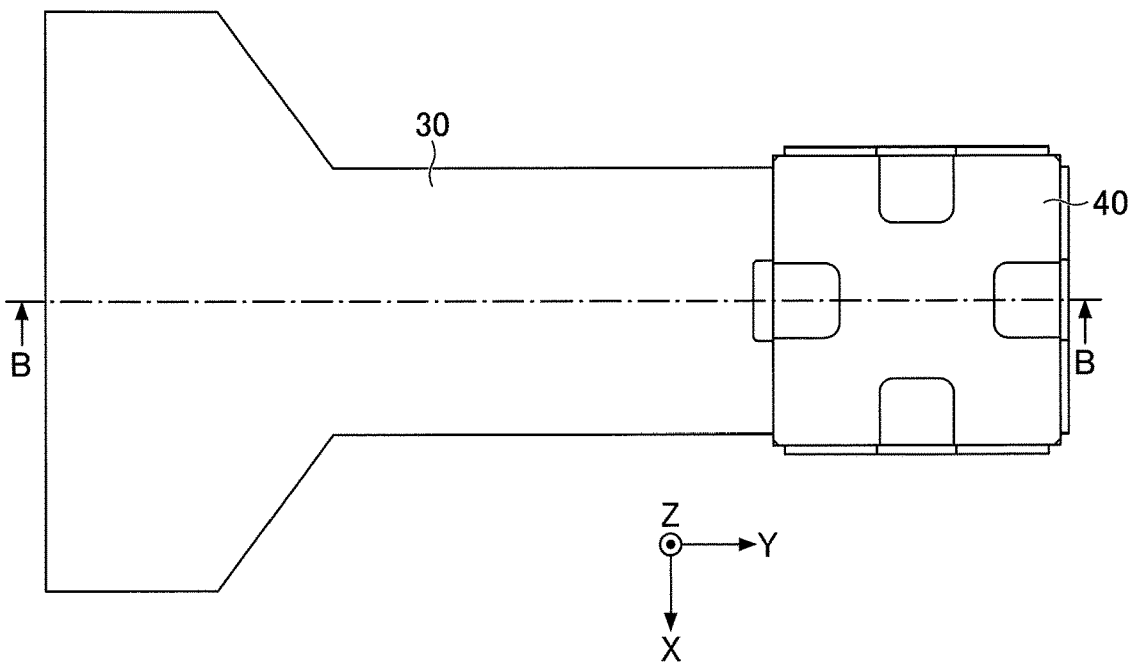
FIG. 20A is a diagram (part 1) illustrating the example of the force sensor device in the modification 1 of the first embodiment.
Figure 20B:
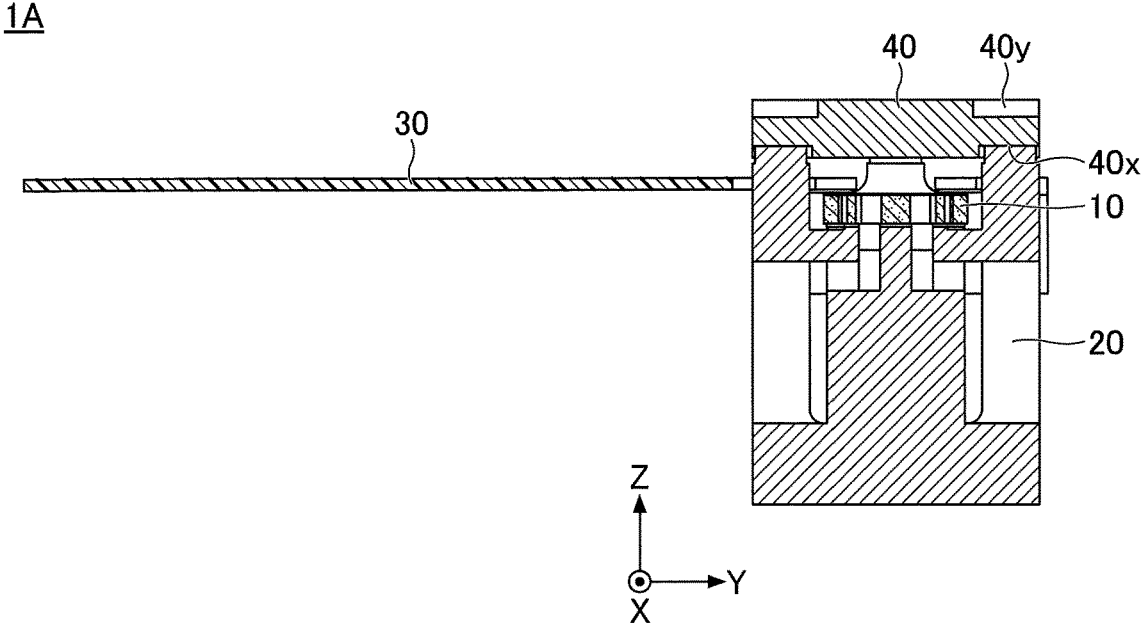
FIG. 20B is a diagram (part 2) illustrating the example of the force sensor device in the modification 1 of the first embodiment.

FIG. 19 is a perspective view illustrating an example of the force sensor device in the modification 1 of the first embodiment. FIG. 20A is a plan view illustrating the example of the force sensor device in the modification 1 of the first embodiment, and FIG. 20B is a cross sectional view along a line B-B in FIG. 20A. As illustrated in FIG. 19, FIG. 20A, and FIG. 20B, a force sensor device 1A differs from the force sensor device 1, in that a force-receiving plate 40 is provided on the input parts 24a through 24d of the flexure element 20.

4 recesses 40x are provided in a lower surface side of the force-receiving plate 40. In addition, 4 recesses 40y are provided in an upper surface side of the force-receiving plate 40, at positions approximately overlapping the respective recesses 40x in the plan view. The 4 recesses 40x are arranged to respectively cover the input parts 24a through 24d of the flexure element 20, and bottom surfaces of the recesses 40x contact the upper surfaces of the respective input parts 24a through 24d.

According to the above described structure, it is possible to position the force-receiving plate 40 and the flexure element 20. In addition, the recesses 40y may be used to position the force sensor device 1A when mounting the force sensor device 1A on a robot or the like.

A material used for the force-receiving plate 40 may be SUS630 (stainless steel) or the like, for example. The force-receiving plate 40 may be fixed to the flexure element 20 by soldering, bonding, fastening by screws, or the like.

Accordingly, by providing the force-receiving plate 40, it is possible to input the external force to the input parts 24a through 24d of the flexure element 20 via the force-receiving plate 40.

Modification 2 of First Embodiment

In a modification 2 of the first embodiment, the example of the sensor chip that is used is different from that used in the first embodiment. In the modification 2 of the first embodiment, repeated description of the same constituent parts as the first embodiment may be omitted.

Figure 21A:
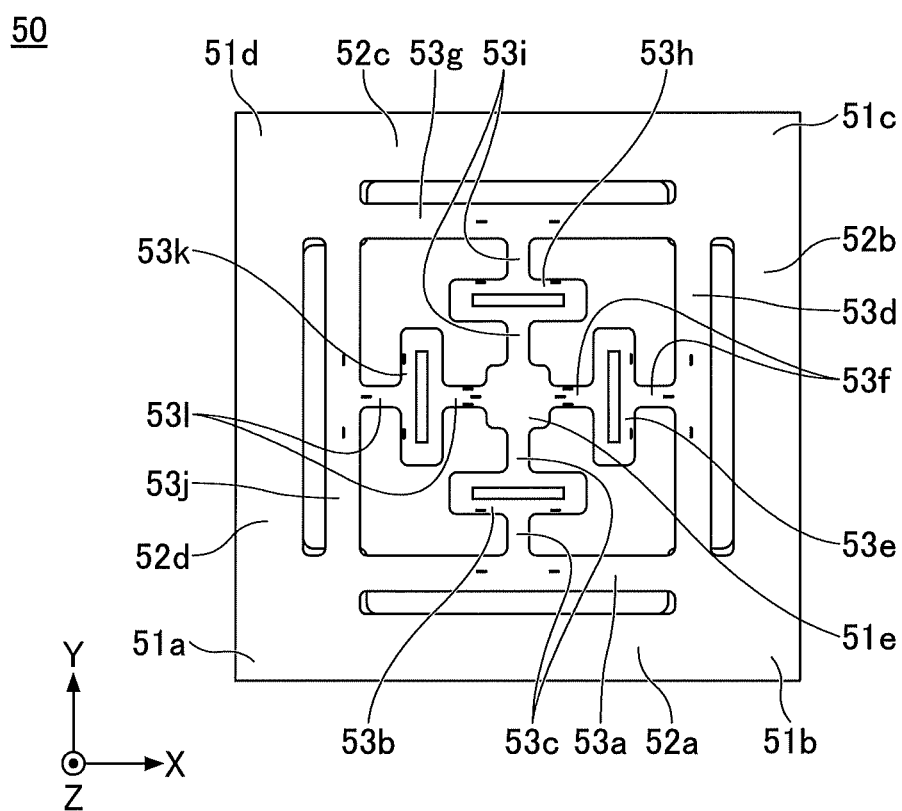
FIG. 21A is a diagram (part 1) of a sensor chip 50 viewed from above in the Z-axis direction.
Figure 21B:
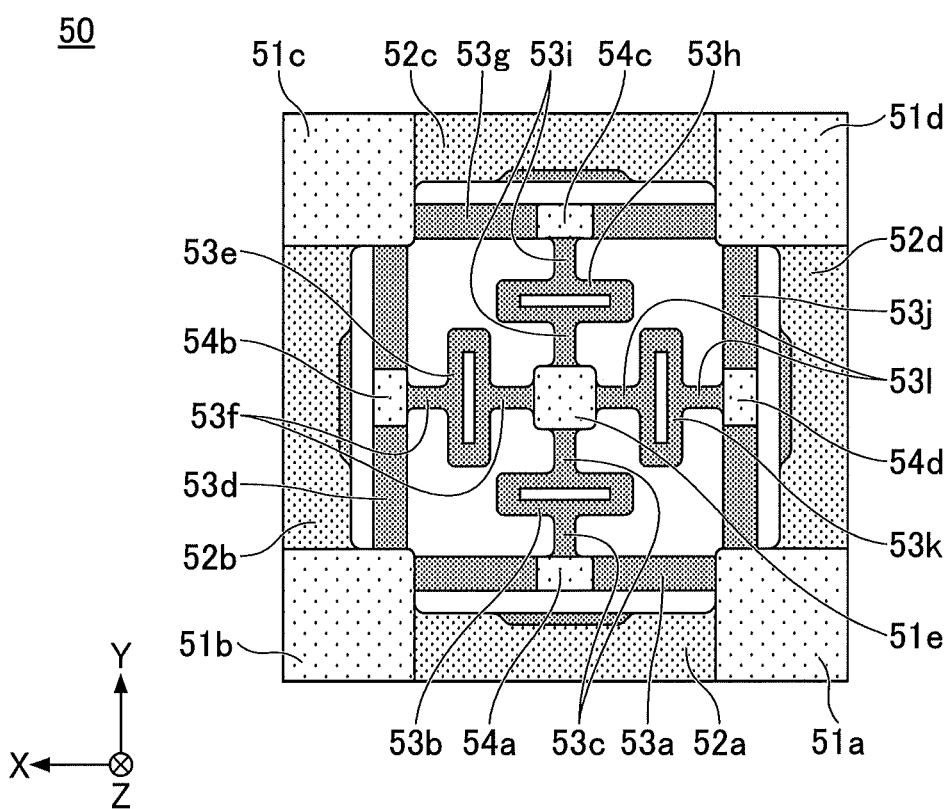
FIG. 21B is a diagram (part 2) of the sensor chip 50 viewed from above in the Z-axis direction.

FIG. 21A is a plan view of a sensor chip 50 viewed from above in the Z-axis direction, and FIG. 21B is a bottom view of the sensor chip 50 viewed from above in the Z-axis direction. For the sake of convenience, surfaces having the same height in FIG. 21B are indicated by the same dot pattern.

The sensor chip 50 illustrated in FIG. 21A and FIG. 21B is a MEMS sensor chip capable of detection in up to 6 axes at maximum by a single chip, and is formed on a SOI substrate or the like, similarly as in the case of the sensor chip 10. The planar shape of the sensor chip 50 may be a square shape having a side of approximately 3000 μm, for example. In the force sensor device 1, the sensor chip 50 may be used in place of the sensor chip 10.

The sensor chip 50 includes 5 columnar support parts 51a through 51e. The planar shape of the support parts 51a through 51e may be a square shape having a side of approximately 500 μm, for example. The support parts 51a through 51d forming first support parts are arranged at four corners of the sensor chip 50. The support part 51e forming a second support part is arranged at a center of the support parts 51a through 51d.

The support parts 51a through 51e may be formed by the active layer, the BOX layer, and the support layer of the SOI substrate, for example, and thicknesses of the support parts 51a through 51e may be approximately 500 μm, for example.

A reinforcing beam 52a for structural reinforcement, having both ends thereof respectively fixed to the support part 51a and the support part 51b (connecting the adjacent support parts), is provided between the support part 51a and the support part 51b. A reinforcing beam 52b for structural reinforcement, having both ends thereof respectively fixed to the support part 51b and the support part 51c (connecting the adjacent support parts), is provided between the support part 51b and the support part 51c.

A reinforcing beam 52c for structural reinforcement, having both ends thereof respectively fixed to the support part 51c and the support part 51d (connecting the adjacent support parts), is provided between the support part 51c and the support part 51d. A reinforcing beam 52d for structural reinforcement, having both ends thereof respectively fixed to the support part 51d and the support part 51a (connecting the adjacent support parts), is provided between the support part 51d and the support part 51a.

In other words, the 4 reinforcing beams 52a, 52b, 52c, and 52d forming first reinforcing beams are formed in a frame shape, and corner parts of the frame shape where each of the reinforcing beams intersect each other form the support parts 51b, 51c, 51d, and 51a.

The reinforcing beams 52a through 52d may be formed by the active layer, the BOX layer, and the support layer of the SOI substrate, for example. Sizes (widths along the lateral direction) of the reinforcing beams 52a through 52d may be approximately 30 µm, for example. Upper surfaces of the reinforcing beams 52a through 52d, and upper surfaces of the support parts 51a through 51e respectively lie on approximately the same plane.

On the other hand, lower surfaces of the reinforcing beams 52a through 52d respectively cave in from lower surfaces of the support parts 51a through 51e and lower surfaces of force application points 54a through 54d by approximately several tens of µm toward the upper surfaces of the reinforcing beams 52a through 52d. Such caved-in structures prevent the lower surfaces of the reinforcing beams 52a through 52d from contacting an opposing surface of the flexure element 20, when bonding the sensor chip 50 on the flexure element 20.

By arranging, separately from detecting beams for detecting the distortion, the reinforcing beams that are thicker and more rigid than the detecting beams, it is possible to increase the rigidity of the entire sensor chip 50. Accordingly, parts other than the detecting beams are uneasily deformed in response to the input, to make it possible to obtain satisfactory sensor properties.

A detecting beam 53a for detecting the distortion, having both ends thereof respectively fixed to the support part 51a and the support part 51b (connecting the adjacent support parts), is provided on an inner side of the reinforcing beam 52a between the support part 51a and the support part 51b, in parallel with respect to the reinforcing beam 52a and with a predetermined gap from the reinforcing beam 52a.

A frame shaped detecting beam 53b is provided between the detecting beam 53a and the support part 51e, in parallel with respect to the detecting beam 53a along the longitudinal direction and with a predetermined gap from each of the detecting beam 53a and the support beam 51e. The detecting beam 53b is held at an approximate center part along the longitudinal direction of the detecting beam 53c that extends in an approximately perpendicular direction with respect to the longitudinal direction of the detecting beam 53a, and connects in-between an approximate center part along the longitudinal direction of the detecting beam 53a and an approximate center part of one opposing side of the support part 51e.

A detecting beam 53d for detecting the distortion, having both ends thereof respectively fixed to the support part 51b and the support part 51c (connecting the adjacent support parts), is provided on an inner side of the reinforcing beam 52b between the support part 51b and the support part 51c, in parallel with respect to the reinforcing beam 52b and with a predetermined gap from the reinforcing beam 52b.

A frame shaped detecting beam 53e is provided between the detecting beam 53d and the support part 51e, in parallel with respect to the detecting beam 53d along the longitudinal direction and with a predetermined gap from each of the detecting beam 53d and the support beam 51e. The detecting beam 53e is held at an approximate center part along the longitudinal direction of the detecting beam 53f that extends in an approximately perpendicular direction with respect to the longitudinal direction of the detecting beam 53d, and connects in-between an approximate center part along the longitudinal direction of the detecting beam 53d and an approximate center part of one opposing side of the support part 51e.

A detecting beam 53g for detecting the distortion, having both ends thereof respectively fixed to the support part 51c and the support part 51d (connecting the adjacent support parts), is provided on an inner side of the reinforcing beam 52c between the support part 51c and the support part 51d, in parallel with respect to the reinforcing beam 52c and with a predetermined gap from the reinforcing beam 52c.

A frame shaped detecting beam 53h is provided between the detecting beam 53g and the support part 51e, in parallel with respect to the detecting beam 53g along the longitudinal direction and with a predetermined gap from each of the detecting beam 53g and the support beam 51e. The detecting beam 53h is held at an approximate center part along the longitudinal direction of the detecting beam 53i that extends in an approximately perpendicular direction with respect to the longitudinal direction of the detecting beam 53g, and connects in-between an approximate center part along the longitudinal direction of the detecting beam 53g and an approximate center part of one opposing side of the support part 51e.

A detecting beam 53j for detecting the distortion, having both ends thereof respectively fixed to the support part 51d and the support part 51a (connecting the adjacent support parts), is provided on an inner side of the reinforcing beam 52d between the support part 51d and the support part 51a, in parallel with respect to the reinforcing beam 52d and with a predetermined gap from the reinforcing beam 52d.

A frame shaped detecting beam 53k is provided between the detecting beam 53j and the support part 51e, in parallel with respect to the detecting beam 53j along the longitudinal direction and with a predetermined gap from each of the detecting beam 53j and the support beam 51e. The detecting beam 53k is held at an approximate center part along the longitudinal direction of the detecting beam 53l that extends in an approximately perpendicular direction with respect to the longitudinal direction of the detecting beam 53j, and connects in-between an approximate center part along the longitudinal direction of the detecting beam 53j and an approximate center part of one opposing side of the support part 51e.

The detecting beams 53a through 53l are provided on upper ends of the support parts 51a through 51e along the thickness direction, and may be formed by the active layer of the SOI substrate, for example. Sizes (widths along the lateral direction) of the detecting beams 53a through 53l may be approximately 150 µm, for example. Upper surfaces of the detecting beams 53a through 53l and the upper surfaces of the support parts 51a through 51e respectively 11e on approximately the same plane. Thicknesses of the detecting beams 53a through 53l may be approximately 50 µm, for example.

The force application point 54a is provided on the lower surface at the center part along the longitudinal direction of the detecting beam 53a (intersection of the detecting beam 53a and the detecting beam 53c). A set of detection block is formed by the detecting beams 53a, 53b, and 53c and the force application point 54a.

The force application point 54b is provided on the lower surface at the center part along the longitudinal direction of the detecting beam 53d (intersection of the detecting beam 53d and the detecting beam 53f). A set of detection block is formed by the detecting beams 53d, 53e, and 53f and the force application point 54b.

The force application point 54c is provided on the lower surface at the center part along the longitudinal direction of the detecting beam 53g (intersection of the detecting beam 53g and the detecting beam 53i). A set of detection block is formed by the detecting beams 53g, 53h, and 53i and the force application point 54c.

The force application point 54d is provided on the lower surface at the center part along the longitudinal direction of the detecting beam 53j (intersection of the detecting beam 53j and the detecting beam 53l). A set of detection block is formed by the detecting beams 53j, 53k, and 53l and the force application point 54d.

The force application points 54a through 54d are points where the external force is applied, and may be formed by the BOX layer and the support layer of the SOI substrate, for example. Lower surfaces of the force application points 54a through 15d and lower surfaces of the support parts 51a through 51e respectively lie on approximately the same plane.

Accordingly, a different beam deformation is obtained for each kind of force, by inputting the force or the displacement from the 4 force application points 54a through 54d, and thus, it is possible to provide a sensor having satisfactory properties for isolating the 6 axes.

Figure 22:
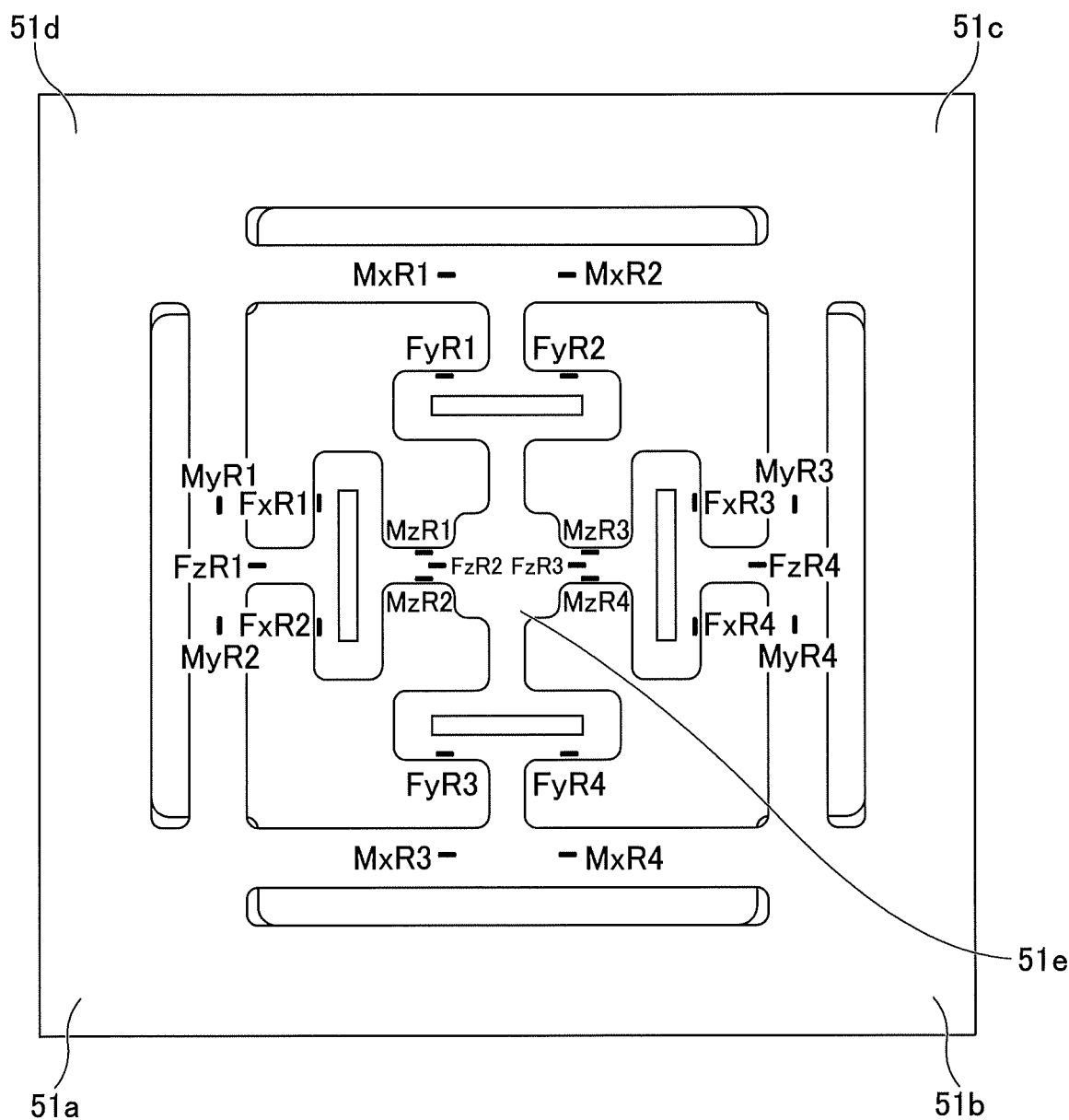
FIG. 22 is a diagram illustrating an example of an arrangement of piezoresistive devices of the sensor chip 50.

FIG. 22 is a diagram illustrating an example of an arrangement of piezoresistive devices of the sensor chip 50. The piezoresistive devices are arranged at predetermined positions of the detection blocks respectively corresponding to the 4 force application points 54a through 54d.

More particularly, as illustrated in FIG. 21A, FIG. 21B, and FIG. 22, in the detection block corresponding to the force application point 54a, piezoresistive devices MxR3 and MxR4 are arranged on a bisector that bisects the detecting beam 53a along the longitudinal direction, at symmetrical positions with respect to a bisector that bisects the detecting beam 53c along the longitudinal direction. In addition, piezoresistive devices FyR3 and FyR4 are arranged closer to the detecting beam 53a than an opening of the frame shaped detecting beam 53b, at symmetrical positions with respect to the bisector that bisects the detecting beam 53c along the longitudinal direction.

Further, in the detection block corresponding to the force application point 54b, piezoresistive devices MyR3 and MyR4 are arranged on a bisector that bisects the detecting beam 53d along the longitudinal direction, at symmetrical positions with respect to a bisector that bisects the detecting beam 53f along the longitudinal direction. In addition, piezoresistive devices FxR3 and FxR4 are arranged closer to the detecting beam 53d than an opening of the frame shaped detecting beam 53e, at symmetrical positions with respect to the bisector that bisects the detecting beam 53f along the longitudinal direction.

Moreover, piezoresistive devices MzR3 and MzR4 are arranged closer to the support part 51e than the detecting beam 53e, at symmetrical positions with respect to the bisector that bisects the detecting beam 53f along the longitudinal direction. In addition, piezoresistive devices FzR3 and FzR4 are arranged on the bisector that bisects the detecting beam 53f along the longitudinal direction, at symmetrical positions with respect to the bisector that bisects the opening of the frame shaped detecting beam 53e along the longitudinal direction.

Further, in the detection block corresponding to the force application point 54c, piezoresistive devices MxR1 and MxR2 are arranged on a bisector that bisects the detecting beam 53g along the longitudinal direction, at symmetrical positions with respect to a bisector that bisects the detecting beam 53i along the longitudinal direction. In addition, piezoresistive devices FyR1 and FyR2 are arranged closer to the detecting beam 53g than an opening of the frame shaped detecting beam 53h along the longitudinal direction, at symmetrical positions with respect to the bisector that bisects the detecting beam 53i along the longitudinal direction.

Moreover, in the detection block corresponding to the force application point 54d, piezoresistive devices MyR1 and MyR2 are arranged on a bisector that bisects the detecting beam 53j along the longitudinal direction, at symmetrical positions with respect to a bisector that bisects the detecting beam 53l along the longitudinal direction. In addition, piezoresistive devices FxR1 and FxR2 are arranged closer to the detecting beam 53j than an opening of the frame shaped detecting beam 13k, at symmetrical positions with respect to the bisector that bisects the detecting beam 53l along the longitudinal direction.

Further, piezoresistive devices MzR1 and MzR2 are arranged closer to the support part 51e than the detecting beam 53k, at symmetrical positions with respect to the bisector that bisects the detecting beam 53l along the longitudinal direction. In addition, piezoresistive devices FzR1 and FzR2 are arranged on the bisector that bisects the detecting beam 53l along the longitudinal direction, at symmetrical positions with respect to the bisector that bisects an opening of the frame shaped detecting beam 13k along the longitudinal direction.

Accordingly, in the sensor chip 50, a plurality of piezoresistive devices are separately arranged in each of the detection blocks, similarly as in the case of the sensor chip 10. Hence, the displacement in a predetermined axial direction can be detected in up to 6 axes at maximum, based on changes in outputs of the plurality of piezoresistive devices arranged on predetermined beams, according to the direction (axial direction) of the force or displacement applied (transmitted) to the force application points 54a through 54d, similarly as in the case of the sensor chip 10.

Modification 3 of First Embodiment

In a modification 3 of the first embodiment, the example of the force sensor device includes no flexure element. In the modification 3 of the first embodiment, repeated description of the same constituent parts as the first embodiment may be omitted.

Figure 23A:
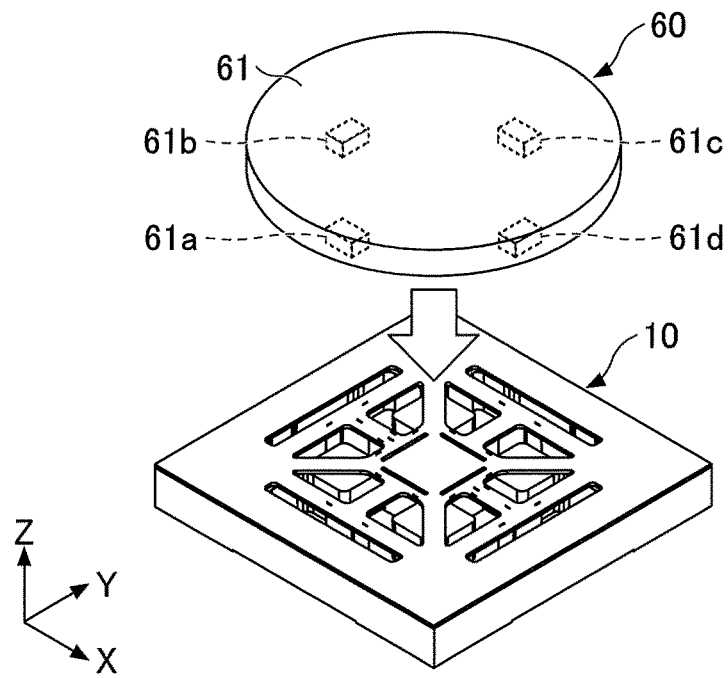
FIG. 23A is a perspective view (part 1) illustrating an example of the force sensor device in a modification 3 of the first embodiment.
Figure 23B:
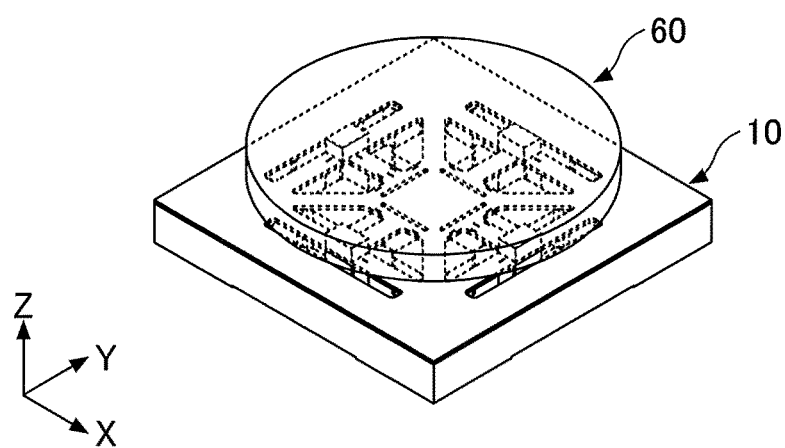
FIG. 23B is a perspective view (part 2) illustrating the example of the force sensor device in the modification 3 of the first embodiment.
Figure 23C:
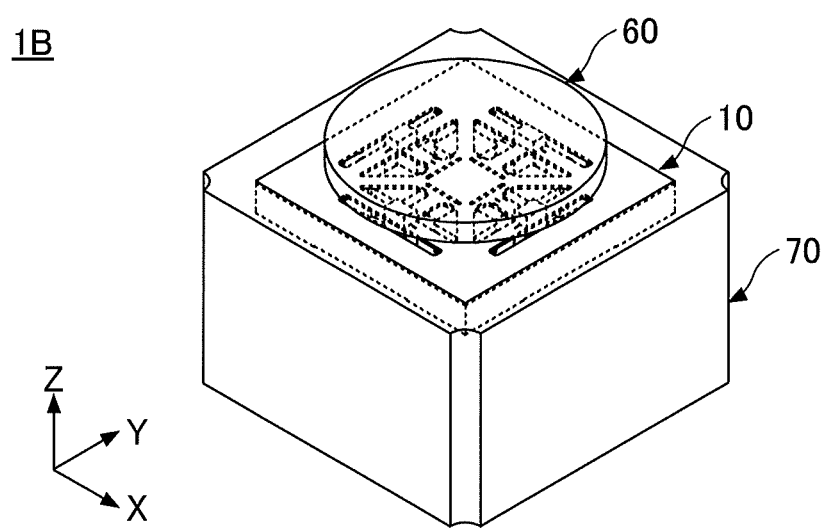
FIG. 23C is a perspective view (part 3) illustrating the example of the force sensor device in the modification 3 of the first embodiment.

FIG. 23A through FIG. 23C are perspective views illustrating an example of the force sensor device in the modification 3 of the first embodiment. As illustrated in FIG. 23A through FIG. 23C, a force sensor device 1B includes the sensor chip 10, a force-receiving plate 60, and a package 70. The force-receiving plate 60 is bonded on the sensor chip 10, and the sensor chip 10 is held within the package 70. The force-receiving plate 60 may be formed from glass, for example. The package 70 may be formed from ceramics, for example.

The force-receiving plate 60 includes a main body 61 having an approximately circular shape, and 4 projecting parts 61a, 61b, 61c, and 61d provided on a lower surface side of the main body 61. The projecting part 61a contacts a region on the upper surface of the detecting beam 13a, and corresponding to the force application point 14a. The projecting part 61b contacts a region on the upper surface of the detecting beam 13j, and corresponding to the force application point 14d. The projecting part 61c contacts a region on the upper surface of the detecting beam 13g, and corresponding to the force application point 14c. The projecting part 61d contacts a region on the upper surface of the detecting beam 13d, and corresponding to the force application point 14b.

In the force sensor device 1B, the external force can be applied to the sensor chip 10 via the force-receiving plate 60, without using a flexure element, by employing the structure illustrated in FIG. 23A through FIG. 23C.

The force sensor device 1B may be manufactured by a process that bonds the force-receiving plate 60 after completion of the sensor chip 10, or by a process described hereunder. That is, a glass wafer (having the same size as a sensor chip wafer) that becomes the force-receiving plate 60 may be anodically bonded with respect to the sensor chip wafer having the sensor chip 10 formed thereon but prior to dicing. Then, by simultaneously dicing the anodically bonded sensor chip wafer and the glass wafer, the sensor chip 10 and the force-receiving plate 60 may be formed simultaneously.

Modification 4 of First Embodiment

In a modification 4 of the first embodiment, another example of the force sensor device includes no flexure element. In the modification 4 of the first embodiment, repeated description of the same constituent parts as the first embodiment may be omitted.

Figure 24A:
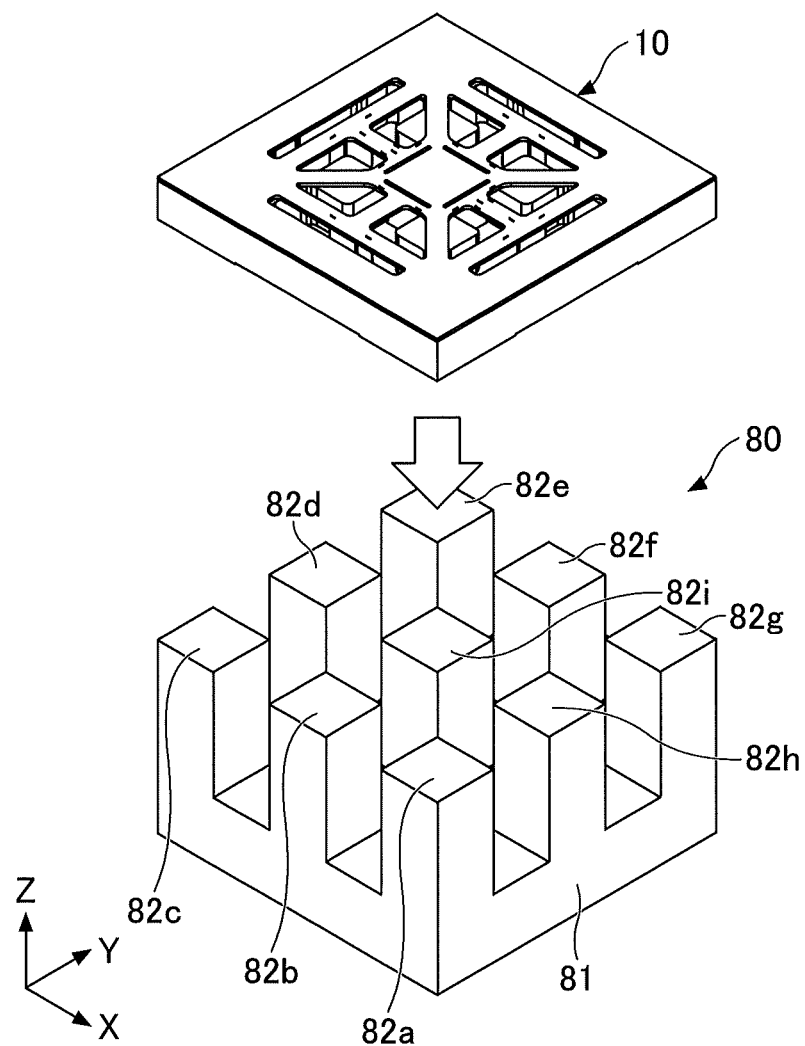
FIG. 24A is a perspective view (part 1) illustrating an example of the force sensor device in a modification 4 of the first embodiment.
Figure 24B:
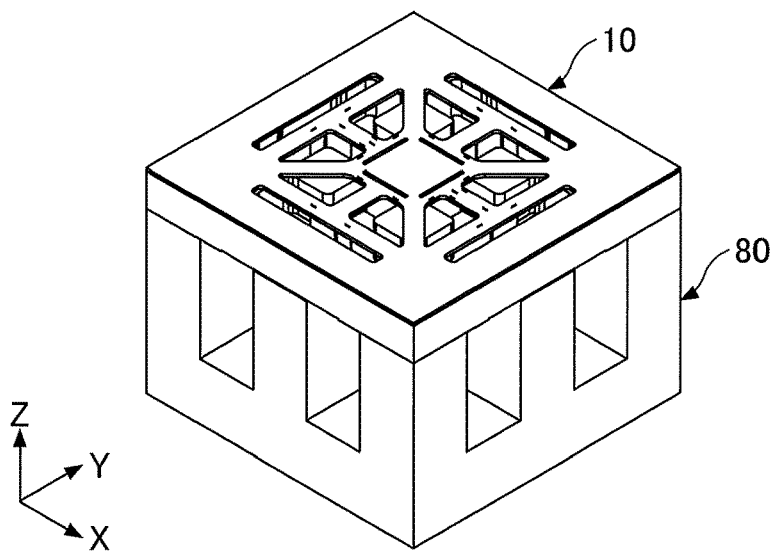
FIG. 24B is a perspective view (part 2) illustrating the example of the force sensor device in the modification 4 of the first embodiment.

FIG. 24A and FIG. 24B are perspective views illustrating the other example of the force sensor device in the modification 4 of the first embodiment. As illustrated in FIGS. 24A and 24B, a force sensor device 1C includes the sensor chip 10, and a column structure part 80. The sensor chip 10 is bonded on the column structure part 80. The column structure part 80 may be formed from silicon, glass, metals, or the like, for example.

The column structure part 80 includes a base 81, and 9 columns 82a through 82i that are arranged on the base 81 and approximately equally spaced. The columns 82a, 82c, 82e, and 82g are arranged at corners of the base 81. The column 82i is arranged at a center of the base 81. The column 82b is arranged between the column 82a and the column 82c. The column 82d is arranged between the column 82c and the column 82e. The column 82f is arranged between the column 82e and the column 82g. The column 82h is arranged between the column 82g and the column 82a.

In the force sensor device 1C, the external force can be applied to the sensor chip 10 directly, without using a flexure element, by employing the structure illustrated in FIG. 24A and FIG. 24B. Similarly as in the case of the force sensor device 1B, the force-receiving plate 60 may be provided on the sensor chip 10.

The force sensor device 1C may be manufactured by a process that bonds the column structure part 80 after completion of the sensor chip 10, or by a process described hereunder. That is, a glass wafer or a silicon wafer (having the same size as a sensor chip wafer) that becomes the column structure part 80 may be anodically bonded with respect to the sensor chip wafer having the sensor chip 10 formed thereon but prior to dicing. Then, by simultaneously dicing the anodically bonded sensor chip wafer and the glass wafer or the silicon wafer, the sensor chip 10 and the column structure part 80 may be formed simultaneously.

In addition, the force sensor device may have a structure including both the force-receiving plate 60 illustrated in FIG. 23A through 23C and the column structure part 80 illustrated in FIGS. 24A and 24B. In this case, a glass wafer that becomes the force-receiving plate 60 may be anodically bonded to one surface of the sensor chip wafer on which the sensor chip 10 is formed, and a glass wafer or a silicon wafer that becomes the column structure part 80 may be anodically bonded to the other surface of the sensor chip wafer. After the anodical bonding, a dicing may be performed in a state in which the sensor chip wafer is sandwiched between the glass wafer or the silicon wafer that becomes the column structure part 80 and the glass wafer that becomes the force-receiving plate 60, to simultaneously form the force-receiving plate 60, the sensor chip 10, and the column structure part 80.

Modification 5 of First Embodiment

In a modification 5 of the first embodiment, another example of the sensor chip that is used is different from that used in the first embodiment. In the modification 5 of the first embodiment, repeated description of the same constituent parts as the first embodiment may be omitted.

Figure 25A:
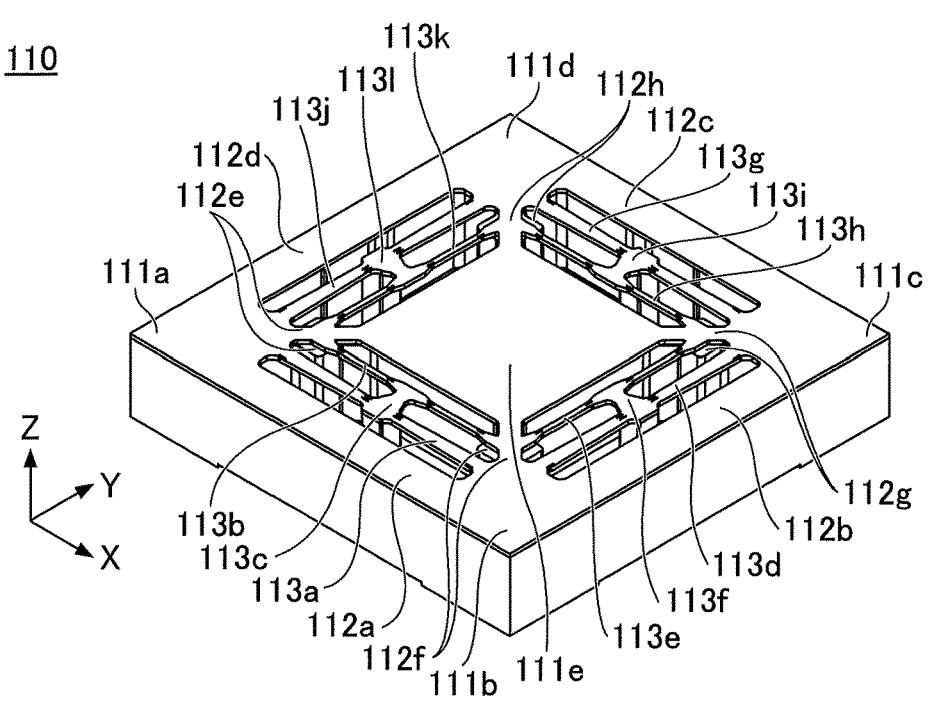
FIG. 25A is a diagram (part 1) of a sensor chip 110 viewed from above in the Z-axis direction.
Figure 25B:
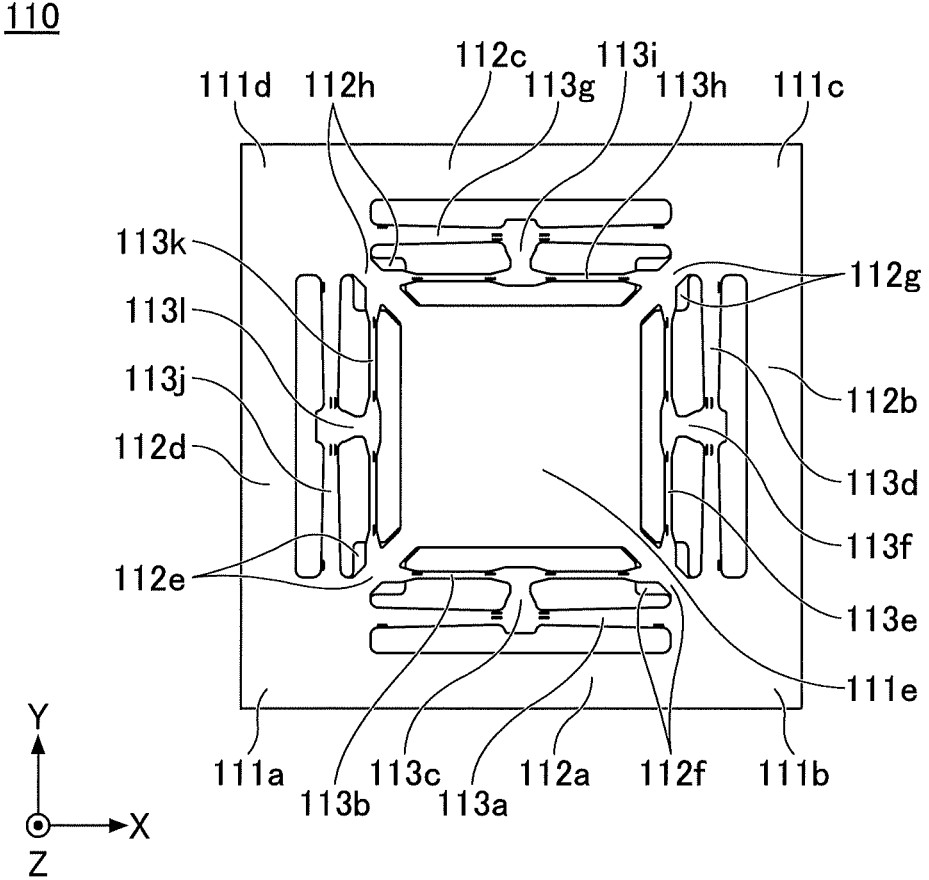
FIG. 25B is a diagram (part 2) of the sensor chip 110 viewed from above in the Z-axis direction.
Figure 26A:
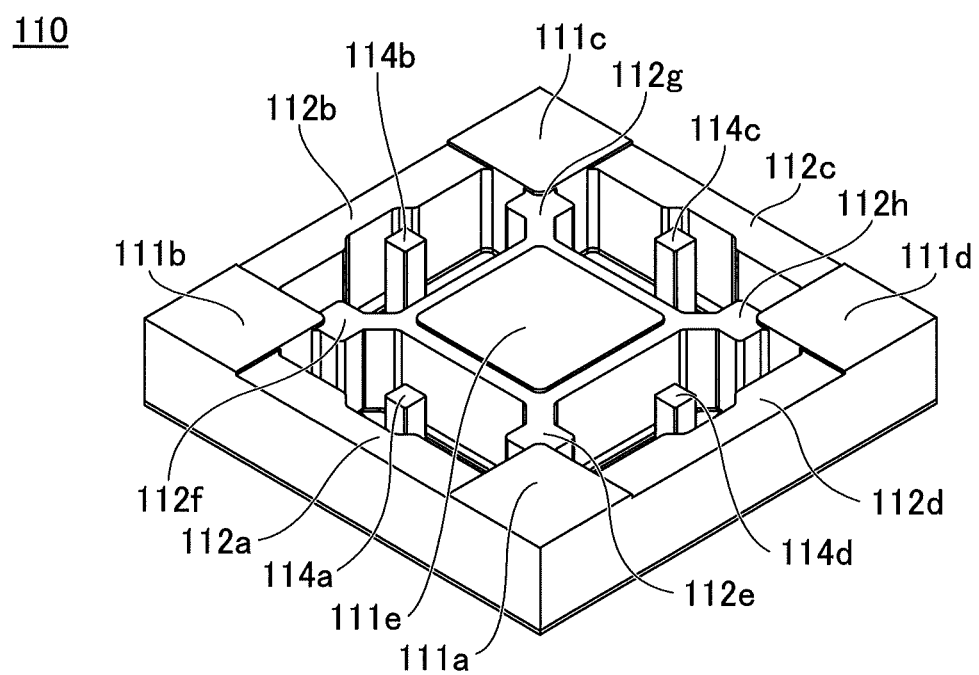
FIG. 26A is a diagram (part 1) of the sensor chip 110 viewed from below in the Z-axis direction.
Figure 26B:
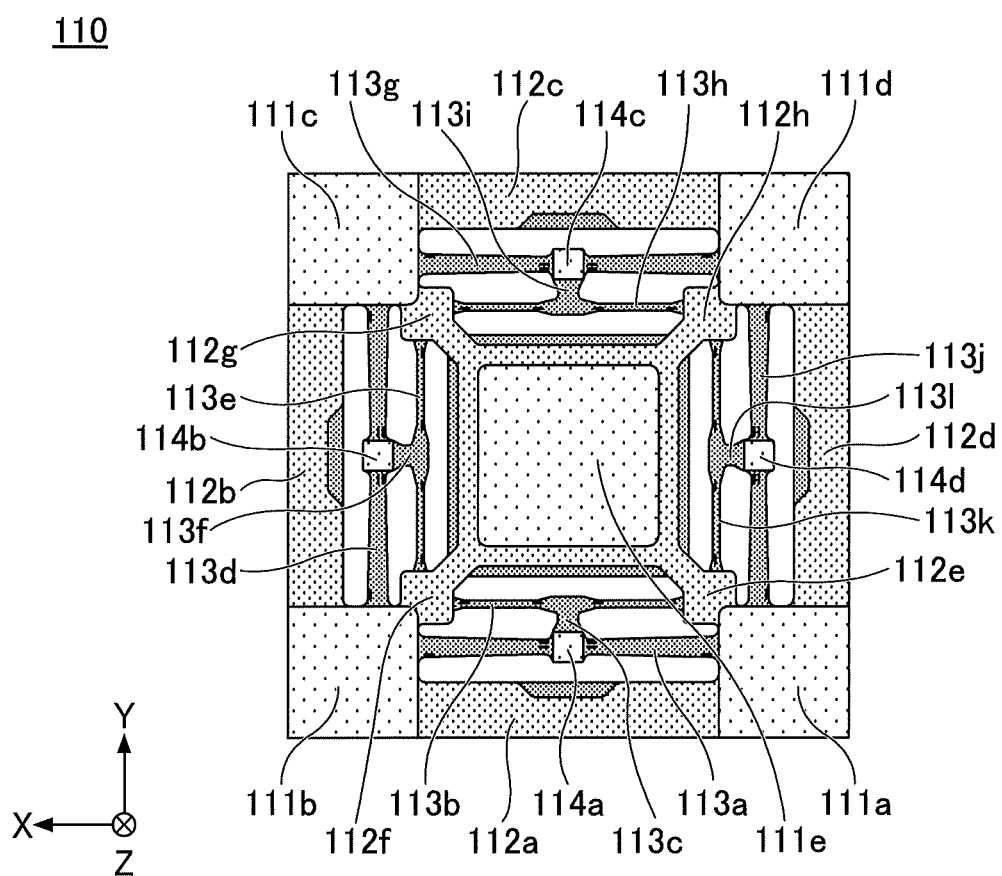
FIG. 26B is a diagram (part 2) of the sensor chip 110 viewed from below in the Z-axis direction.

FIG. 25A is a perspective view of a sensor chip 110 viewed from above in the Z-axis direction, and FIG. 25B is a plan view of the sensor chip 110 viewed from above in the Z-axis direction. FIG. 26A is a perspective view of the sensor chip 110 viewed from below in the Z-axis direction, and FIG. 26B is a bottom view of the sensor chip 110 viewed from below in the Z-axis direction. For the sake of convenience, surfaces having the same height in FIG. 26B are indicated by the same dot pattern.

The sensor chip 110 illustrated in FIG. 25A, FIG. 25B, FIG. 26A, and FIG. 26B is a MEMS sensor chip capable of detection in up to 6 axes at maximum by a single chip, and is formed on a SOI substrate or the like, similarly as in the case of the sensor chip 10. The planar shape of the sensor chip 110 may be a square shape having a side of approximately 3000 μm, for example.

A basic beam structure of the sensor chip 110 is similar to that of the sensor chip 10. Support parts 111a through 111e of the sensor chip 110 corresponds to the support parts 11a through 11e of the sensor chip 10.

Similarly, reinforcing beams 112a through 112h of the sensor chip 110 correspond to the reinforcing beams 12a through 12h of the sensor chip 10. Similarly, detecting beams 113a through 113l of the sensor chip 110 correspond to the detecting beams 13a through 13l of the sensor chip 10. Similarly, force application points 114a through 114d of the sensor chip 110 correspond to the force application points 13a through 14d of the sensor chip 10.

In the sensor chip 110, widths of first detecting beams (detecting beams 113a, 113d, 113g, and 113j) and second detecting beams (detecting beams 113b, 113e, 113h, and 113k) are narrower than widths of third detecting beams (detecting beams 113c, 113f, 113i, and 113l).

In addition, lengths of the first detecting beams (detecting beams 113a, 113d, 113g, and 113j) and the second detecting beams (detecting beams 113b, 113e, 113h, and 113k) are longer than lengths of the third detecting beams (detecting beams 113c, 113f, 113i, and 113l).

Further, by comparing FIGS. 25A and 25B with FIG. 3A and FIG. 3B, it may be seen that the widths and the lengths of the detecting beams differ between the sensor chip 110 and the sensor chip 10. For example, compared to the detecting beam 13a, the detecting beam 113a has a width that is narrower (approximately 0.67 times), and a length that is longer (approximately 1.36 times). Similarly, compared to the detecting beams 13d, 13g, and 13j, the detecting beams 113d, 113g, and 113j have widths that are narrower (approximately 0.67 times), and lengths that are longer (approximately 1.36 times).

In addition, compared to the detecting beam 13b, the detecting beam 113b has a narrowest part with a width that is narrower (approximately 0.47 times), and a length that is longer (approximately 2.9 times). Similarly, compared to the detecting beams 13e, 13h, and 13k, the detecting beams 113e, 113h, and 113k have the narrowest parts with widths that are narrower (approximately 0.47 times), and lengths that are longer (approximately 2.9 times. However, in the detecting beams 113b, 113e, 113h, and 113k, a connecting part that connects to another beam is formed to a size larger than the narrowest part in order to maintain rigidity.

Further, compared to the detecting beam 13c, the detecting beam 113c has a length that is shorter (approximately 0.5 times). The detecting beam 113c has an average width that is approximately the same as that of the detecting beam 13c, however, differs from the detecting beam 13c in that the detecting beam 113c includes a part having a width that gradually decreases toward the side of the support part 111e. Similarly, compared to the detecting beams 13f, 13i, and 13l, the detecting beams 113f, 113i, and 113l have lengths that are shorter (approximately 0.5 times). The detecting beams 13f, 13i, and 13l have an average width that is approximately the same as that of the detecting beam 13c, however, differ from the detecting beam 13c in that the detecting beams 113f, 113i, and 113l include a part having a width that gradually decreases toward the side of the support part 11e.

Moreover, because the detecting beams 113c, 113f, 113i, and 113l are made short, and the detecting beams 113b, 113e, 113h, and 113k are arranged closer to the detecting beams 113a, 113d, 113g, and 113j, an area of the support part 111e becomes larger than an area of the support part 11e.

According to the differences described above, when the same distortion (displacement) is input, the detecting beams 113a, 113d, 113g, and 113j can reduce the stress generated in the beams when compared to the detecting beams 13a, 13d, 13g, and 13j, and the detecting beams 113b, 113e, 113h, and 113k can reduce the stress generated in the beams when compared to the detecting beams 13b, 13e, 13h, and 13k.

Hence, when a large distortion (displacement) is input, the load capacity of the detecting beams 113a, 113d, 113g, and 113j can be increased compared to the load capacity of the detecting beams 13a, 13d, 13g, and 13j. In addition, the load capacity of the detecting beams 113b, 113e, 113h, and 113k can be increased compared to the load capacity of the detecting beams 13b, 13e, 13h, and 13k.

Particularly, the effects of making the detecting beams 113c, 113f, 113i, and 113l short, and arranging the detecting beams 113b, 113e, 113h, and 113k close to the detecting beams 113a, 113d, 113g, and 113j, are large. For this reason, the detecting beams 113b, 113e, 113h, and 113k can be made considerably narrower and longer compared to the detecting beams 13b, 13e, 13h, and 13k, to facilitate bending deformation and reduce stress concentration, and considerably improve the load capacity of the detecting beams 113b, 113e, 113h, and 113k.

Figure 27:
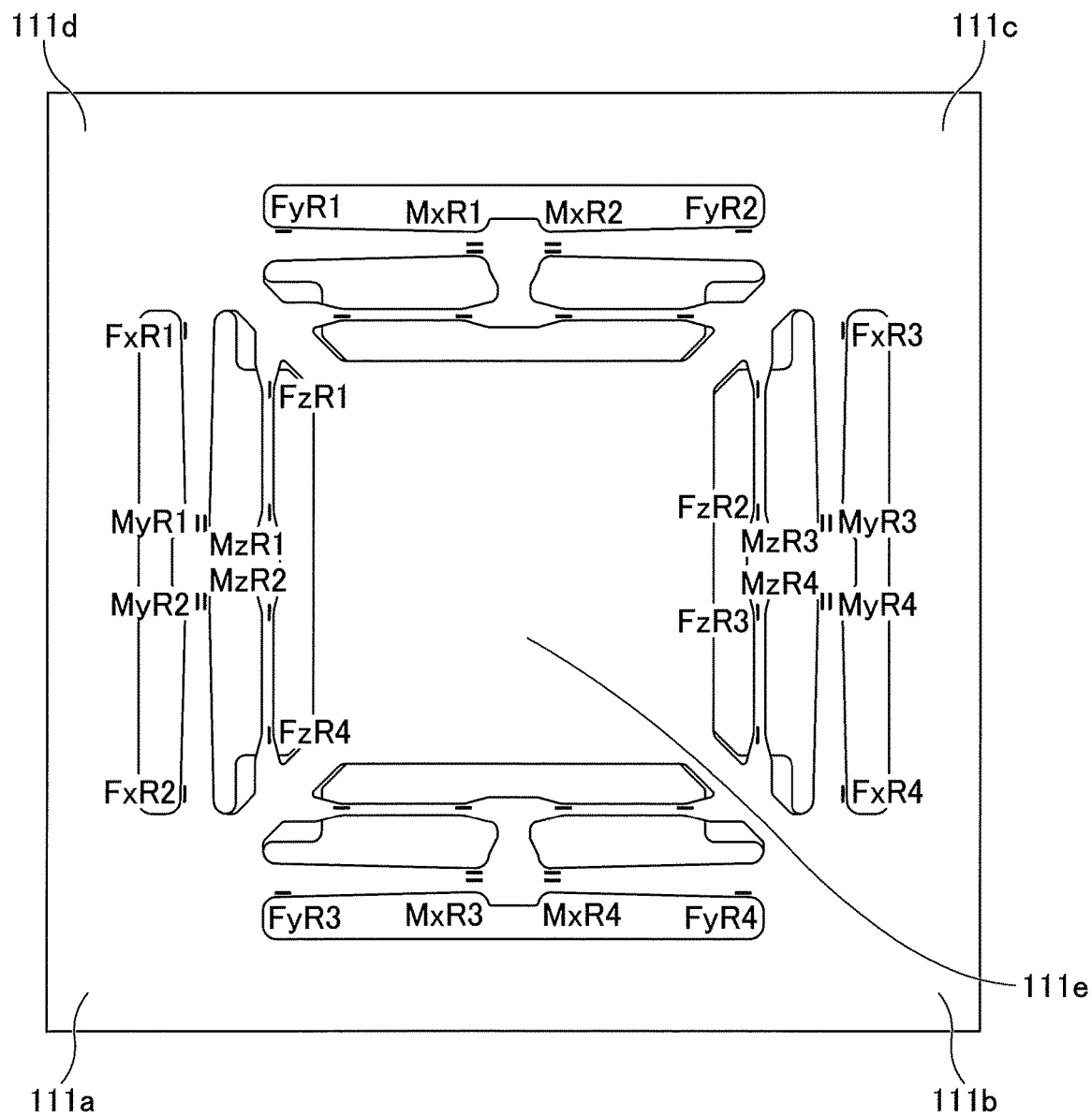
FIG. 27 is a diagram illustrating an example of an arrangement of piezoresistive devices of the sensor chip 110.

FIG. 27 is a diagram illustrating an example of an arrangement of piezoresistive devices of the sensor chip 110. As illustrated in FIG. 25A, FIG. 25B, and FIG. 27, in the detection block corresponding to the force application point 14a, the piezoresistive devices MxR3 and MxR4 are arranged on a bisector that bisects the detecting beam 113a along the longitudinal direction, at symmetrical positions with respect to a bisector that bisects the detecting beam 113c along the longitudinal direction (Y-direction) in a region of the detecting beam 113a close to the detecting beam 113c. In addition, the piezoresistive devices FyR3 and FyR4 are arranged closer to the reinforcing beam 112a than the bisector that bisects the detecting beam 113a along the longitudinal direction, at symmetrical positions with respect to the bisector that bisects the detecting beam 113c along the longitudinal direction in a region of the detecting beam 113a far from the detecting beam 113c.

In addition, in the detection block corresponding to the force application point 14b, the piezoresistive devices MyR3 and MyR4 are arranged on a bisector that bisects the detecting beam 113d along the longitudinal direction, at symmetrical positions with respect to a bisector that bisects the detecting beam 113f along the longitudinal direction (X-direction) in a region of the detecting beam 113a close to the detecting beam 113f. In addition, the piezoresistive devices FxR3 and FxR4 are arranged closer to the reinforcing beam 112b than the bisector that bisects the detecting beam 113d along the longitudinal direction, at symmetrical positions with respect to the bisector that bisects the detecting beam 113f along the longitudinal direction in a region of the detecting beam 113d far from the detecting beam 113f.

Further, the piezoresistive devices MzR3 and MzR4 are arranged closer to the detecting beam 113f than a bisector that bisects the detecting beam 113d along the longitudinal direction, at symmetrical positions with respect to the bisector that bisects the detecting beam 113f along the longitudinal direction in a region of the detecting beam 113d close to the detecting beam 113f. The piezoresistive devices FzR2 and FzR3 are arranged closer to the support part 111e than a bisector that bisects the detecting beam 113e along the longitudinal direction, at symmetrical positions with respect to the bisector that bisects the detecting beam 113f along the longitudinal direction in a region of the detecting beam 113e close to the detecting beam 113f.

Moreover, in the detection block corresponding to the force application point 14c, the piezoresistive devices MxR1 and MxR2 are arranged on a bisector that bisects the detecting beam 113g along the longitudinal direction, at symmetrical positions with respect to a bisector that bisects the detecting beam 113i along the longitudinal direction (Y-direction) in a region of the detecting beam 113g close to the detecting beam 113i. In addition, the piezoresistive devices FyR1 and FyR2 are arranged closer to the reinforcing beam 112c than the bisector that bisects the detecting beam 113g along the longitudinal direction, at symmetrical positions with respect to the bisector that bisects the detecting beam 113i along the longitudinal direction in a region of the detecting beam 113g far from the detecting beam 113i.

Further, in the detection block corresponding to the force application point 14d, the piezoresistive devices MyR1 and MyR2 are arranged on a bisector that bisects the detecting beam 113j along the longitudinal direction, at symmetrical positions with respect to a bisector that bisects the detecting beam 113l along the longitudinal direction in a region of the detecting beam 113j close to the detecting beam 113l. In addition, the piezoresistive devices FxR1 and FxR2 are arranged closer to the reinforcing beam 112d than the bisector that bisects the detecting beam 113j along the longitudinal direction, at symmetrical positions with respect to the bisector that bisects the detecting beam 113l along the longitudinal direction in a region of the detecting beam 113j far from the detecting beam 113l.

Moreover, the piezoresistive devices MzR1 and MzR2 are arranged closer to the detecting beam 113k than the bisector that bisects the detecting beam 113j along the longitudinal direction, at symmetrical positions with respect to the bisector that bisects the detecting beam 113l along the longitudinal direction in a region of the detecting beam 113j close to the detecting beam 113l. The piezoresistive devices FzR1 and FzR4 are arranged closer to the support part 111e than a bisector that bisects the detecting beam 113k along the longitudinal direction, at symmetrical positions with respect to the bisector that bisects the detecting beam 113*l* along the longitudinal direction in a region of the detecting beam 113*k* far from the detecting beam 113*l*.

Accordingly, in the sensor chip 110, a plurality of piezoresistive devices are separately arranged in each of the detection blocks, similarly as in the case of the sensor chip 10. Hence, the displacement in a predetermined axial direction can be detected in up to 6 axes at maximum, based on changes in outputs of the plurality of piezoresistive devices arranged on predetermined beams, according to the direction (axial direction) of the force or displacement applied (transmitted) to the force application points 114*a* through 114*d*, similarly as in the case of the sensor chip 10.

The sensor chip 110 includes dummy piezoresistive devices that are arranged, in addition to the piezoresistive devices used for the distortion detection. All of the piezoresistive devices, including the piezoresistive devices used for the distortion detection and the dummy piezoresistive devices, are arranged in point symmetry with respect to the center of the support part 111*e*.

Figure 28A:
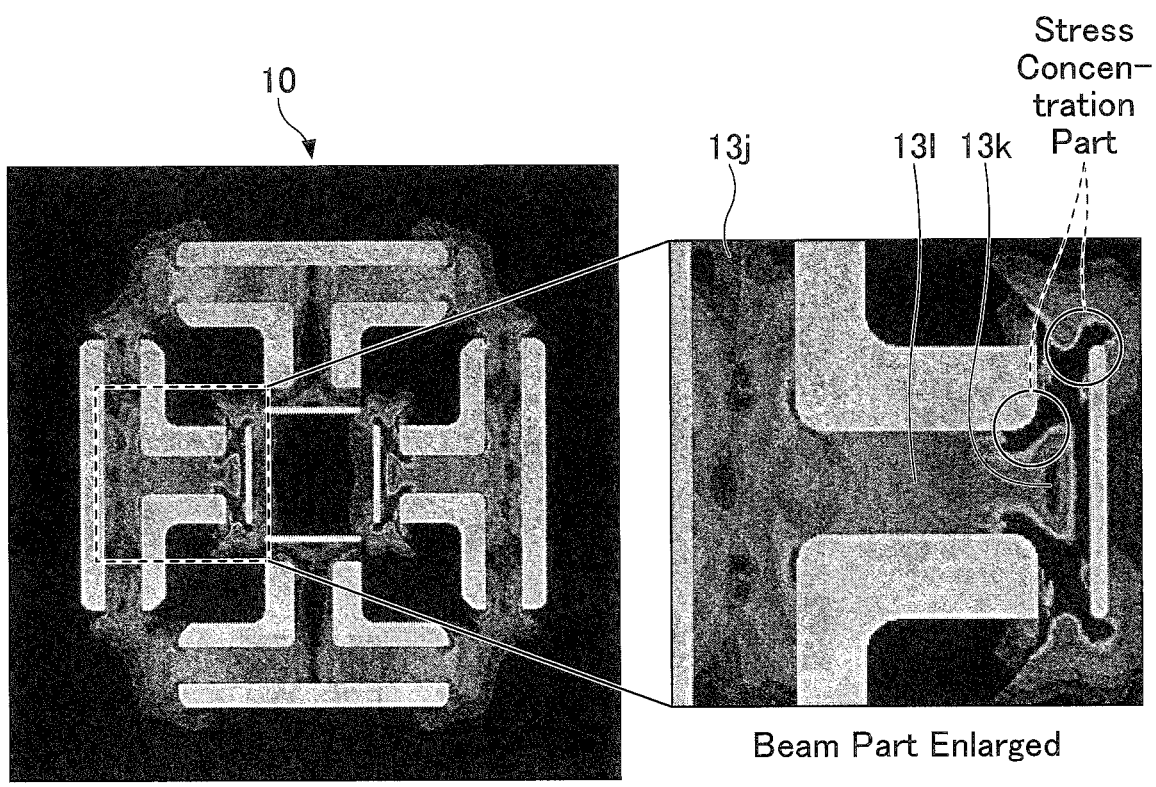
FIG. 28A is a diagram (part 1) for explaining an improvement of load capacity of the sensor chip 110.

FIG. 28A through FIG. 31 are diagrams for explaining an improvement of the load capacity of the sensor chip 110. FIG. 28A illustrates a simulation result of a stress generation distribution when the force Fx in the X-axis direction is applied in the sensor chip 10, and a right part of the figure illustrates a left part of the figure indicated by broken lines on an enlarged scale. FIG. 28B illustrates a simulation result of the stress generation distribution when the force Fx in the X-axis direction is applied in the sensor chip 110, and a right part of the figure illustrates a left part of the figure indicated by broken lines on an enlarged scale.

Figure 28B:
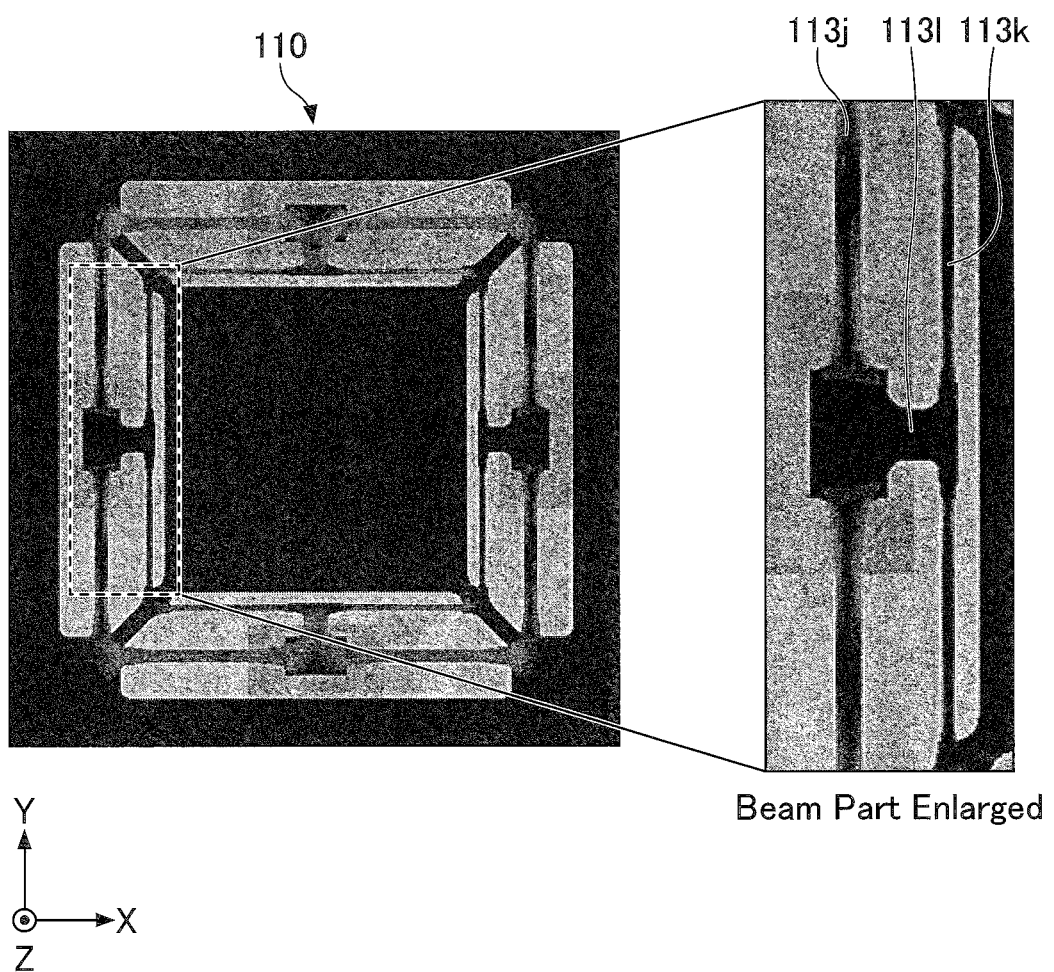
FIG. 28B is a diagram (part 2) for explaining the improvement of the load capacity of the sensor chip 110.

As illustrated in FIG. 28A, in the sensor chip 10, the detecting beam 13*k* that is short and uneasily bent becomes a stress concentration part. As illustrated in FIG. 28B, in the sensor chip 110, the detecting beam 113*k* is narrower and longer compared to the detecting beam 13*k*. In addition, the detecting beam 113*j* is narrower and longer compared to the detecting beam 13*j*.

The description above relate to the detecting beam 113*k* and the detecting beam 13*k*, and the detecting beam 113*j* and the detecting beam 13*j*. However, the same applies to the detecting beam 113*a* and the detecting beam 13*a*, and the detecting beam 113*b* and the detecting beam 13*b*, the detecting beam 113*d* and the detecting beam 13*d*, and the detecting beam 113*e* and the detecting beam 13*e*, and the detecting beam 113*g* and the detecting beam 13*g*, and the detecting beam 113*h* and the detecting beam 13*h*.

Figure 29:
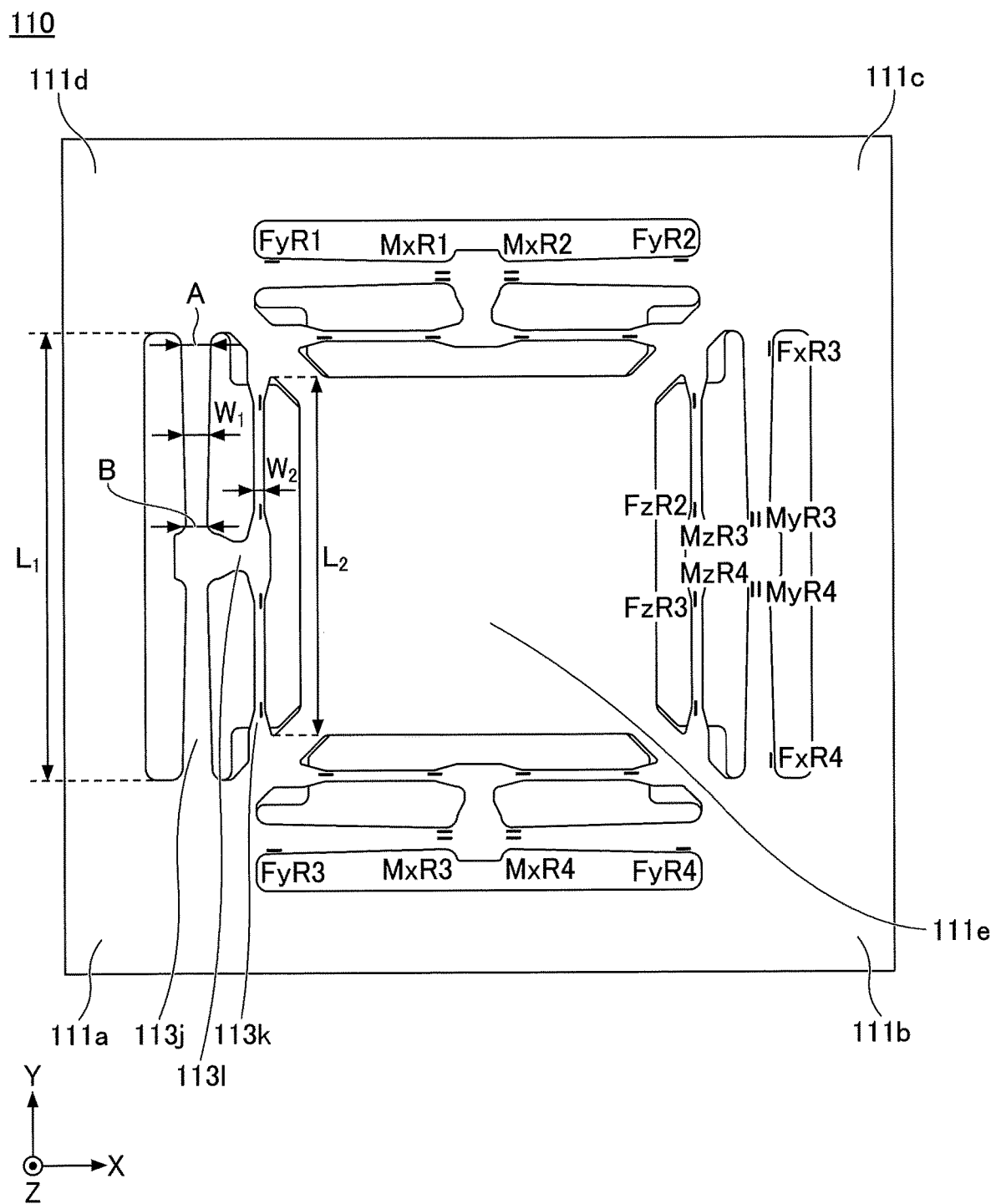
FIG. 29 is a diagram (part 3) for explaining the improvement of the load capacity of the sensor chip 110.

A maximum stress generated in the detecting beam can be made lower than or equal to that of the sensor chip 10, by adjusting a ratio of a length $L_1$ of the detecting beam 113*j* to a length $L_2$ of the detecting beam 113*k* illustrated in FIG. 29 (similarly for ratios of the lengths of the detecting beams 113*a*, 113*d*, and 113*g* to the lengths of the detecting beams 113*b*, 113*e*, and 113*h*), and a ratio of an average width $W_2$ of the detecting beam 113*k* and an average width $W_1$ of the detecting beam 113*j* (similarly for ratios of the average widths of the detecting beams 113*b*, 113*e*, and 113*h* to the ratios of the average widths of the detecting beams 113*a*, 113*d*, and 113*g*).

Figure 30A:
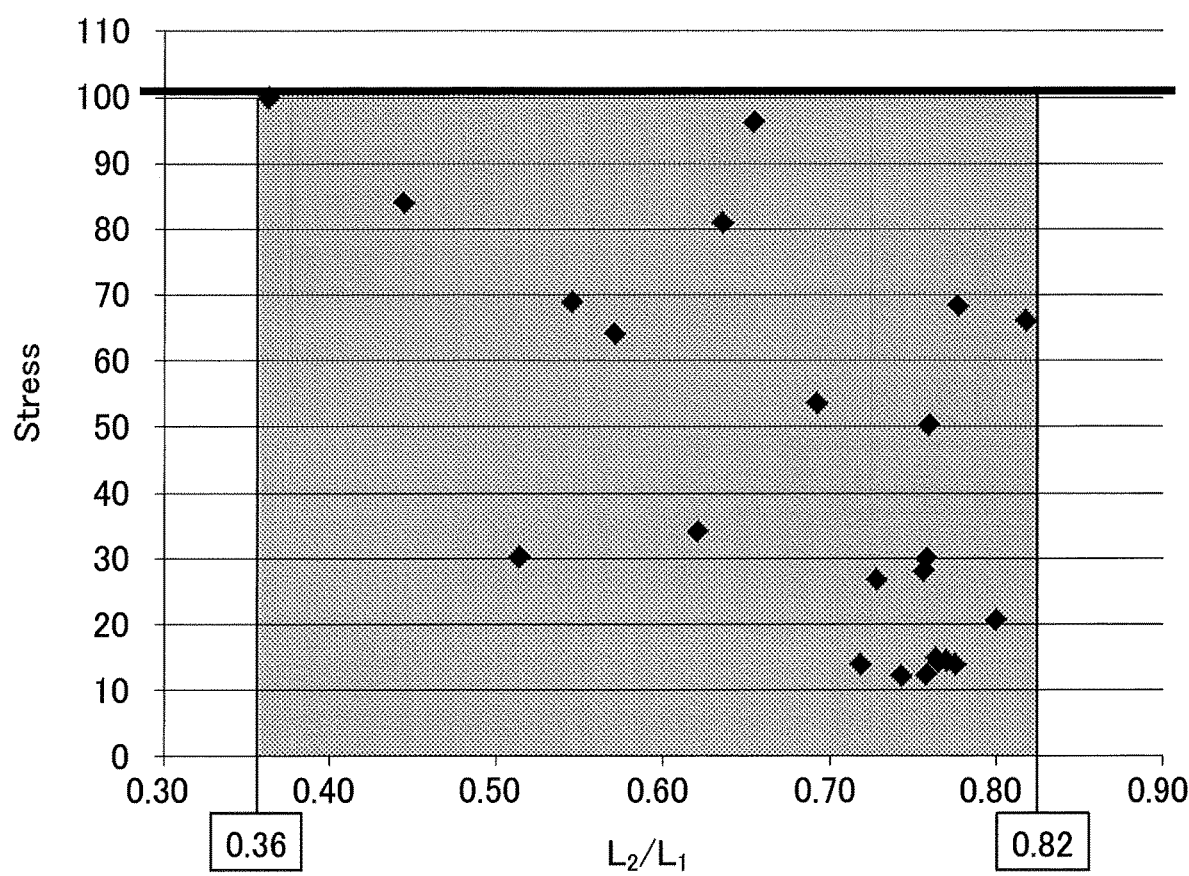
FIG. 30A is a diagram (part 4) for explaining the improvement of the load capacity of the sensor chip 110.
Figure 30B:
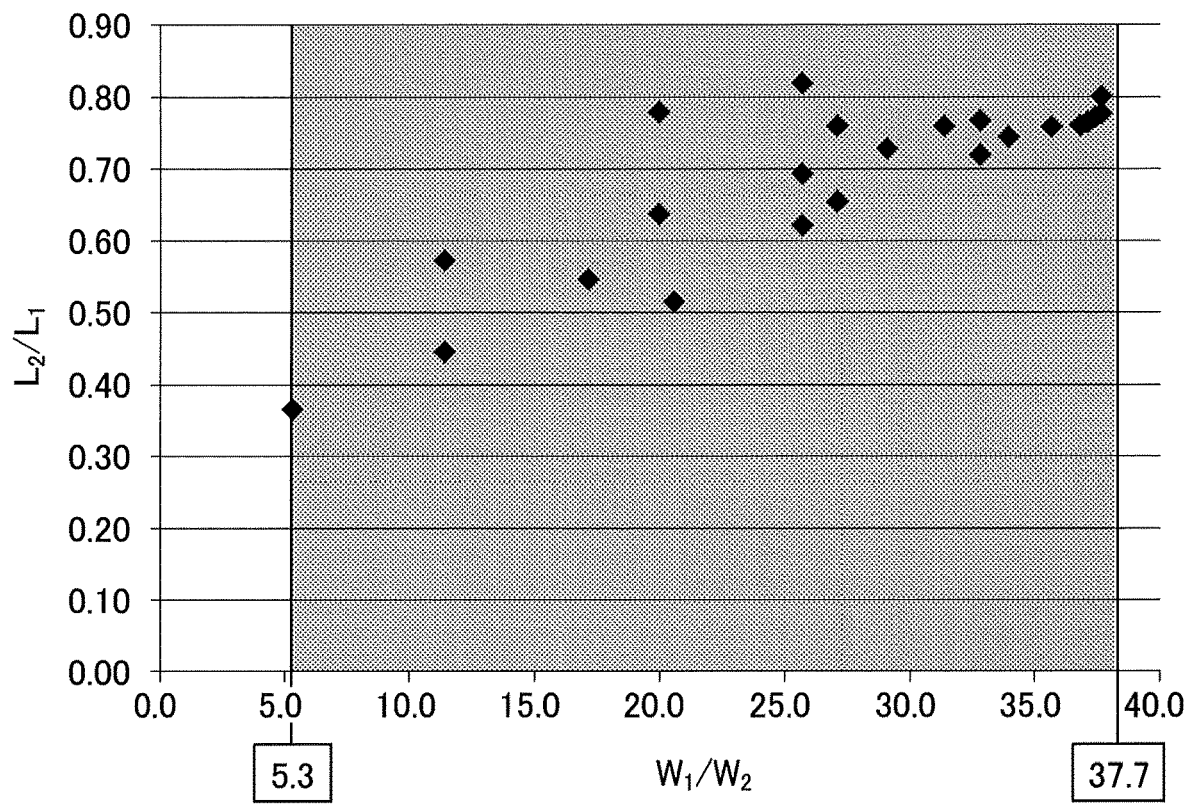
FIG. 30B is a diagram (part 5) for explaining the improvement of the load capacity of the sensor chip 110.

FIG. 30A illustrates a simulation result of the maximum stress generated in the stress concentration part of the sensor chip 110, using $L_2/L_1$ as a parameter, for a case in which the maximum stress generated in the stress concentration part of the sensor chip 10 illustrated in FIG. 28A is regarded as being 100. In FIG. 30A, the abscissa indicates $L_2/L_1$, and the ordinate indicates the stress. FIG. 30B illustrates a relationship between $W_1/W_2$ and $L_2/L_1$ for plots of $L_2/L_1$ that is 0.36 or higher and 0.82 or lower. In FIG. 30B, the abscissa indicates $W_1/W_2$, and the ordinate indicates $L_2/L_1$.

As illustrated in FIG. 30A and FIG. 30B, when $L_2/L_1$ is 0.36 or higher and 0.82 or lower, and $W_1/W_2$ is 5.3 or higher and 7.7 or lower, the maximum stress generated in the detecting beam of the sensor chip 110 can be made lower than or equal to that of the sensor chip 10.

Figure 31:
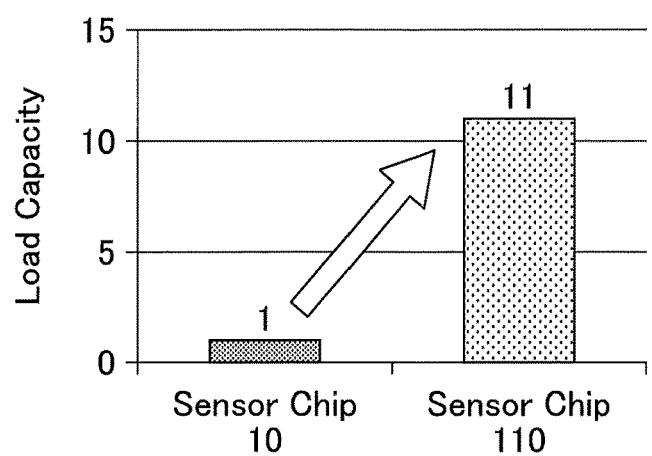
FIG. 31 is a diagram (part 6) for explaining the improvement of the load capacity of the sensor chip 110.

Accordingly, in the sensor chip 110, the maximum stress generated in the detecting beam can be reduced by selecting the relationship between $W_1/W_2$ and $L_2/L_1$ and decreasing the rigidity, so as to improve the load capacity of the sensor chip 110 over that of the sensor chip 10. By selecting the relationship between $W_1/W_2$ and $L_2/L_1$, it is possible to greatly improve the load capacity (approximately 11 times in the example illustrated in FIG. 31) compared to the sensor chip 10, as illustrated in FIG. 31, for example.

Figure 32A:
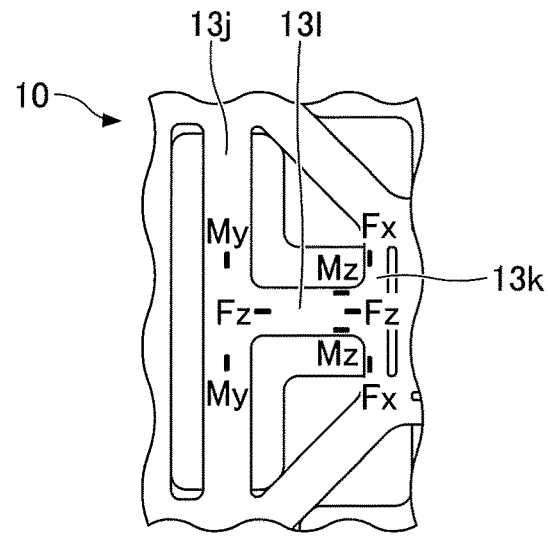
FIG. 32A is a diagram (part 1) for explaining an improvement of sensitivity of the sensor chip 110.
Figure 32B:
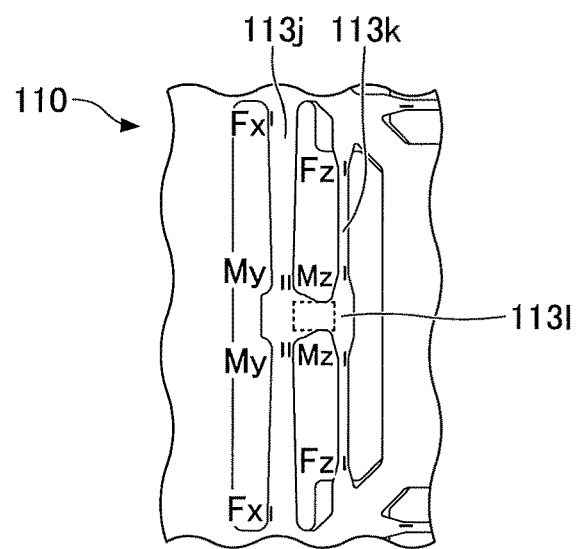
FIG. 32B is a diagram (part 2) for explaining the improvement of the sensitivity of the sensor chip 110.

FIG. 32A and FIG. 32B are diagrams for explaining an improvement of sensitivity of the sensor chip 110. As illustrated in FIG. 32A and FIG. 32B, in the sensor chip 110, unlike the sensor chip 10, no piezoresistive device is arranged on the detecting beam 113*l* (part indicated by broken lines) having a smaller deformation with respect to the stress by being made shorter, and the piezoresistive device is arranged on the detecting beams 113*j* and 113*k* in a vicinity of positions where the stress becomes a maximum. The arrangement is similar for the detecting beams 113*c*, 113*f*, and 113*l*.

Figure 32C:
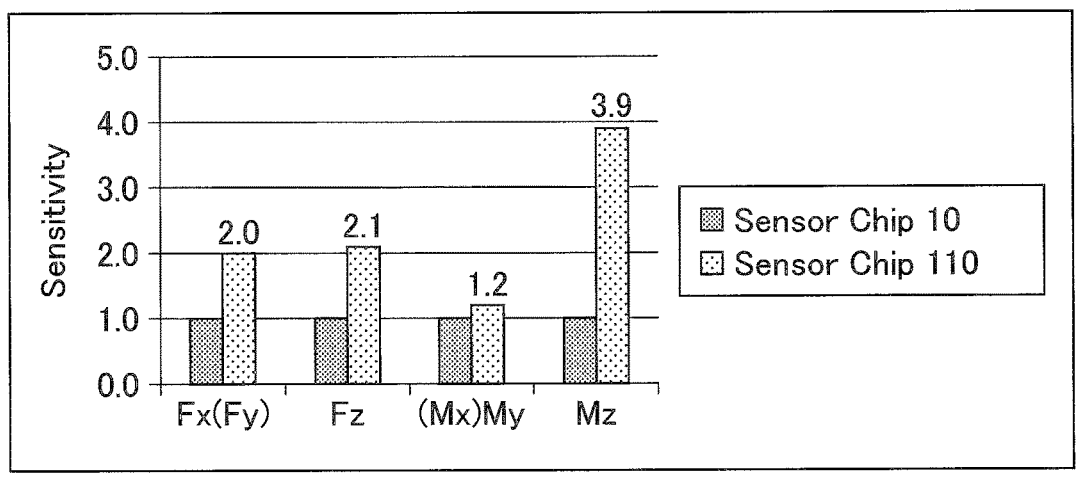
FIG. 32C is a diagram (part 3) for explaining the improvement of the sensitivity of the sensor chip 110.

As a result, as illustrated in a simulation result of FIG. 32C, the sensor chip 110 can input the stress more efficiently than the sensor chip 10, to thereby improve the sensitivity (change in resistance of the piezoresistive device with respect to the same stress).

In other words, in the sensor chip 110, no piezoresistive device is arranged on the detecting beams 113*c*, 113*f*, 113*i*, and 113 having a smaller deformation with respect to the stress by being made shorter. Instead, the piezoresistive device is arranged on the detecting beams 113*a*, 113*d*, 113*g*, and 113*j* that are narrower and longer than the detecting beams 113*c*, 113*f*, 113*i*, and 113*l* and more easily undergo the bending deformation, in the vicinity of positions where the stress becomes the maximum. As a result, the sensor chip 110 can efficiently input the stress, to thereby improve the sensitivity (change in the resistance of the piezoresistive device with respect to the same stress).

When the beam width on a B-side of the detecting beam 113*j* (similarly for the detecting beams 113*a*, 113*d*, and 113*g*) illustrated in FIG. 29 is set to a width that is 75% to 80% of the beam width on an A-side, and the detecting beam 113*j* is tapered to decrease in width from the A-side toward the B-side, it is possible to improve the sensor sensitivity and simultaneously maintain the load capacity. When the beam width on the B-side becomes 75% or less of the beam width on the A-side, the load capacity deteriorates and the beam becomes more easily damaged. In addition, when the beam width on the B-side becomes 80% or more of the beam width on the A-side, the sensor sensitivity deteriorates.

Figure 33:
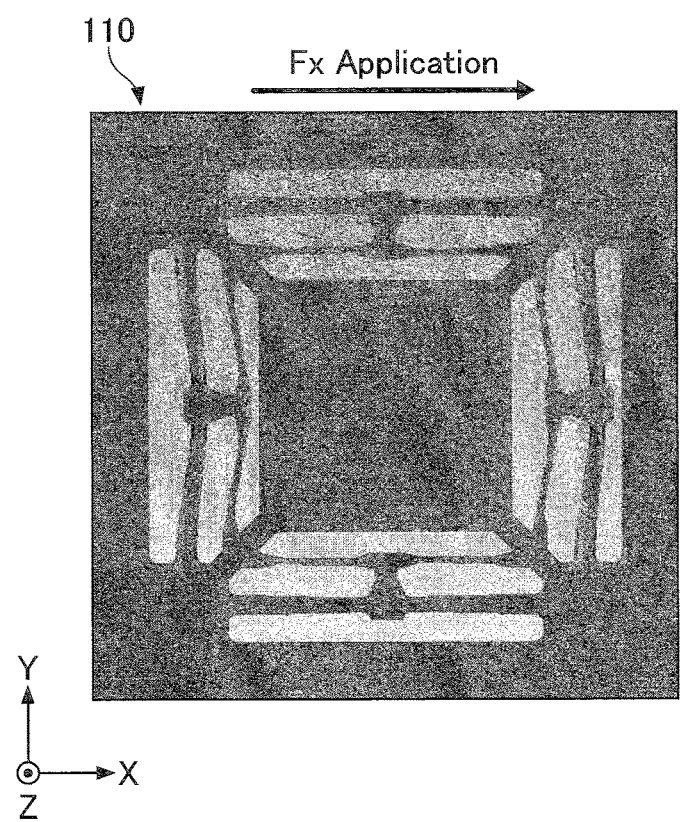
FIG. 33 is a diagram (part 1) for explaining an improvement of other axial properties of the sensor chip 110.
Figure 34A:
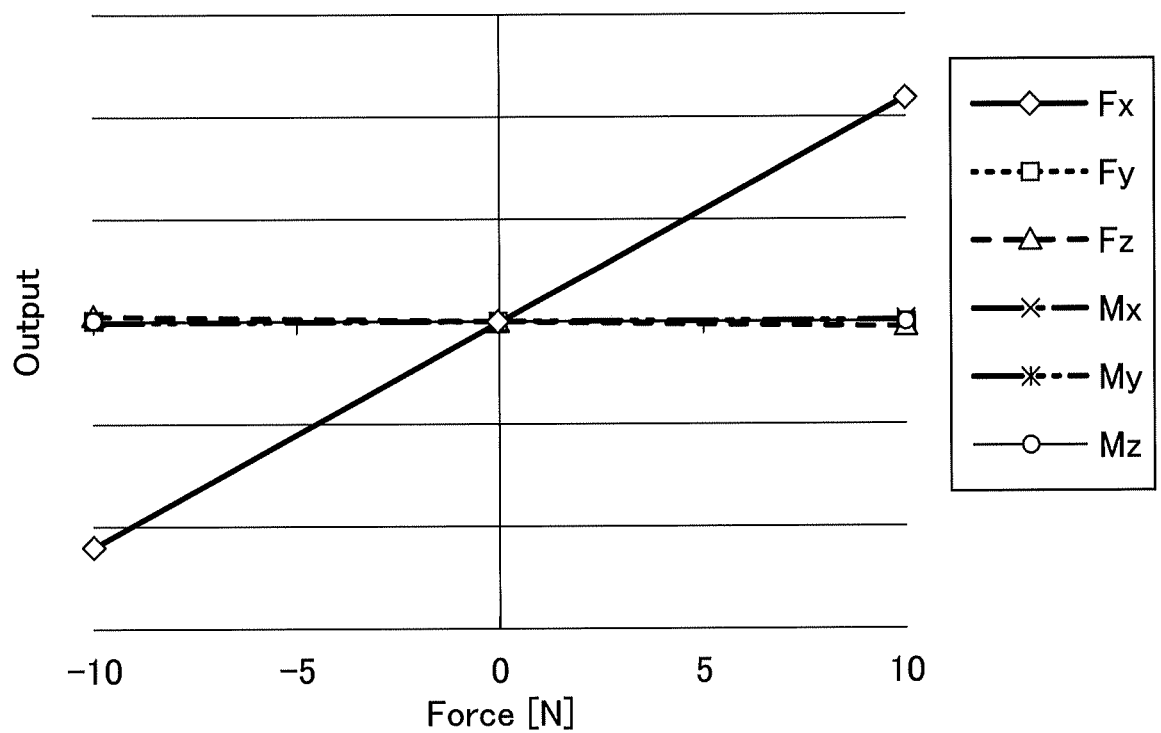
FIG. 34A is a diagram (part 2) for explaining the improvement of the other axial properties of the sensor chip 110.
Figure 34B:
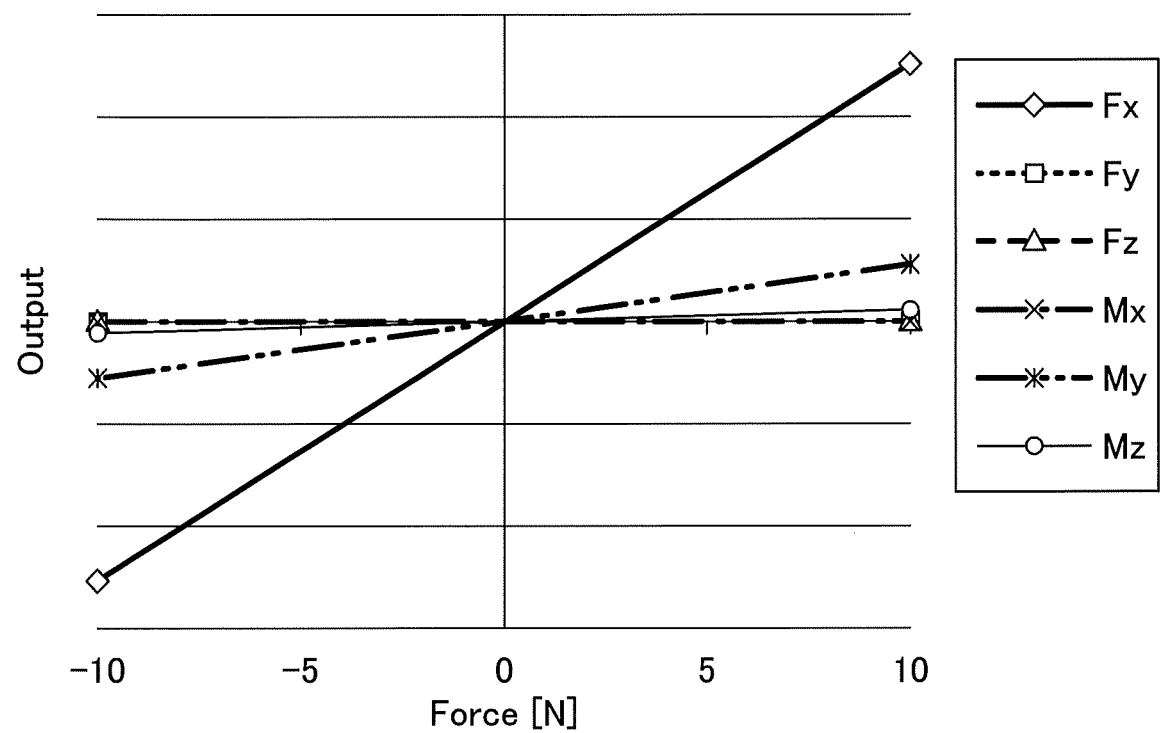
FIG. 34B is a diagram (part 3) for explaining the improvement of the other axial properties of the sensor chip 110.

FIG. 33, FIG. 34A, and FIG. 34B are diagrams for explaining an improvement of other axial properties (properties for isolating force and moment) of the sensor chip 110. The other axial properties illustrated in FIG. 34A were obtained as a result of performing a simulation by applying the force Fx in the X-axis direction in the sensor chip 110 as illustrated in FIG. 33. FIG. 34B illustrates the other axial properties that were obtained as a result of applying the force Fx in the X-axis direction in the sensor chip 10.

When FIG. 34A and FIG. 34B are compared, it may be seen that a component of the moment My appears when the force Fx is applied in the sensor chip 10 as illustrated in FIG. 34B, but the other axial components, including the component of the moment My, are approximately zero when the force Fx is applied in the sensor chip 110, as illustrated in FIG. 34A.

It may be regarded that, the reason why the component of the moment My appears in FIG. 34B, is because the detecting beams 13a, 13d, 13g, and 13j of the sensor chip 10 are deformed in up-and-down directions due to the wide and short detecting beams 13b, 13e, 13h, and 13k that are less easily deformed in the lateral direction.

On the other hand, the detecting beams 113b, 113e, 113h, and 113k of the sensor chip 110 are narrower and longer than the detecting beams 13b, 13e, 13h, and 13k of the sensor chip 10, and are easily deformed in the lateral direction (Fx, Fy) and the twist direction (Mx, My) with respect to the thickness. In other words, the detecting beams 113a, 113d, 113g, and 113j are not deformed in the up-and-down directions. As a result, it may be regarded that, the reason why the component of the moment My does not appear in FIG. 34A, is because the properties for isolating the translational direction force and moment (that is, other axial properties) improved.

(Simulation of Stress)

FIG. 35A, FIG. 35B, FIG. 36A, and FIG. 36B are simulation results of the stress generated in the sensor chip 110 when the force and moment are applied. In FIG. 35A, FIG. 35B, FIG. 36A, and FIG. 36B, the vertical tensile stress is indicated by "+", and the vertical compressive stress is indicated by "−".

Figure 35A:
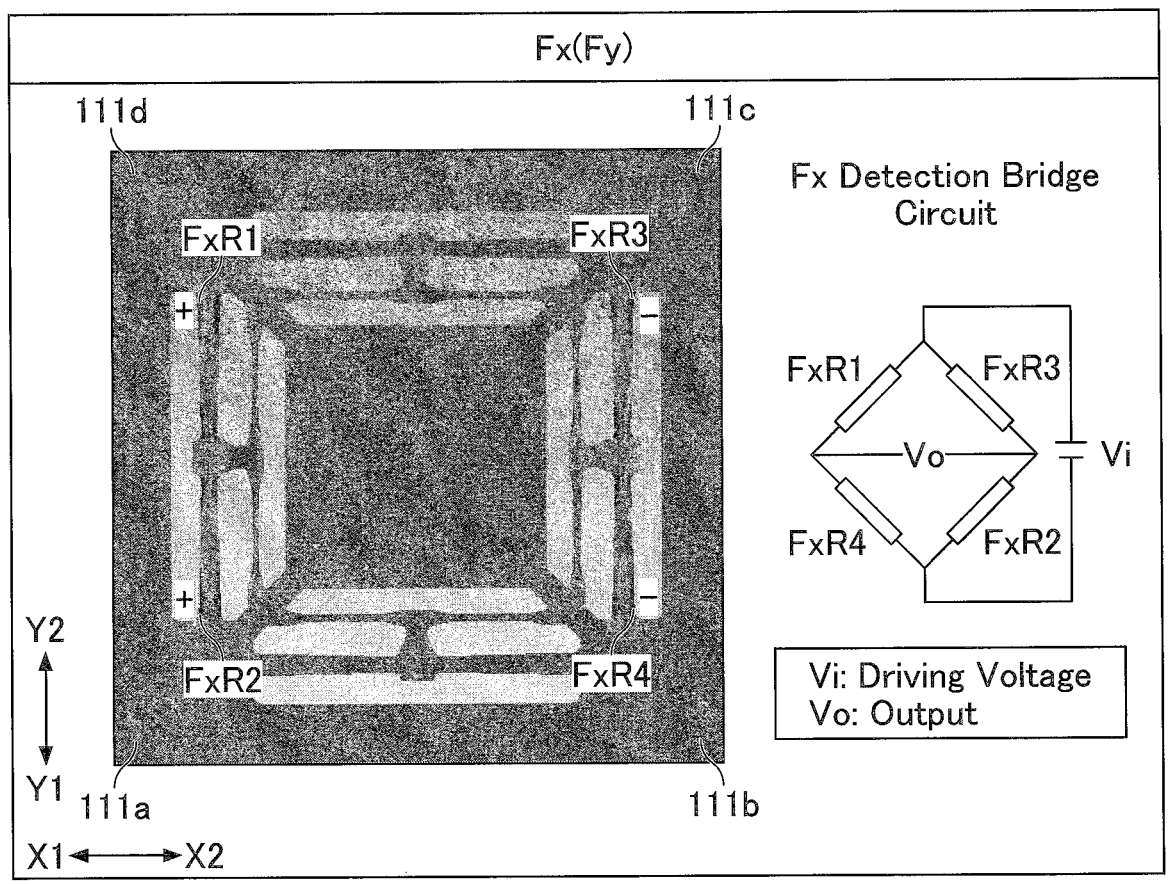
FIG. 35A is a simulation result (part 1) of stress generated in the sensor chip 110 when the force and moment are applied.

In a case in which the force Fx is applied in the direction from X1 to X2 along the X-axis, the stress illustrated in FIG. 35A is generated in the sensor chip 110. More particularly, by the application of the force Fx, the detecting beams 113d and 113j are distorted in the direction of the force Fx.

Because the piezoresistive devices FxR1 and FxR2 are positioned on the X1 side than the center along the longitudinal direction of the detecting beam 113d, the vertical tensile stress is generated to increase the resistance. On the other hand, because the piezoresistive devices FxR3 and FxR4 are positioned on the X2 side than the center along the longitudinal direction of the detecting beam 113j, the vertical compressive stress is generated to decrease the resistance. Accordingly, a voltage is output from the bridge circuit illustrated in FIG. 35A because the piezoresistive devices FxR1 through FxR4 become imbalanced, to thereby enable detection of the force Fx. The force Fy can be detected in a similar manner.

Figure 35B:
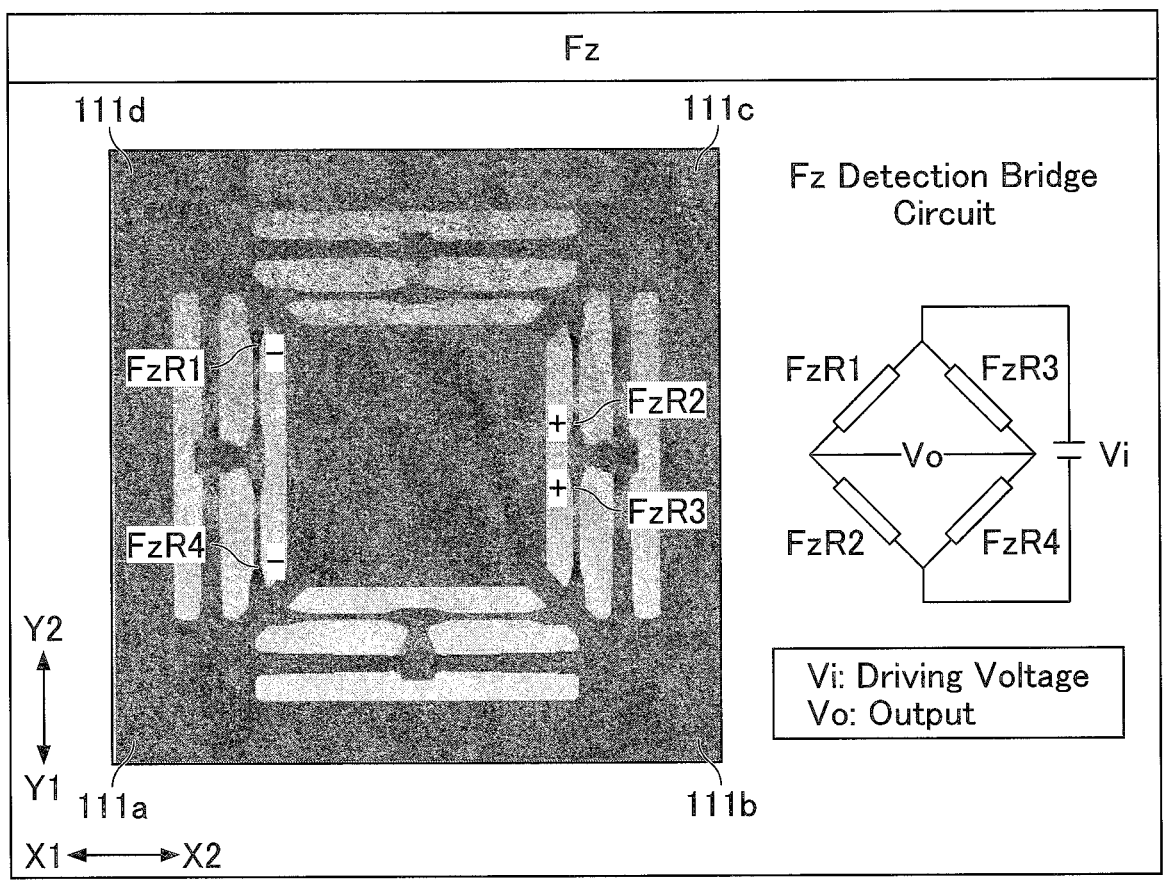
FIG. 35B is the simulation result (part 2) of the stress generated in the sensor chip 110 when the force and moment are applied.

In a case in which the force Fz is applied in the direction from Z2 to Z1 (from the top surface side to the bottom surface side of the sensor chip 110) along the Z-axis, the stress illustrated in FIG. 35B is generated in the sensor chip 110. More particularly, by the application of the force Fz, the detecting beams 113a, 113b, 113g, 113h, 113d, 113e, 113j, 113k, 113c, 113f, 113l, and 113i are distorted in the direction of the force Fz.

In this case, the vertical tensile stress is generated in the piezoresistive devices FzR1 and FzR4 to increase the resistance. In addition, the vertical compressive stress is generated in the piezoresistive devices FzR2 and FzR3 to decrease the resistance. Accordingly, a voltage is output from the bridge circuit illustrated in FIG. 35B because the piezoresistive devices FzR1 through FzR4 become imbalanced, to thereby enable detection of the force Fz.

Figure 36A:
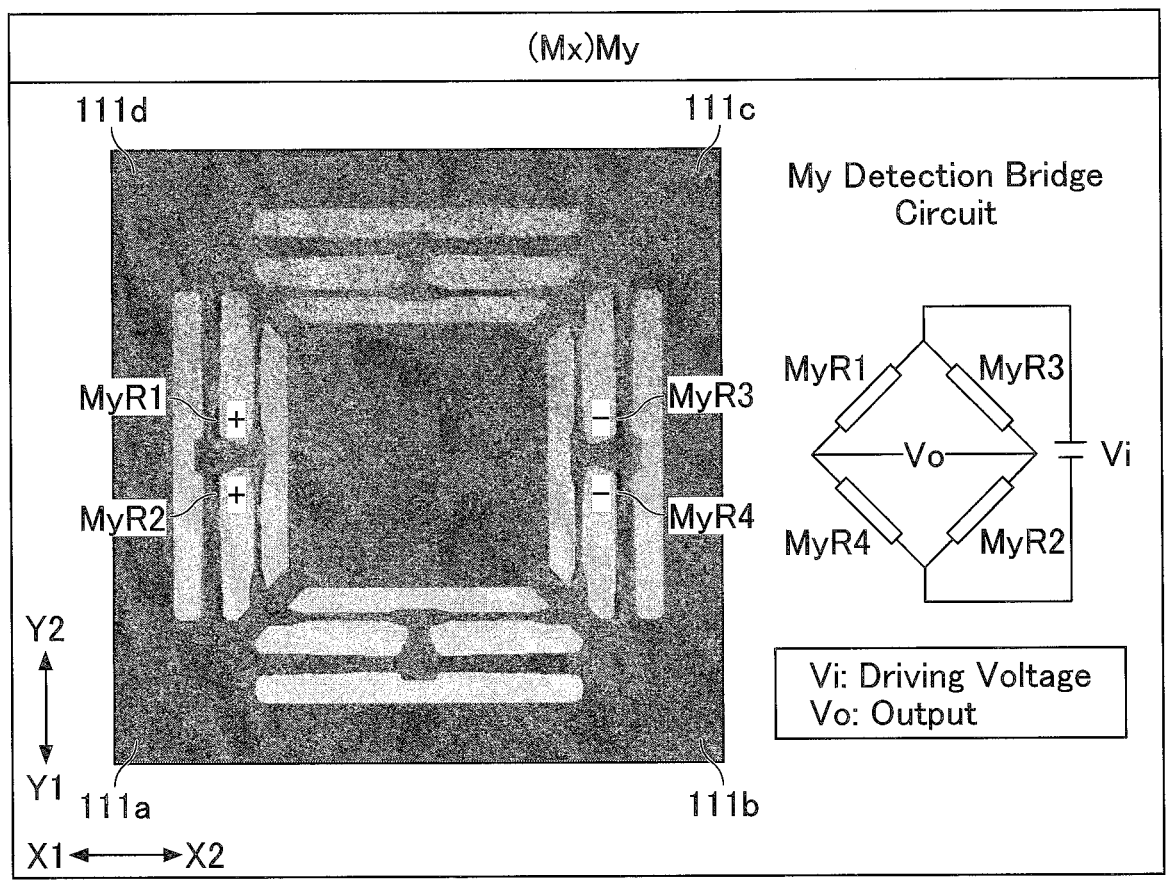
FIG. 36A is the simulation result (part 3) of the stress generated in the sensor chip 110 when the force and moment are applied.

In a case in which the moment My is applied in the direction of X1-Z2-X2 using the Y-axis as the rotation axis, the stress illustrated in FIG. 36A is generated in the sensor chip 110. More particularly, by applying the moment My, the detecting beams 113d and 113j are distorted in the direction of the moment My.

In this case, the vertical tensile stress is generated in the piezoresistive devices MyR1 and MyR2 to increase the resistance. In addition, the vertical compressive stress is generated in the piezoresistive devices MyR3 and MyR4 to decrease the resistance. Accordingly, the piezoresistive devices MyR1 through MyR4 become imbalanced, to thereby enable detection of the moment My by the bridge circuit illustrated in FIG. 36A.

Figure 36B:
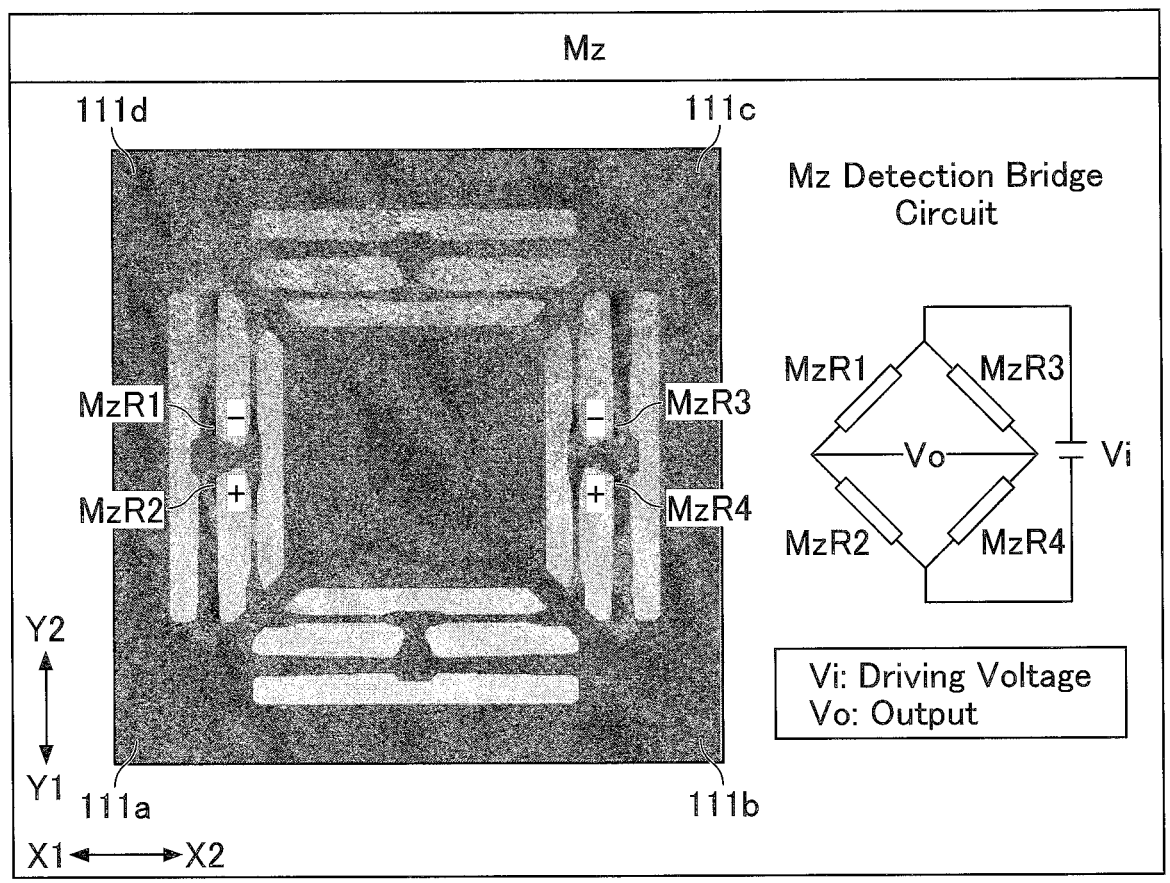
FIG. 36B is the simulation result (part 4) of the stress generated in the sensor chip 110 when the force and moment are applied.

In a case in which the moment Mz is applied in the direction of X2-Y2-X1 using the Z-axis as the rotation axis, the stress illustrated in FIG. 36B is generated in the sensor chip 110. More particularly, by applying the moment Mz, the detecting beams 113a, 113b, 113g, 113h, 113d, 113e, 113j, 113k, 113c, 113f, 113l, and 113i are distorted in the direction of the moment Mz.

In this case, the vertical tensile stress is generated in the piezoresistive devices MzR1 and MzR4 to increase the resistance. In addition, the vertical compressive stress is generated in the piezoresistive devices MzR2 and MzR3 to decrease the resistance. Accordingly, the piezoresistive devices MzR1 through MzR4 become imbalanced, to thereby enable detection of the moment Mz by the bridge circuit illustrated in FIG. 36B.

Accordingly, when the displacement (force or moment) is input to the force application point of the sensor chip 110, the stress of the bend and torsion according to the input is generated in a predetermined detecting beam. The resistance of the piezoresistive device, arranged at a predetermined position of the detecting beam, changes according to the generated stress, to thereby enable the output voltage of each bridge circuit formed in the sensor chip 110 to be obtained from the electrode 15. Further, the output voltage from the electrode 15 may be output to the outside via the input and output substrate 30.

In addition, in the sensor chip 110, one bridge circuit is formed for one axis, to thereby enable the output of each axis to be obtained without requiring outputs to be combined. As a result, multiaxial displacements can be detected and output by a simple method that does not require complex computations or signal processing.

Further, the piezoresistive devices are arranged on different detecting beams according to the kind of input to the piezoresistive devices. Thus, the sensitivity of an arbitrary axis can be adjusted independently by modifying the rigidity (thickness or width) of the corresponding detecting beam.

Detailed description of preferable embodiments are described above. However, the present invention is not limited to the embodiments described above, and various variations and substitutions may be made to the embodiments described above without departing from the scope of the present invention.

This application is based upon and claims the benefit of priority of Japanese Patent Application No. 2016-199486 filed on Oct. 7, 2016, and Japanese Patent Application No. 2017-086966 filed on Apr. 26, 2017, the entire contents of which are incorporated herein by reference.

DESCRIPTION OF THE REFERENCE NUMERALS 1, 1A, 1B, 1C Force sensor device
10, 50, 110 Sensor chip 11a-11e, 51a-51e, 111a-111e Support part
12a-12h, 52a-52d, 112a-112h Reinforcing beam
13a-13l, 53a-53l, 113a-113l Detecting beam
14a-14d, 54a-54d, 114a-114d Force application point
15 Electrode
16 Wiring
17 Temperature sensor
20 Flexure element
21, 81 Base
22a-22e, 25a-25d, 82a-82i Column
23a-23d, 26a-26d Beam
24a-24d Input part
27a-27d, 61a-61d Projecting part
30 Input and output substrate
40, 60 Force-receiving plate
40x, 40y Recess
41, 42 Adhesive agent
70 Package
80 Column structure part

The invention claimed is:

1. A sensor chip configured to detect a displacement in a predetermined axial direction in up to 6 axes at maximum, based on changes in outputs of a plurality of distortion detection devices arranged on predetermined beams, according to directions of forces or displacements applied to force application points, comprising:
   a substrate;
   first support parts arranged at four corners of the substrate;
   a second support part arranged at a center of the substrate;
   first detecting beams respectively connecting adjacent ones of the first support parts to each other;
   second detecting beams respectively provided in parallel with respect to the first detecting beams between respective ones of the first detecting beams and the second support part;
   third detecting beams connecting the first detecting beams and the second detecting beams, in sets of the first detecting beams and the second detecting beams provided in parallel;
   force application points, arranged at intersections of the first detecting beams and the third detecting beams, and applied with the forces; and
   the plurality of distortion detection devices arranged at predetermined positions on the first detecting beams and the second detecting beams,
   wherein a displacement in a Z-axis direction along a thickness direction of the substrate is detected based on deformations of the first detecting beams or the second detecting beams, and
   wherein displacements in an X-axis direction and a Y-axis direction respectively perpendicular to the Z-axis direction are detected based deformations of the first detecting beams.

2. A sensor chip configured to detect a displacement in a predetermined axial direction in up to 6 axes at maximum, based on changes in outputs of a plurality of distortion detection devices arranged on predetermined beams, according to directions of forces or displacements applied to force application points, comprising:
   a substrate;
   first support parts arranged at four corners of the substrate;
   a second support part arranged at a center of the substrate;
   first detecting beams respectively connecting adjacent ones of the first support parts to each other;
   second detecting beams respectively provided in parallel with respect to the first detecting beams between respective ones of the first detecting beams and the second support part;
   third detecting beams connecting the first detecting beams and the second detecting beams, in sets of the first detecting beams and the second detecting beams provided in parallel;
   force application points, arranged at intersections of the first detecting beams and the third detecting beams, and applied with the forces; and
   the plurality of distortion detection devices arranged at predetermined positions on the first detecting beams, the second detecting beams, and the third detecting beams,
   wherein a displacement in a Z-axis direction along a thickness direction of the substrate is detected based on deformations of at least the third detecting beams,
   wherein displacements in an X-axis direction and a Y-axis direction respectively perpendicular to the Z-axis direction are detected based deformations of at least one of the first detecting beams and the second detecting beams,
   wherein the distortion detection devices configured to detect a moment in the X-axis direction and a moment in the Y-axis direction are arranged on the first detecting beams,
   wherein the distortion detection devices configured to detect a force in the X-axis direction and a force in the Y-axis direction are arranged on the second detecting beams, and
   wherein the distortion detection devices configured to detect a moment in the Z-axis direction and a force in the Z-axis direction are arranged on the third detecting beams.

3. The sensor chip as claimed in claim 1, wherein
   the distortion detection devices configured to detect a moment in the X-axis direction, a moment in the Y-axis direction, a force in the X-axis direction, a force in the Y-axis direction, and a moment in the Z-axis direction are arranged on the first detecting beams, and
   a distortion detection device configured to detect a force in the Z-axis direction is arranged on the second detecting beams.

4. The sensor chip as claimed in claim 1, wherein
   widths of the first detecting beams and the second detecting beams are narrower than a width of the third detecting beams, and
   lengths of the first detecting beams and the second detecting beams are longer than a length of the third detecting beams.

5. A sensor chip configured to detect a displacement in a predetermined axial direction in up to 6 axes at maximum, based on changes in outputs of a plurality of distortion detection devices arranged on predetermined beams, according to directions of forces or displacements applied to force application points, comprising:
   a substrate;
   first support parts arranged at four corners of the substrate;
   a second support part arranged at a center of the substrate;
   first detecting beams respectively connecting adjacent ones of the first support arts to each other;
   second detecting beams respectively provided in parallel with respect to the first detecting beams between respective ones of the first detecting beams and the second support part;

third detecting beams connecting the first detecting beams and the second detecting beams, in sets of the first detecting beams and the second detecting beams provided in force application points, arranged at intersections of the first detecting beams and the third detecting beams, and applied with the forces;

the plurality of distortion detection devices arranged at predetermined positions on the first detecting beams, the second detecting beams, and the third detecting beams;

first reinforcing beams provided in parallel with respect to the first detecting beams on outer sides of the first detecting beams, and respectively connecting the adjacent ones of the first support parts to each other; and second reinforcing beams respectively connecting the second support part and the first support parts, wherein a displacement in a Z-axis direction along a thickness direction of the substrate is detected based on deformations of at least the third detecting beams, wherein displacements in an X-axis direction and a Y-axis direction respectively perpendicular to the Z-axis direction are detected based deformations of at least one of the first detecting beams and the second detecting beams wherein the second reinforcing beams are arranged non-parallel with respect to the first reinforcing beams, wherein the first reinforcing beams and the second reinforcing beams are formed to thicknesses greater than those of the first detecting beams, the second detecting beams, and the third detecting beams, and wherein the second detecting beams connect ends of adjacent ones of the second reinforcing beams on a side of the second support part.

6. The sensor chip as claimed in claim 5, wherein the first detecting beam, the second detecting beam, and the third detecting beam are provided on an upper end side along a thickness direction of the first support parts and the second support part, lower surfaces of the first support parts, a lower surface of the second support part, and lower surfaces of the force application points are located on the same plane at a lower end side along the thickness direction of the first support parts and the second support part, and at the lower end side, lower surfaces of the first reinforcing beams and lower surfaces of the second reinforcing beams cave in from the lower surfaces of the first support parts, the lower surface of the second support part, and the lower surfaces of the force application points toward the upper end side.

7. The sensor chip as claimed in claim 5, wherein wirings are formed on upper surfaces of one of or both of the first reinforcing beams and the second reinforcing beams.

8. The sensor chip as claimed in claim 7, wherein electrodes coupled to the wirings are arranged on upper surfaces of the first support parts.

9. A sensor chip configured to detect a displacement in a predetermined axial direction in up to 6 axes at maximum, based on changes in outputs of a plurality of distortion detection devices arranged on predetermined beams, according to directions of forces or displacements applied to force application points, comprising:

a substrate;

first support parts arranged at four corners of the substrate;

a second support part arranged at a center of the substrate;

first detecting beams respectively connecting adjacent ones of the first support parts to each other;

second detecting beams respectively provided in parallel with respect to the first detecting beams between respective ones of the first detecting beams and the second support part;

third detecting beams connecting the first detecting beams and the second detecting beams, in sets of the first detecting beams and the second detecting beams provided in parallel;

force application points, arranged at intersections of the first detecting beams and the third detecting beams, and applied with the forces; and the plurality of distortion detection devices arranged at predetermined positions on the first detecting beams, the second detecting beams, and the third detecting beams, wherein a displacement in a Z-axis direction along a thickness direction of the substrate is detected based on deformations of at least the third detecting beams, wherein displacements in an X-axis direction and a Y-axis direction respectively perpendicular to the Z-axis direction are detected based deformations of at least one of the first detecting beams and the second detecting beams, wherein the sensor chip is formed on a semiconductor substrate, wherein a temperature sensor is formed by the distortion detection devices and an impurity semiconductor, and wherein the distortion detection devices forming the temperature sensor, and the distortion detection devices for displacement detection are arranged in different directions with respect to a crystal orientation of the semiconductor substrate.

10. The sensor chip as claimed in claim 9, wherein the temperature sensor is arranged on upper surfaces of the first support parts.

11. A flexure element that is bonded to a sensor chip that detects a displacement in a predetermined axial direction, comprising:

first columns arranged at four corners and deformed by an applied force;

a second column arranged at a center and not deformed by the applied force;

four first beams connecting adjacent ones of the first columns, and deformed by the applied force;

second beams respectively projecting toward an inner side along a horizontal direction from a medial surface of each of the first beams, to transmit deformations of the first columns and the first beams to the sensor chip; and four input parts respectively projecting upward from a center part along a longitudinal direction of each of the first beams, and applied with the force.

12. The flexure element as claimed in claim 11, further comprising:

third columns provided at four corners on one surface of the second column; and a fourth column provided at a center of the one surface of the second column.

13. The flexure element as claimed in claim 12, wherein the second beams respectively project toward the inner side along the horizontal direction from a center part along the longitudinal direction of the medial surface of each of the first beams.

14. The flexure element as claimed in claim 12, further comprising:

projecting parts respectively projecting upward from a tip end side of an upper surface of each of the second beams, to contact the sensor chip.

15. A force sensor device comprising:
a sensor chip configured to detect a displacement in a predetermined axial direction in up to 6 axes at maximum, based on changes in outputs of a plurality of distortion detection devices arranged on predetermined beams, according to directions of forces or displacements applied to force application points, and including
a substrate,
first support arts arranged at four corners of the substrate,
a second support part arranged at a center of the substrate,
first detecting beams respectively connecting adjacent ones of the first support parts to each other,
second detecting beams respectively provided in parallel with respect to the first detecting beams between respective ones of the first detecting beams and the second support part,
third detecting beams connecting the first detecting beams and the second detecting beams, in sets of the first detecting beams and the second detecting beams provided in parallel,
force application points, arranged at intersections of the first detecting beams and the third detecting beams, and applied with the forces, and
the plurality of distortion detection devices arranged at predetermined positions on the first detecting beams, the second detecting beams, and the third detecting beams,
wherein a displacement in a Z-axis direction along a thickness direction of the substrate is detected based on deformations of at least the third detecting beams, and
wherein displacements in an X-axis direction and a Y-axis direction respectively perpendicular to the Z-axis direction are detected based deformations of at least one of the first detecting beams and the second detecting beams; and
a flexure element that is bonded to the sensor chip that detects a displacement in a predetermined axial direction, and including
first columns arranged at four corners and deformed by an applied force,
a second column arranged at a center and not deformed by the applied force,
four first beams connecting adjacent ones of the first columns, and deformed by the applied force,
second beams respectively projecting toward an inner side along a horizontal direction from a medial surface of each of the first beams, to transmit deformations of the first columns and the first beams to the sensor chip,
four input parts respectively projecting upward from a center part along a longitudinal direction of each of the first beams, and applied with the force,
third columns provided at four corners on one surface of the second column, and
a fourth column provided at a center of the one surface of the second column,
wherein the first support parts of the sensor chip are fixed on the third columns of the flexure element,
wherein the second support part of the sensor chip is fixed on the fourth column of the flexure element, and
wherein the force application points of the sensor chip are fixed to the tip end side of the second beams of the flexure element.

16. The force sensor device as claimed in claim 15, wherein the sensor chip is fixed to the flexure element so as not to project from an upper surface of the first columns.

17. The force sensor device as claimed in claim 15, further comprising:
an input and output substrate configured to input and output signals with respect to the sensor chip,
wherein the input and output substrate is bonded to the flexure element so that electrodes are arranged on the first columns.

18. The force sensor device as claimed in claim 17, wherein a region of the input and output substrate opposite to a surface formed with the electrodes is bonded to the first columns.

19. The force sensor device as claimed in claim 15, further comprising:
a force-receiving plate provided on the four input parts.

20. The force sensor device as claimed in claim 19, wherein
four recesses are provided in the force-receiving plate, and
the force-receiving plate is positioned with respect to the flexure element when the recesses cover the input parts, respectively.

21. The sensor chip as claimed in claim 1, further comprising:
first reinforcing beams provided in parallel with respect to the first detecting beams on outer sides of the first detecting beams, and respectively connecting the adjacent ones of the first support parts to each other; and
second reinforcing beams respectively connecting the second support part and the first support parts,
wherein the second reinforcing beams are arranged non-parallel with respect to the first reinforcing beams,
wherein the first reinforcing beams and the second reinforcing beams are formed to thicknesses greater than those of the first detecting beams, the second detecting beams, and the third detecting beams, and
wherein the second detecting beams connect ends of adjacent ones of the second reinforcing beams on a side of the second support part.

22. The sensor chip as claimed in claim 21, wherein
the first detecting beam, the second detecting beam, and the third detecting beam are provided on an upper end side along a thickness direction of the first support parts and the second support part,
lower surfaces of the first support parts, a lower surface of the second support part, and lower surfaces of the force application points are located on the same plane at a lower end side along the thickness direction of the first support parts and the second support part, and
at the lower end side, lower surfaces of the first reinforcing beams and lower surfaces of the second reinforcing beams cave in from the lower surfaces of the first support parts, the lower surface of the second support part, and the lower surfaces of the force application points toward the upper end side.

23. The sensor chip as claimed in claim 21, wherein wirings are formed on upper surfaces of one of or both of the first reinforcing beams and the second reinforcing beams.

24. The sensor chip as claimed in claim 23, wherein electrodes coupled to the wirings are arranged on upper surfaces of the first support parts.

25. The sensor chip as claimed in claim 1, wherein
the sensor chip is formed on a semiconductor substrate,
wherein a temperature sensor is formed by the distortion detection devices and an impurity semiconductor, and
wherein the distortion detection devices forming the temperature sensor, and the distortion detection devices for displacement detection are arranged in different directions with respect to a crystal orientation of the semiconductor substrate.

26. A force sensor device comprising:

a sensor chip configured to detect a displacement in a predetermined axial direction in up to 6 axes at maximum, based on changes in outputs of a plurality of distortion detection devices arranged on predetermined beams, according to directions of forces or displacements applied to force application points, and including a substrate,
  first support parts arranged at four corners of the substrate,
  a second support part arranged at a center of the substrate,
  first detecting beams respectively connecting adjacent ones of the first support parts to each other,
  second detecting beams respectively provided in parallel with respect to the first detecting beams between respective ones of the first detecting beams and the second support part,
  third detecting beams connecting the first detecting beams and the second detecting beams, in sets of the first detecting beams and the second detecting beams provided in parallel,
  force application points, arranged at intersections of the first detecting beams and the third detecting beams, and applied with the forces, and
  the plurality of distortion detection devices arranged at predetermined positions on the first detecting beams and the second detecting beams,
  wherein a displacement in a Z-axis direction along a thickness direction of the substrate is detected based on deformations of the first detecting beams or the second detecting beams, and
  wherein displacements in an X-axis direction and a Y-axis direction respectively perpendicular to the Z-axis direction are detected based deformations of the first detecting beams; and
a flexure element that is bonded to the sensor chip that detects a displacement in a predetermined axial direction, and including
  first columns arranged at four corners and deformed by an applied force;
  a second column arranged at a center and not deformed by the applied force,
  four first beams connecting adjacent ones of the first columns, and deformed by the applied force,
  second beams respectively projecting toward an inner side along a horizontal direction from a medial surface of each of the first beams, to transmit deformations of the first columns and the first beams to the sensor chip, and
  four input parts respectively projecting upward from a center part along a longitudinal direction of each of the first beams, and applied with the force.

27. The force sensor device as claimed in claim 26, wherein the flexure element further includes
  third columns provided at four corners on one surface of the second column, and
  a fourth column provided at a center of the one surface of the second column.

28. The force sensor device as claimed in claim 26, wherein
  the first support parts of the sensor chip are fixed on the third columns of the flexure element,
  the second support part of the sensor chip is fixed on the fourth column of the flexure element, and
  the force application points of the sensor chip are fixed to the tip end side of the second beams of the flexure element.

29. The force sensor device as claimed in claim 28, wherein the sensor chip is fixed to the flexure element so as not to project from an upper surface of the first columns.

30. The force sensor device as claimed in claim 28, further comprising:
  an input and output substrate configured to input and output signals with respect to the sensor chip,
  wherein the input and output substrate is bonded to the flexure element so that electrodes are arranged on the first columns.

31. The force sensor device as claimed in claim 30, wherein a region of the input and output substrate opposite to a surface formed with the electrodes is bonded to the first columns.

32. The force sensor device as claimed in claim 28, further comprising:
  a force-receiving plate provided on the four input pans.

33. The force sensor device as claimed in claim 32, wherein
  four recesses are provided in the force-receiving plate, and
  the force-receiving plate is positioned with respect to the flexure element when the recesses cover the input parts, respectively.

* * * * *